(12) United States Patent
Zhou et al.

(10) Patent No.: US 12,646,835 B2
(45) Date of Patent: Jun. 2, 2026

(54) ELECTRONIC DEVICE, WIRELESS COMMUNICATION METHOD AND COMPUTER-READABLE STORAGE MEDIUM

(71) Applicant: Sony Group Corporation, Tokyo (JP)

(72) Inventors: Zhengyi Zhou, Beijing (CN); Zhaocheng Wang, Beijing (CN); Ning Ge, Beijing (CN); Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 628 days.

(21) Appl. No.: 18/021,175

(22) PCT Filed: Sep. 18, 2021

(86) PCT No.: PCT/CN2021/119298
§ 371 (c)(1),
(2) Date: Feb. 14, 2023

(87) PCT Pub. No.: WO2022/057918
PCT Pub. Date: Mar. 24, 2022

(65) Prior Publication Data
US 2023/0318177 A1 Oct. 5, 2023

(30) Foreign Application Priority Data
Sep. 21, 2020 (CN) .......................... 202010995016.6

(51) Int. Cl.
*H01Q 3/46* (2006.01)
*H04L 25/02* (2006.01)

(52) U.S. Cl.
CPC ........... *H01Q 3/46* (2013.01); *H04L 25/0204* (2013.01); *H04L 25/0242* (2013.01)

(58) Field of Classification Search
CPC .... H01Q 15/002; H01Q 3/46; H04B 7/04013; H04B 7/0456; H04L 25/0204; H04L 25/0224; H04L 25/0242; H04W 56/0045
See application file for complete search history.

(56) References Cited

U.S. PATENT DOCUMENTS

2018/0097576 A1 4/2018 Wu et al.
2023/0361816 A1* 11/2023 Yang ................... H04B 7/04013

FOREIGN PATENT DOCUMENTS

CN 111162823 A 5/2020
CN 111246491 A 6/2020

OTHER PUBLICATIONS

International Search Report and Written Opinion mailed on Dec. 14, 2021, received for PCT Application PCT/CN2021/119298, filed on Sep. 18, 2021, 8 pages including English Translation.
(Continued)

*Primary Examiner* — Nader Bolourchi
(74) *Attorney, Agent, or Firm* — XSENSUS LLP

(57) ABSTRACT

An electronic device comprises a processing circuit configured to: acquire multiple pieces of channel information, which are obtained via multiple channel measurements, about an equivalent channel between a first communication device and a second communication device, wherein in each channel measurement, the second communication device obtains a piece of channel information on the basis of a received reference signal sent from the first communication device, and a reflection signal sent by an intelligent reflecting surface between the first communication device and the second communication device using a corresponding group of reflection parameters to reflect the reference signal; and by means of performing joint processing on multiple groups of reflection parameters used in the multiple channel measurements and the multiple pieces of acquired channel information, determine channel estimations of multiple inte-
(Continued)

gration sub-channels which are capable of representing the equivalent channel together with the reflection parameters of the intelligent reflecting surface.

17 Claims, 18 Drawing Sheets

(56) References Cited

OTHER PUBLICATIONS

Zhou et al., "Joint Transmit Precoding and Reconfigurable Intelligent Surface Phase Adjustment: A Decomposition-Aided Channel Estimation Approach", ResearchGate, DOI:10.13140/RG.2.2.30945. 66409, Available Online At: https://www.researchgate.net/publication/337824343, Dec. 2019, pp. 1-30.

Beixiong Zheng et al: "Fast Channel Estimation for IRS-Assisted Ofdm", Arxiv.Org, Cornell Aug. 11, 2020 (Aug. 11, 2020), pp. 1-4, Aug. 11, 2020 (Aug. 11, 2020), University Library, 201 Olin Library Cornell University Ithaca, NY 14853, XP081738030.
Nadeem Qurrat-Ul-Ain et al: "Asymptotic Max-Min SINR Analysis of Reconfigurable Intelligent Surface Assisted MISO Systems", IEEE Transactions on Wireless Communications, Apr. 14, 2020 (Apr. 14, 2020), pp. 7748-7764, vol. 19, No. 12, pp. 7748-7764, IEEE Service Center, Piscataway, NJ, US, XP011823768.
Qianqian Zhang et al: "Millimeter Wave Communications with an Intelligent Reflector: Performance Optimization and Distributional Reinforcement Learning", arxiv.org, Sep. 16, 2020 (Sep. 16, 2020), pp. 5-14, Cornell University Library, 201 Olin Library Cornell University Ithaca, NY 14853, XP081762857.
Yang Yifei et al: "Intelligent Reflecting Surface Meets OFDM: Protocol Design and Rate Maximization", IEEE Transactions on Communicaions, Mar. 16, 2020 (Mar. 16, 2020), pp. 4522-4535, vol. 68, No. 7, IEEE Service Center, Piscataway, NJ. USA, XP011798551.

* cited by examiner

400

Acquisition unit
410

Determination unit
420

420

600

700

Acquisition unit
                710

Determination unit
                720

Receiving unit   730

Reflection calculation unit
1410

Precoding calculation unit
1420

Precoding unit 1430

Start

Acquire multiple pieces of channel information about an equivalent channel — S1501

Determine, by jointly processing multiple sets of reflection parameters and multiple pieces of channel information, channel estimation of integrated sub-channels — S1502

End

180

(A)                                    (B)

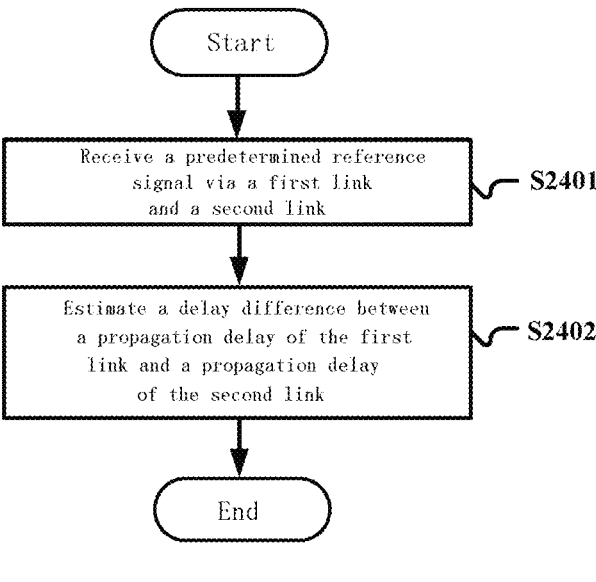

Start

Receive a predetermined reference
signal via a first link
and a second link ⌐ S2401

Estimate a delay difference between
a propagation delay of the first
link and a propagation delay
of the second link ⌐ S2402

End

FIG.24

Start

Transmit a predetermined reference
signal via a first link and a second link,
for another communication device to
estimate a delay difference between a
propagation delay of the first link
and a propagation delay of the second link ⌐ S2501

End

FIG.25

ELECTRONIC DEVICE, WIRELESS COMMUNICATION METHOD AND COMPUTER-READABLE STORAGE MEDIUM

CROSS-REFERENCE TO RELATED APPLICATIONS

The present application is based on PCT filing PCT/CN2021/119298, filed Sep. 18, 2021, which claims priority to Chinese Patent Application No. 202010995016.6, filed on Sep. 21, 2020, each of which is incorporated herein by reference in its entirety.

FIELD

The present application relates to the technical field of wireless communications, and in particular to an electronic device for performing channel estimation or precoding in case of an intelligent reflecting surface between two communication devices serve as transceivers, a method for wireless communications and a non-transitory computer readable storage medium.

BACKGROUND

At present, the intelligent reflecting surface (IRS) has received increasing attention. By placing an IRS between a transmitter and a receiver, a transmitter-IRS-receiver link (hereinafter also referred to as "reflection link") is formed on the basis of an original transmitter-receiver link (hereinafter also referred to as "direct link"). The two links may function simultaneously to increase the data rate and increase effectiveness of a communication system. Alternatively, one of the two links serves as a backup link for the other, so as to improve reliability of the communication system.

Similar to a general multiple-input-multiple-output (MIMO) system, channel estimation and precoding based on the channel estimation are also necessary in an intelligent reflecting surface multiple-input multiple-output (IRS-MIMO) system, so as to eliminate interference between users and improve the effectiveness of the communication system.

However, an intelligent reflecting surface is generally not equipped with a radio frequency link, and only reflects a signal received by the intelligent reflecting surface after modifying an amplitude and/or phase based on reflection parameters. Therefore, conventional channel estimation fails to be applied to a channel between the IRS and a transceiver.

Therefore, it is desirable to provide an appropriate method for channel estimation and optionally a corresponding method for precoding for the case where there is an intelligent reflecting surface between two communication devices serve as transceivers.

In addition, for the case where an IRS is arranged between a transmitter and a receiver so that there are both a direct link and a reflection link between the transmitter and the receiver, the direct link and the reflection link may have different propagation delays. Therefore, it is desirable to be able to properly estimate a delay difference between the propagation delays of the two links.

SUMMARY

A brief summary of the present disclosure is given below in order to provide a basic understanding of some aspects of the present disclosure. It should be understood, however, that this summary is not an exhaustive summary of the present disclosure. This summary is neither intended to identify key or critical parts of the present disclosure, nor intended to limit the scope of the present disclosure. The purpose of this summary is only to give some concepts about the present disclosure in a simplified form as a prelude to the more detailed description that is presented later.

In view of the above problems, an object of at least one aspect of the present disclosure is to provide an electronic device, a method for wireless communications, and a non-transitory computer-readable storage medium, so as to perform proper channel estimation or precoding in case of an intelligent reflecting surface between two communication devices serve as transceivers.

Furthermore, an object of at least another aspect of the present disclosure is to provide an electronic device, a method for wireless communications, and a non-transitory computer-readable storage medium, so as to properly estimate a delay difference between a propagation delay of a direct link between transceivers not via an intelligent reflecting surface and a propagation delay of a reflection link via an intelligent reflecting surface in case of an intelligent reflecting surface between two communication devices serve as the transceivers.

According to a first aspect of the present disclosure, an electronic device is provided. The electronic device includes processing circuitry configured to: acquire multiple pieces of channel information about an equivalent channel between a first communication device and a second communication device obtained through multiple channel measurements, where in each of the multiple channel measurements, the second communication device is for acquiring one piece of channel information based on a received reference signal transmitted from the first communication device and a reflection signal sent by an intelligent reflecting surface between the first communication device and the second communication device reflecting the reference signal based on a set of reflection parameters; and determine, by jointly processing multiple sets of reflection parameters utilized in the multiple channel measurements and the multiple pieces of acquired channel information, channel estimation of multiple integrated sub-channels that characterize the equivalent channel together with reflection parameters of the intelligent reflecting surface.

According to a second aspect of the present disclosure, an electronic device is provided. The electronic device includes processing circuitry configured to: calculate a first precoding matrix based on channel estimations of the multiple integrated sub-channels obtained by the electronic device according to the first aspect; and calculate the reflection parameters of the intelligent reflecting surface and a second precoding matrix of the first communication device based on the first precoding matrix, so that an equivalent precoding matrix generated based on the calculated reflection parameters and the second precoding matrix is similar to the first precoding matrix.

According to a third aspect of the present disclosure, an electronic device is provided. The electronic device includes processing circuitry configured to: calculate, based on a first steering vector of an intelligent reflecting surface in a direction of angle of arrival of a first communication device with respect to the intelligent reflecting surface and a second steering vector of the intelligent reflecting surface in a direction of angle of departure of a second communication device with respect to the intelligent reflecting surface, reflection parameters of the intelligent reflecting surface between the first communication device and the second communication device, where no direct link exists between the first communication device and the second communication device; and calculate a precoding vector of the first communication device based on a third steering vector of the first communication device in a direction of angle of departure of the intelligent reflecting surface with respect to the first communication device.

According to a first aspect of the present disclosure, there is also provided a method for wireless communications. The method includes: acquiring multiple pieces of channel information about an equivalent channel between a first communication device and a second communication device obtained through multiple channel measurements, where in each of the multiple channel measurements, the second communication device is for acquiring one piece of channel information based on a received reference signal transmitted from the first communication device and a reflection signal sent by an intelligent reflecting surface between the first communication device and the second communication device reflecting the reference signal based on a set of reflection parameters; and determining, by jointly processing multiple sets of reflection parameters utilized in the multiple channel measurements and the multiple pieces of acquired channel information, channel estimation of multiple integrated sub-channels that characterize the equivalent channel together with reflection parameters of the intelligent reflecting surface.

According to a second aspect of the present disclosure, there is also provided a method for wireless communications. The method includes: calculating a first precoding matrix based on channel estimations of the multiple integrated sub-channels obtained by the electronic device or method according to the first aspect; and calculating the reflection parameters of the intelligent reflecting surface and a second precoding matrix of the first communication device based on the first precoding matrix, so that an equivalent precoding matrix generated based on the calculated reflection parameters and the second precoding matrix is similar to the first precoding matrix.

According to a third aspect of the present disclosure, there is also provided a method for wireless communications. The method includes: calculating, based on a first steering vector of an intelligent reflecting surface in a direction of angle of arrival of a first communication device with respect to the intelligent reflecting surface and a second steering vector of the intelligent reflecting surface in a direction of angle of departure of a second communication device with respect to the intelligent reflecting surface, reflection parameters of the intelligent reflecting surface between the first communication device and the second communication device, where no direct link exists between the first communication device and the second communication device; and calculating a precoding vector of the first communication device based on a third steering vector of the first communication device in a direction of angle of departure of the intelligent reflecting surface with respect to the first communication device.

According to a fourth aspect of the present disclosure, an electronic device is provided. The electronic device includes processing circuitry configured to: receive a predetermined reference signal sent by another communication device via a first link from said another communication device to the electronic device and a second link from said another communication device to the electronic device via an intelligent reflecting surface; and estimate a delay difference between a propagation delay of the first link and a propagation delay of the second link based on a difference between a first reception time at which the predetermined reference signal is expected to be received via the first link and a second reception time at which the predetermined reference signal is actually received via the second link.

According to a fourth aspect of the present disclosure, there is also provided a method for wireless communications. The method includes: receiving a predetermined reference signal sent by another communication device via a first link from said another communication device to the electronic device and a second link from said another communication device to the electronic device via an intelligent reflecting surface; and estimating a delay difference between a propagation delay of the first link and a propagation delay of the second link based on a difference between a first reception time at which the predetermined reference signal is expected to be received via the first link and a second reception time at which the predetermined reference signal is actually received via the second link.

According to a fifth aspect of the present disclosure, an electronic device is provided. The electronic device includes processing circuitry configured to: transmit a predetermined reference signal to another communication device via a first link from the electronic device to said another communication device and a second link from the electronic device to said another communication device via an intelligent reflecting surface, for said another communication device to estimate a delay difference between a propagation delay of the first link and a propagation delay of the second link based on a difference between a first reception time at which the predetermined reference signal is expected to be received via the first link and a second reception time at which the predetermined reference signal is actually received via the second link.

According to a fifth aspect of the present disclosure, there is also provided a method for wireless communications. The method includes: transmitting a predetermined reference signal to another communication device via a first link from the electronic device to said another communication device and a second link from the electronic device to said another communication device via an intelligent reflecting surface, for said another communication device to estimate a delay difference between a propagation delay of the first link and a propagation delay of the second link based on a difference between a first reception time at which the predetermined reference signal is expected to be received via the first link and a second reception time at which the predetermined reference signal is actually received via the second link.

According to another aspect of the present disclosure, a non-transitory computer-readable storage medium storing executable instructions is also provided. The executable instructions, when executed by a processor, cause the processor to perform the method for wireless communications or functions of the electronic device.

According to other aspects of the present disclosure, computer program code and a computer program product for implementing the method for wireless communications according to the present disclosure are also provided.

According to at least one aspect of the embodiments of the present disclosure, for two communication devices as transceivers with an intelligent reflecting surface arranged between them, reflection parameters of the intelligent reflecting surface together with multiple integrated sub-channels characterize the equivalent channel. Therefore, multiple sets of reflection parameters utilized in multiple channel measurements are jointly processed with the obtained multiple pieces of channel information, so as to determine a channel estimation of each integrated sub-channel.

According to at least another aspect of the embodiments of the present disclosure, the first precoding matrix may be calculated based on the channel estimations of the multiple integrated sub-channels obtained in the above manner, and the reflection parameters of the intelligent reflecting surface and the second precoding of the first communication device may be calculated based on the first precoding matrix. Therefore, the reflection parameters may be properly set and the data signal may be properly precoded.

According to at least another aspect of the embodiments of the present disclosure, for the case that there is no direct link between the first communication device and the second communication device, the reflection parameters of the intelligent reflecting surface and the precoding vector of the first communication device may be calculated based on angles of departure and/or angles of arrival between the first communication device and the intelligent reflecting surface and between the intelligent reflecting surface and the second communication device, so that the reflection parameters can be properly set and the data signal can be properly precoded in a simplified manner.

According to at least another aspect of the embodiments of the present disclosure, for the case where there is an intelligent reflecting surface between two communication devices as transceivers, a delay difference between the propagation delay of the direct link between the transceivers via no intelligent reflecting surface and the propagation delay of the reflection link between the transceivers via an intelligent reflecting surface can be properly estimated.

Additional aspects of the embodiments of the disclosure are presented in the detail description below. The detailed description is for fully disclosing preferred embodiments among the embodiments of the present disclosure without imposing limitations thereon.

BRIEF DESCRIPTION OF THE DRAWINGS

The drawings described herein are for illustrating selected embodiments only and rather than all possible implementations, and are not intended to limit the scope of the present disclosure. In the drawings:

FIG. 7 is a block diagram illustrating a third configuration example of the electronic device according to the first embodiment of the present disclosure;

FIG. 24 is a flowchart illustrating a method for wireless communications according to a fourth embodiment of the present disclosure;

FIG. 25 is a flowchart illustrating a method for wireless communications according to a fifth embodiment of the present disclosure;

Figure 1:
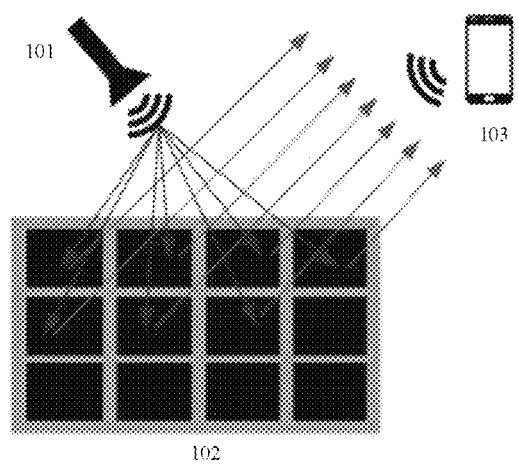
FIG. 1 is a schematic diagram for explaining the basic working principle of an intelligent reflecting surface.

Although the present disclosure is susceptible to various modifications and alternative forms, specific embodiments thereof have been shown by way of example in the drawings and described in detail herein. It should be understood, however, that the description of specific embodiments herein is not intended to limit the disclosure to the precise form disclosed. Instead, the intention of the present disclosure is to cover all modifications, equivalents and alternatives falling within the spirit and scope of the present disclosure. It is noted that corresponding numerals indicate corresponding parts throughout the drawings.

DETAILED DESCRIPTION

Examples of the present disclosure are to be described more fully with reference to the drawings. The following description is merely exemplary in nature and is not intended to limit the disclosure, application or uses.

Example embodiments are provided so that the present disclosure is thorough, and the scope is fully conveyed to those skilled in the art. Numerous specific details such as examples of specific components, devices and methods are set forth, so as to provide a thorough understanding of embodiments of the present disclosure. It is apparent to those skilled in the art that example embodiments may be embodied in many different forms without specific details, and none of the example embodiments should be construed to limit the scope of the present disclosure. In some example embodiments, well-known processes, well-known structures, and well-known technologies are not described in detail.

Description is made in the following order:

1 Overview
   1.1 Brief introduction of intelligent reflecting surface
   1.2 Examples of application scenarios of intelligent reflecting surface
   1.3 Channel integration related to intelligent reflecting surface
2. Configuration example of first embodiment
   2.1 First configuration example
   2.2 Second configuration example
   2.3 Third configuration example
   2.4 Example of information interaction
3. Configuration example of second embodiment
   3.1 First configuration example
   3.2 Second configuration example
4. Configuration example of third embodiment
   4.1 Precoding calculation without direct link
   4.2 First configuration example
   4.3 Second configuration example
5. Method embodiments of first to third embodiments
   5.1 Method embodiment of first embodiment
   5.2 Method embodiment of second embodiment
   5.2 Method embodiment of third embodiment
6. Configuration example of fourth embodiment
   6.0 Generation of delay difference
   6.1 Configuration example
   6.2 First example
   6.3 Second example
7. Configuration example of fifth embodiment
   7.1 Configuration example
   7.2 First example
   7.3 Second example
8. Method embodiments of fourth to fifth embodiments
   8.1 Method embodiment of fourth embodiment
   8.2 Method embodiment of fifth embodiment
9. Application examples

1. Overview

1.1 Brief Introduction of Intelligent Reflecting Surface

An intelligent reflecting surface, also known as reconfigurable intelligent surface (RIS) or large intelligent surface (LIS), is a large-scale array composed of multiple low-cost passive reflectors (also called "elements" or "array elements", which are also referred to as "reflection units" herein). Based on the reconfigurable electromagnetic surface technology, each element or reflection unit in the array may reflect an electromagnetic wave incident on the array. Further, a phase of the reflected wave is modified based on a phase modulation coefficient, and optionally an amplitude of the electromagnetic wave is modified based on an amplitude modulation coefficient. The phase modulation coefficient and the amplitude modulation coefficient are collectively referred to as reflection parameters herein.

FIG. 1 is a schematic diagram explaining the basic working principle of the intelligent reflecting surface, and shows a traditional application scenario of the intelligent reflecting surface. As shown in FIG. 1, the intelligent reflecting surface is for implementing a reconfigurable reflecting array antenna. That is, an active antenna 101 and an intelligent reflecting surface 102 are integrated together. The active antenna 101 illuminates the intelligent reflecting surface 102 to generate reflected waves. The receiving end 103 receives electromagnetic waves reflected from the intelligent reflecting surface 102, so as to transmit signals. The intelligent reflecting surface 102 has multiple reflection elements (schematically shown as multiple black solid rectangles in the drawings). Under the control of a control circuit (not shown in the drawings), the phase (and optionally the amplitude) of the signal reflected by each reflection element may reasonably modified based on corresponding reflection parameters, so as to achieve beamforming.

1.2 Examples of Application Scenarios of Intelligent Reflecting Surface

Figure 2:
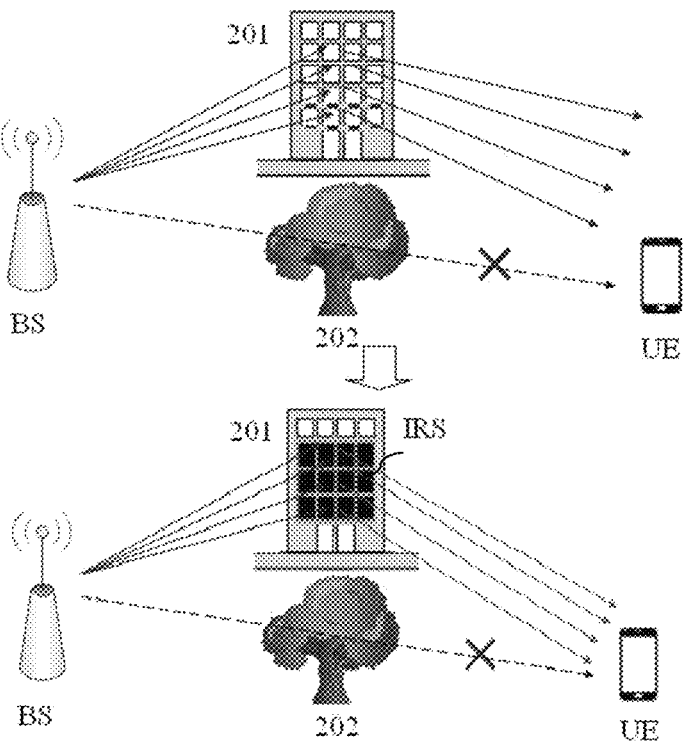
FIG. 2 is a schematic diagram illustrating an example application scenario of the intelligent reflecting surface.

At present, one application of the intelligent reflecting surface that has attracted attention is to deploy the intelligent reflecting surface in a distributed manner at a position between transmitting and receiving ends. FIG. 2 shows an example scenario suitable for applying the intelligent reflecting surface. As shown in the upper part of FIG. 2, when there is strong occlusion 202 between a base station BS and user equipment UE, the line-of-sight transmission condition, that is, the line of sight (LOS) is destroyed, and the general non-line-of-sight (NLOS) channel has a low gain, resulting in a poor signal-to-noise ratio of the UE at the receiving end. In this case, as shown in the lower part of FIG. 2, an intelligent reflecting surface IRS may be arranged on a building 201 between the BS and the UE. Based on the characteristics of reflection elements of the IRS, the phase (and optionally the amplitude) of the reflected signal can be reasonably modified to concentrate signal energy towards the UE, thereby effectively improving the signal-to-noise ratio at the receiving end.

It can be seen that by arranging the intelligent reflecting surface between a transmitter and a receiver, a transmitter-intelligent reflecting surface-receiver link is formed in addition to the original transmitter-receiver link. The two links may operate simultaneously to increase the data rate and increase the effectiveness of the communication system (such as in the example shown in FIG. 2). Alternatively, one of the two links serves as a backup link of the other, so as to improve the reliability of the wireless communication system. Therefore, this kind of wireless communication system assisted by the intelligent reflecting surface has attracted extensive attention of researchers.

In a wireless communication system assisted by an intelligent reflecting surface, when the transceiver or one side is equipped with multiple antennas, an intelligent reflecting surface multiple-input multiple-output (IRS-MIMO) system is formed. Similar to a general multiple-input multiple-output (MIMO) system, channel estimation and precoding based on the channel estimation are also necessary in the IRS-MIMO system, so as to eliminate interference between users and improve the effectiveness of the communication system.

However, an intelligent reflecting surface is generally not equipped with a radio frequency link, and only reflects a signal received by the intelligent reflecting surface after modifying an amplitude and/or phase based on reflection parameters. Therefore, conventional channel estimation fails to be applied to a channel between transceivers in the wireless communication system assisted by an intelligent reflecting surface.

1.3 Channel Integration Related to Intelligent Reflecting Surface

For this reason, an inventive concept of channel integration is proposed, in which the channel in a wireless communication system assisted by an intelligent reflecting surface is reformed into multiple integrated sub-channels that have nothing to do with reflection parameters. The entire equivalent channel is represented by these integrated sub-channels together with the reflection parameters of the IRS. Such integrated sub-channels are applicable to the channel estimation and correspondingly applicable to the precoding. The channel integration is outlined below with reference to FIG. 3.

Figures 3, 4:
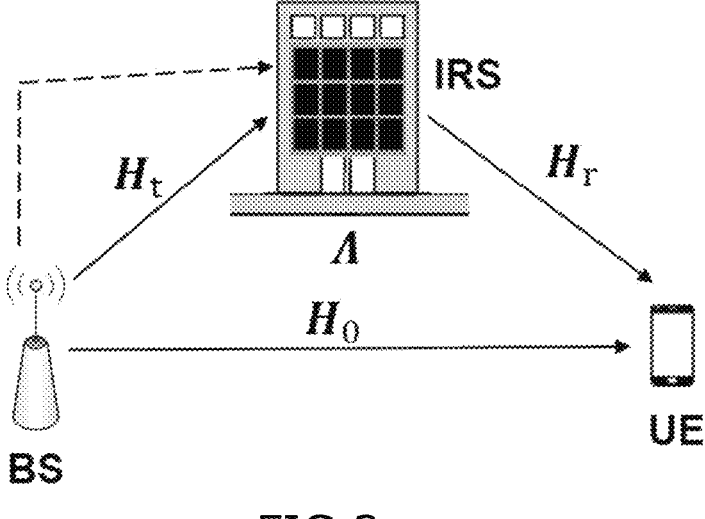
FIG. 3 is a schematic diagram illustrating an equivalent channel in a wireless communication system assisted by an intelligent reflecting surface.
FIG. 4 is a block diagram illustrating a first configuration example of an electronic device according to a first embodiment of the present disclosure.

FIG. 3 is a schematic diagram illustrating an equivalent channel in a wireless communication system assisted by an intelligent reflecting surface. The wireless communication system shown in FIG. 3 includes a first communication device BS, a second communication device UE, and an intelligent reflecting surface IRS arranged on a building between the BS and the UE. The intelligent reflecting surface IRS may include M reflection units (where M is a natural number greater than 1). Under the control of a control circuit (not shown) of the IRS, these reflection units receive control information about reflection parameters from the BS, for example, via a control link shown in dashed line, and modify an amplitude and/or a phase of a signal sent by the BS based on M reflection parameters respectively, so as to transmit a reflection signal receivable by the UE. Here, although the first communication device is shown as a base station, the first communication device may also be any network-side device such as a TRP.

Here, the equivalent channel is described by taking the case where the IRS only modifies the phase (that is, the amplitude modulation coefficient in the reflection parameters is 1) as an example. The example described based on phase modulation is appropriately appliable to the case of amplitude modulation in addition to the phase modulation, and corresponding description may be made later as necessary. In case of phase modulation only, $e^{j\omega_m}$ represents a reflection parameter of an $m^{th}$ reflection unit (where m=1, 2, . . . M). Phase modulations performed by the M reflection units of the IRS on their respective reflected signals may be represented by an M×M diagonal matrix A shown in the following Equation (1) (where the diagonal matrix of reflection parameters is also referred to as "reflection matrix" when appropriate hereinafter).

$$\Lambda = \begin{bmatrix} e^{j\omega_1} & \cdots & 0 \\ \vdots & \ddots & \vdots \\ 0 & \cdots & e^{j\omega_M} \end{bmatrix} \tag{1}$$

Correspondingly, the equivalent channel $H_{eq}(\Lambda)$ between the BS and the UE may be represented by the following Equation (2):

$$H_{eq}(\Lambda) = H_0 + H_r \Lambda H_t \tag{2}$$

As shown in Equation (2), the equivalent channel $H_{eq}(\Lambda)$ consists of a first link $H_0$ ("direct link") from the BS to the UE and a second link $H_r\Lambda H_t$ ("reflection link") from the BS to the UE via the IRS. Here, as shown in FIG. 3, $H_t$ represents a channel from the BS to the IRS, and may be in a form of an M×$N_t$ matrix. $N_t$ represents the number of antennas of the BS. $H_r$ represents a channel from the IRS to the UE, and may be in a form of an $N_r$×M matrix. $N_r$ represents the number of antennas of the UE.

It can be seen from Equation (2) that the equivalent channel in the wireless communication system in FIG. 3 may vary with the reflection parameters of the reflection units of the IRS (related to the reflection matrix A). In this system, $H_0$ may still be obtained by using a traditional method of channel measurement (or channel observation) based on a reference signal (this traditional method may also be called pilot training). However, since the conventional IRS is not equipped with a radio frequency link and thus does not have the capability of digital signal processing, $H_r$ and $H_t$ cannot be directly obtained by channel measurement based on the reference signal. Therefore, based on the traditional pilot training, only information about the overall equivalent channel $H_{eq}(\Lambda)$ with variables (reflection parameters) can be estimated. This means that the channel estimation of the entire equivalent channel has to be completely redone every time the reflection parameters are changed.

In view of the above problems, the inventive concept of the present disclosure is proposed. The channel $H_0$ from the BS to the UE, the channel $H_t$ from the BS to the IRS, and the channel $H_r$ from the IRS to the UE are reformed into multiple integrated sub-channels independent of the reflection parameters, and the entire equivalent channel is represented by these integrated sub-channels together with the reflection parameters of the IRS. In this way, the multiple integrated sub-channels independent of the reflection parameters are solved by performing the channel observation with the reference signal based on different reflection parameters. In addition, a precoding matrix may also be calculated based on the thus solved integrated sub-channels.

Next, a first embodiment for channel estimation based on the above inventive concept, a second embodiment for calculating a precoding matrix based on the channel estimation in the first embodiment, and a third embodiment for calculating the precoding matrix in a specific case are described.

2. Configuration Example of First Embodiment

2.1 First Configuration Example (Basic Configuration)

FIG. 4 is a block diagram showing a first configuration example of an electronic device according to the first embodiment of the present disclosure.

As shown in FIG. 4, the electronic device 400 may include an acquisition unit 410 and a determination unit 420.

Here, each unit of the electronic device 400 may be included in processing circuitry. It should be noted that the electronic device 400 may include one processing circuitry, or may include multiple processing circuitry. Further, the processing circuitry may include various discrete functional units to perform various functions and/or operations. It should be noted that these functional units may be physical entities or logical entities, and units with different titles may be realized by the same physical entity.

As an example, the electronic device 400 shown in FIG. 4 may be applied to a wireless communication system assisted by an intelligent reflecting surface as described above with reference to FIG. 3 in <1. Overview>. In the following, the processing implemented by the electronic device 400 and its functional units are described in conjunction with the example in FIG. 3.

According to an embodiment of the present disclosure, the acquisition unit 410 of the electronic device 400 may acquire multiple pieces of channel information about an equivalent channel between a first communication device and a second communication device, where the multiple pieces of channel information are obtained through multiple channel measurements. In each channel measurement, the second communication device acquires a piece of channel information about the equivalent channel based on a received reference signal transmitted from the first communication device and a reflection signal sent by the intelligent reflecting surface between the first communication device and the second communication device reflecting the reference signal based on a set of reflection parameters.

The determination unit 420 of the electronic device 400 may determine, by jointly processing multiple sets of reflection parameters utilized in multiple channel measurements and multiple pieces of acquired channel information, channel estimation of multiple integrated sub-channels (independent of the reflection parameters) that characterize the equivalent channel together with the reflection parameters of the intelligent reflecting surface.

In an example, the first communication device may be the network side device BS shown in FIG. 3, and the second communication device may be the user equipment UE shown in FIG. 3. In the following description, the first communication device is the network side device BS and the second communication device is the user equipment UE as an example. However, on the basis of the present disclosure, different settings may be appropriately adopted. For example, in a case that the user equipment has relatively strong processing capability, the first communication device may be the user equipment and the second communication device may be the network side device, which is not described in detail herein.

The intelligent reflecting surface between the first communication device and the second communication device may be, for example, an intelligent reflecting surface IRS with M reflection units as shown in FIG. 3. It is assumed that a total of L channel measurements are performed (where L is an appropriately set natural number greater than 1). In an $l^{th}$ (where l=1, 2, . . . , L) channel measurement, the reflection signal received by the second communication device is, for example, transmitted by reflection units of the intelligent reflecting surface after modifying an amplitude and/or a phase of the reference signal based on reflection parameters under the control of control circuits (not shown) respectively.

Figure 5:
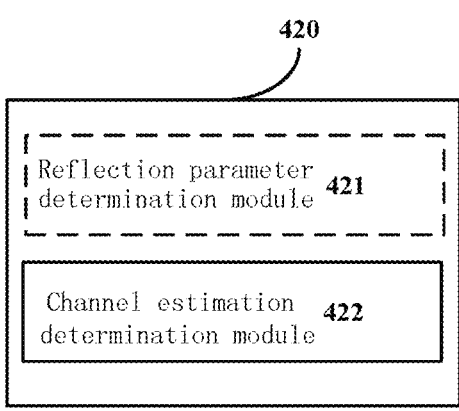
FIG. 5 is a block diagram illustrating a configuration example of a determination unit in the electronic device shown in FIG. 4.

In an example, these reflection parameters may be determined by the determination unit 420 of the electronic device 400. FIG. 5 shows a configuration example of such determination unit 420. The determination unit 420 includes, optionally, a reflection parameter determining module 421 and a channel estimation determining module 422. Here, the reflection parameter determining module 421 is described first.

The reflection parameter determining module 421 may be configured to determine a reflection parameter of the intelligent reflecting surface utilized in each measurement, for the intelligent reflecting surface to reflect the reference signal based on the reflection parameter. The electronic device 400 may directly or indirectly provide control information about the reflection parameter (for example, information including the reflection parameter) to the intelligent reflecting surface via a transmission unit that is not shown. For example, the electronic device 400 may transmit the control information about the reflection parameter to the first communication device such as the network side device, so that the first communication device transmits the control information (for example, simultaneously with the reference signal) to the intelligent reflecting surface through a control link, for the intelligent reflecting surface to reflect the reference signal based on the reflection parameter indicated by the control information. Alternatively, in the case where the intelligent reflecting surface is provided with a processing circuit, the electronic device 400 can directly transmit the control information about the reflection parameter to the intelligent reflecting surface at one time, so that the intelligent reflecting surface utilizes the control information in each subsequent reflection.

In an example, based on the control information about the reflection parameter generated by the reflection parameter determining module 421, the intelligent reflecting surface may utilize an $l^{th}$ set of M reflection parameters in the form of diagonal elements in the reflection matrix $\Lambda$ of Equation (1) in an $l^{th}$ channel measurement. Each reflection parameter may be appropriately set by the reflection parameter determining module 421. As an example, the reflection parameter determining module 421 may randomly generate the reflection parameters in the reflection matrix, that is, a value of $\omega_m$ in $e^{j\omega_m}$ in Equation (1) may be a random number. Here, the processing of the electronic device 400 is described mainly by taking the case where the intelligent reflecting surface only performs phase modulation (where a modulus of the reflection parameter is 1, that is, the amplitude modulation coefficient is 1) as an example. The example described based on the phase modulation may be appropriately applied to the case of amplitude modulation in addition to the phase modulation, which is described later when necessary.

As mentioned above, in a wireless communication system assisted by an intelligent reflecting surface as shown in FIG. 3, the equivalent channel between the first communication device and the second communication device may include a first link ("direct link") from the first communication device to the second communication device and a second link ("reflection link") from the first communication device to the second communication device via the intelligent reflecting surface.

As an example, the reference signal sent by the first communication device BS may be, for example, a channel status indicator-reference signal (CSI-RS). The second communication device UE may perform, based on the received reference signals that arrive at the UE through the direct link and the reflection link (that is, the reference signal received directly from the BS, and the reflected signal received from the IRS after modifying the reference signal sent by the BS based on the $l^{th}$ set of reflection parameters), channel measurement on the equivalent channel formed by the two links and obtain channel information about the equivalent channel.

As mentioned above, based on the proposed inventive concept of channel integration for equivalent channel, the channel $H_0$ from the first communication device BS to the second communication device UE shown, the channel $H_t$ from the first communication device BS to the intelligent reflecting surface IRS, and the channel $H_r$ from the intelligent reflecting surface IRS to the second communication device UE in FIG. 3 are reformed into multiple integrated sub-channels which have nothing to do with the reflection parameters, and the entire equivalent channel is represented by these integrated sub-channels together with the reflection parameters of the IRS.

Therefore, according to an embodiment of the present disclosure, the channel estimation determining module 422 of the determination unit 420 of the electronic device 400 may be configured to determine, by jointly processing multiple sets of reflection parameters utilized in multiple channel measurements and multiple pieces of acquired channel information, channel estimate of multiple integrated sub-channels (independent of the reflection parameters) that characterize the equivalent channel together with the reflection parameters of the intelligent reflecting surface.

In other words, in the wireless communication system assisted by an intelligent reflecting surface such as that shown in FIG. 3, L channel measurements are performed based on the reference signal with the different reflection parameters determined by the reflection parameter determining module 421 of the determination unit 420, to obtain channel information about L equivalent channels (where l=1, 2, . . . , L). The determination unit 420, for example, jointly process these reflection parameters and the channel information via the channel estimation determining module 422, so as to determine the channel estimate of multiple integrated sub-channels that characterize the equivalent channel together with the reflection parameters of the intelligent reflecting surface.

Next, an example of integrated sub-channels, independent of reflection parameters and applied in the embodiments of the present disclosure, that characterize the equivalent channel together with the reflection parameters of the intelligent reflecting surface is described. Furthermore, examples of the processing performed by units in the electronic device 400 or information/data/parameters involved in the processing are described in conjunction with the example of such integrated sub-channels.

Example of Integrating Sub-Channels

To describe the integrated sub-channels, a column vector formed by M reflection parameters (i.e., the diagonal elements of the reflection matrix $\Lambda$ of Equation (1)) of an intelligent reflecting surface with M reflection units in the form of the following Equation (3) is defined first, as a reflection vector p:

$$\mu = \left[ e^{j\omega_1}, \ldots, e^{j\omega_M} \right]^T \qquad (3)$$

An extended reflection vector may be obtained by adding a predetermined constant to the above reflection vector μ. In this example, the reflection parameter used does not involve phase modulation (i.e., the reflection parameter has a modulus of 1), and thus a predetermined constant of 1 is added. For ease of understanding, the predetermined constant 1 is set at a first position in the extended reflection vector, thereby defining the extended reflection vector μ̃ in the form of the following Equation (4).

$$\tilde{\mu} = \left[ 1, e^{j\omega_1}, \ldots, e^{j\omega_M} \right]^T = \left[ 1, \mu^T \right]^T \qquad (4)$$

Based on the definition of the above extended reflection vector, (M+1) integrated sub-channels $H_m$ are defined as follows.

$$H_m = \begin{cases} H_0, \, m = 0 \\ [H_r]_{(:,m)}[H_t]_{(m,:)}, \, m = 1, 2, \ldots, M \end{cases} \qquad (5)$$

In Equation (5), $[H_r]_{(:,m)}$ represents an $m^{th}$ column of $H_r$, and $[H_t]_{(m,:)}$ represents an $m^{th}$ row of $H_t$. The integrated sub-channel defined in the above manner has a matrix form of $N_r*N_t$, where $N_r$ represents the number of antennas of the second communication device at the receiving end, and $N_t$ represents the number of antennas of the first communication device at the transmitting end.

Based on Equations (4) and (5) above, the equivalent channel is converted from the form of Equation (2) into the form $H_{eq}(\tilde{\mu})$ of the following Equation (6).

$$H_{eq}(\tilde{\mu}) = H_0 + \sum\nolimits_{m=1}^{M} e^{j\omega_m} H_m = \left( \tilde{\mu}^T \otimes I_{N_r} \right) \left[ H_0^T \ldots H_M^T \right]^T \qquad (6)$$

In Equation (6), $\otimes$ is an operator representing the Kronecker product, $I_{N_r}$ is an identity matrix of size $N_r$, for transforming, through the Kronecker product operation, a transpose $\tilde{\mu}^T$ of the extended reflection vector into a matrix form suitable for matrix multiplication with the multiple integrated sub-channels. For the convenience of description, $\tilde{\mu}^T \otimes I_{N_r}$ is also referred to as the extended reflection matrix, and $$H_{cas} = \left[ H_0^T \ldots H_M^T \right]^T$$

is referred to as a cascaded channel composed of multiple integrated sub-channels below.

In the above example, the reflection parameters adopted do not involve phase modulation, so that the reflection vector has the form of Equation (3). In a case that the reflection parameters involve both amplitude modulation and phase modulation, an amplitude modulation coefficient $a_m$ may be added to each element in the reflection vector of Equation (3) so as to obtain $a_m e^{j\omega_m}$ (m=1, 2, . . . , M). In this case, since the modulus of the reflection parameter is no longer 1, the predetermined constant added in Equation (4) to obtain the extended reflection vector may be an arbitrary value rather than limited to 1. Further, the content in this example is similarly applicable to the case where the reflection parameters involve both amplitude modulation and phase modulation, i.e., the integrated sub-channel constructed from Equations (5) to (6) also applicable to the case.

According to the manner described above, the entire equivalent channel is represented as a multiplication form of the extended reflection matrix based on the reflection parameters and the cascaded channel formed by the integrated sub-channels independent of the reflection parameters. It is equivalent to decouple the channel part related to the reflection parameters of the intelligent reflecting surface and the channel part unrelated to the reflection parameters of the intelligent reflecting surface. Therefore, the integrated sub-channels independent of the reflection parameters of the intelligent reflecting surface can be solved based on the reflection parameters and an observation result on the equivalent channel.

On the basis of the example of integrated sub-channels described above, those skilled in the art may make appropriate modifications and variations, as long as the entire equivalent sub-channel is expressed as a channel part related to the reflection parameters of the intelligent reflecting surface and a channel part independent of the reflection parameters of the intelligent reflecting surface, and the two channel parts are decoupled from each other. For example, here, for ease of understanding, the added predetermined constant is set at the first position of the extended reflection vector in Equation (4). In fact, the predetermined constant may be added at any of the (M+1) positions, as long as the position of $H_0$ in Equation (5) is adjusted accordingly (i.e., it is ensured that the added constant is for being multiplied with $H_0$ in equation (6)).

Example of Channel Information Acquired by the Acquisition Unit

In an embodiment, the multiple pieces of channel information acquired by the acquisition unit 410 of the electronic device 400 may include multiple channel estimations of the equivalent channel obtained by the second communication device through channel measurements (where channel estimation of the equivalent channel is also referred to as "observation channel" hereinafter). For example, for the $l^{th}$ channel measurement, the second communication device UE may perform channel measurement on the equivalent channel based on a reference signal such as a CSI-RS arriving at the UE through a direct link and a reflection link (in which the IRS applies, for example, a first set of reflection parameters generated by the reflection parameter determining module 421 of the determination unit 420 of the electronic device 400), and may acquire an observation channel of the equivalent channel in various existing manners, so as to provide the observation channel to the acquisition unit 410 of the electronic device 400.

Alternatively, the multiple pieces of channel information acquired by the acquisition unit 410 of the electronic device 400 may include multiple pieces of channel state information of the equivalent channel obtained by the second communication device through channel measurements. For example, for the $l^{th}$ channel measurement, the second communication device UE may perform channel measurement on the equivalent channel, and may provide the obtained channel state information to the acquisition unit 410 of the electronic device 400 in the form of, for example, a channel state information (CSI) report. In this case, the acquisition unit 410 may be configured to determine, based on the acquired multiple pieces of channel information, multiple channel estimations of the equivalent channel, such as multiple observation channels, in an existing manner. In other words, the acquisition unit 410 is capable of performing channel estimation on the equivalent channel based on channel state information of the equivalent channel and the like in an existing manner.

Example of Joint Processing Performed by the Determination Unit

In order to determine the channel estimations of the integrated sub-channels based on the channel estimation of the equivalent channel acquired by the acquisition unit 410, the example joint processing performed by the determination unit 420 of the electronic device 400, for example, through the channel estimation determining module 422, may include: multiplying an inverse matrix of a training matrix constructed based on multiple extended reflection vectors obtained from multiple sets of reflection parameters (generated, for example, by the reflection parameter determining module 421 and applied to the channel measurement) by an observation matrix constructed based on multiple channel estimations (observation channels), to determine a channel matrix of each integrated sub-channel. Note that the "inverse matrix" of the training matrix here includes a pseudo-inverse matrix, which is to be described in detail later.

To perform the above joint processing, the channel estimation determining module 422 may, for example, add a predetermined constant to each set of reflection parameters in the multiple sets of reflection parameters (generated by the reflection parameter determining module 421 and applied to the channel measurement, for example), to obtain the multiple extended reflection vectors. As an example, in a case that the intelligent reflecting surface includes M reflection units and a set of M reflection parameters (for example, in the form of the diagonal elements in Equation (1)) corresponding to the M reflection units generated by the reflection parameter determining module 421 are utilized in each reflection (where M is a natural number greater than 1), an extended reflection vector $\tilde{\mu}_l$ utilized by the channel estimation determining module 422 may have the form of an (M+1)-dimensional vector in the following Equation (4').

$$\tilde{\mu}_l = \left[1, e^{j\omega_{1,l}}, \ldots, e^{j\omega_{M,l}}\right]^T \tag{4'}$$

Here, l=1, 2, . . . , L, corresponding to the $l^{th}$ channel measurement in the L channel measurements.

The channel estimation determining module 422 may construct the training matrix based on the extended reflection vectors, to jointly represent the reflection parameters utilized in the multiple channel measurements. As an example, the following training matrix $\Sigma$ of (M+1)×L may be formed with L extended reflection vectors in the form of Equation (4') as columns.

$$\sum = [\tilde{\mu}_1 \ \cdots \ \tilde{\mu}_L] = \begin{bmatrix} 1 & \cdots & 1 \\ e^{j\omega_{1,1}} & \cdots & e^{j\omega_{1,L}} \\ \vdots & \ddots & \vdots \\ e^{j\omega_{M,1}} & \cdots & e^{j\omega_{M,L}} \end{bmatrix} \tag{7}$$

Further, the channel estimation determining module 422 may construct the observation matrix based on the channel estimation (observation channel) of each channel measurement, to jointly represent the measurement result of the multiple channel measurements.

For example, the equivalent channel for the $l^{th}$ channel measurement may be expressed as $H_{eq}(\tilde{\mu}_l)$ based on the extended reflection vector $\tilde{\mu}_l$ (e.g., in the form of Equation (6)). The channel estimation acquired by the acquisition unit

410 may be expressed as an observed channel $\hat{H}_{eq}(\tilde{\mu}_l)$ of the equivalent channel $H_{eq}(\tilde{\mu}_l)$. For example, the channel estimation determining module 422 may acquire the following observation matrix A with observation channels obtained by the L channel measurements as rows, to jointly represent the channel estimation of the multiple channel measurements.

$$A = \begin{bmatrix} \hat{H}_{eq}(\tilde{\mu}_1) \\ \vdots \\ \hat{H}_{eq}(\tilde{\mu}_L) \end{bmatrix} \tag{8}$$

The channel estimation determining module 422 may multiply the inverse matrix of the training matrix constructed in the above manner by the observation matrix to obtain the multiple integrated sub-channels independent of the intelligent reflecting surface. Next, the principle on which this multiplication is based and details of its implementation are described.

For the $l^{th}$ channel measurement, the extended reflection vector $\tilde{\mu}_l$ of the form in Equation (4') is substituted into Equation (6) representing the equivalent channel. Further, considering the influence of noise, the channel estimation of the equivalent channel $H_{eq}(\tilde{\mu}_l)$ acquired by the acquisition unit 410 is expressed as the following observation channel $\hat{H}_{eq}(\tilde{\mu}_l)$.

$$\hat{H}_{eq}(\tilde{\mu}_l) = H_{eq}(\tilde{\mu}_l) + Z_l = (\tilde{\mu}_l^T \otimes I_{N_r})[H_0^T \ldots H_M^T]^T + Z_l \tag{9}$$

In Equation (9), $Z_l$ represents noise of the second communication device at the receiving end. As previously described with reference to Equation (6), $I_{N_r}$ is an identity matrix of size $N_r$, and $$H_0^T \ldots H_M^T$$

represents (M+1) integrated sub-channels, where each integrated sub-channel $H_m$ is defined as previously described in Equation (5) (where m=0, 1, . . . , M). In actual processing, each integrated sub-channel may be simply represented as an $N_r*N_t$ channel matrix, where $N_r$ represents the number of antennas of the second communication device, and $N_t$ represents the number of antennas of the first communication device.

All L observation channels are jointly expressed according to the above Equation (9), to obtain the following equation (10).

$$\begin{bmatrix} \hat{H}_{eq}(\tilde{\mu}_1) \\ \vdots \\ \hat{H}_{eq}(\tilde{\mu}_L) \end{bmatrix} = \left( \begin{bmatrix} \tilde{\mu}_1^T \\ \vdots \\ \tilde{\mu}_L^T \end{bmatrix} \otimes I_{N_r} \right) \begin{bmatrix} H_0 \\ \vdots \\ H_m \end{bmatrix} + \begin{bmatrix} Z_1 \\ \vdots \\ Z_L \end{bmatrix} \tag{10}$$

The training matrix $\Sigma$ and the observation matrix A constructed according to the above Equations (7) and (8) respectively are substituted into Equation (10) to obtain the relationship among the observation matrix A, the training matrix $\Sigma$ and the integrated sub-channels $H_0$ . . . $H_M$ as follows.

$$A = \left( \sum\nolimits^T \otimes I_{N_r} \right) \begin{bmatrix} H_0 \\ \vdots \\ H_m \end{bmatrix} + \begin{bmatrix} Z_1 \\ \vdots \\ Z_L \end{bmatrix} \tag{11}$$

For the above Equation (11), the channel estimation determining module 422 may left-multiply both sides of the Equation by a pseudo-inverse matrix $(\Sigma^*\Sigma^T)^{-1}\Sigma^*$ of the training matrix $\Sigma$, i.e., multiply the (pseudo) inverse matrix of the training matrix by the observation matrix A, so as to obtain channel estimation of each integrated sub-channel.

$$\begin{bmatrix} \hat{H}_0 \\ \vdots \\ \hat{H}_m \end{bmatrix} = \left( \sum\nolimits^* \sum\nolimits^T \right)^{-1} \sum\nolimits^* A = \begin{bmatrix} H_0 \\ \vdots \\ H_m \end{bmatrix} + \begin{bmatrix} \tilde{Z}_1 \\ \vdots \\ \tilde{Z}_L \end{bmatrix} \tag{12}$$

In Equation (12), $\tilde{Z}_l$ represents equivalent noise. It can be seen from Equation (12) that in an ideal case where no noise exists, i.e., in a case of $\tilde{Z}_l=0$, the channel estimation $\hat{H}_m$ (where m=0, 1, . . . M) of the integrated sub-channel obtained by the channel estimation determining module 422 in the above manner is equal to a true value $H_m$ of the integrated sub-channel.

Here, the number of channel measurements or the number L of sets of reflection parameters is set to be greater than or equal to the number M+1 of integrated sub-channels. It should be understood that L≥M+1 measurement results are obtained in order to obtain the M+1 integrated sub-channels. In addition, in Equation (12), since the training matrix $\Sigma$ itself is not necessarily a square matrix, the pseudo-inverse matrix $(\Sigma^*\Sigma^T)^{-1}\Sigma^*$ is adopted for matrix multiplication. In order to ensure the existence of the pseudo-inverse matrix of the training matrix $\Sigma$, a product $(\Sigma^*\Sigma^T)$ of a conjugate transpose matrix $\Sigma^*$ and a transpose matrix $\Sigma^T$ of the training matrix $\Sigma$ is reversible. For this reason, it is required that the training matrix $\Sigma$ constructed from Equation (7) based on the multiple extended reflection vectors is of full row rank, that is, rank$(\Sigma^*\Sigma^T)$=M+1. This actually imposes requirements on the reflection parameters utilized in channel measurement, e.g., generated by the reflection parameter determining module 421 of the determination unit 420, and an example of determining reflection parameters meeting the requirements is described later.

In the examples above, the reflection parameters employed did not involve phase modulation. Therefore, the reflection parameters, for example, generated by the reflection parameter determining module 421 have the form of Equation (1), such that the extended reflection vector and the training matrix have the form of Equations (4') and (7) respectively. In the case that the reflection parameters involve both amplitude and phase modulation, each reflection parameter generated by the reflection parameter determining module 421 may correspond to an amplitude modulation coefficient. Thus, each reflection parameter in the reflection vector of Equation (4') may be changed into $a_{m,l}e^{j\omega_{m,l}}$ by adding an amplitude modulation coefficient $a_{m,l}$ (where m=1, 2, . . . , M, and l=1, 2, . . . , L). In addition, the predetermined constant added to Equation (4') in order to obtain the extended reflection vector may be of any value rather than limited to 1. Correspondingly, each reflection parameter in the training matrix of Equation (7) also becomes the form $a_{m,l}e^{j\omega_{m,l}}$ with the amplitude modulation coefficient, and the predetermined constant in the first row may be any value rather than limited to 1. Further, the content in this example is similarly applicable to the case where the reflection parameters involve both amplitude modulation and phase modulation, i.e., the process of solving the integrated sub-channels from Equations (8) to (12) is also applicable to the case.

In the manner described above, the channel estimation determining module 422 of the determination unit 420 may construct the training matrix based on the extended reflection vectors that are obtained based on multiple sets of reflection parameters (e.g., generated by the reflection parameter determining module 421 and applied to channel measurement), and multiply the inverse matrix (including a pseudo-inverse matrix) of the training matrix by the observation matrix constructed based on multiple channel estimations (observation channels), so as to determine a channel matrix of each integrated sub-channel. The integrated sub-channel determined in this manner has nothing to do with the reflection parameters of the intelligent reflecting surface, and can be advantageously utilized in various subsequent processing such as precoding, and this application is described in detail in the second embodiment later.

On the basis of the example of joint processing performed by the determination unit 420 described above, those skilled in the art may make appropriate modifications and variations, as long as the training matrix is constructed based on the reflection parameters, and the inverse matrix (including the pseudo-inverse matrix) of the training matrix is multiplied by the observation matrix constructed based on multiple channel estimations (observation channels) to obtain the equivalent sub-channel.

Example of Reflection Parameters Utilized in Channel Measurement

As mentioned above, the intelligent reflecting surface utilizes a set of M reflection parameters corresponding to the M reflection elements included in the intelligent reflecting surface in each channel measurement. These reflection parameters may be determined by the reflection parameter determining module 421 optionally included in the determination unit 420 of the electronic device 400, and the electronic device 400 may properly provide control information about reflection parameters to the intelligent reflecting surface.

As an example, the M reflection parameters utilized in each channel measurement determined by the reflection parameter determining module 421 may be randomly generated. For example, the intelligent reflecting surface only performs phase modulation, the M reflection parameters utilized in each channel measurement determined by the reflection parameter determining module 421 may have the form of the diagonal elements $e^{j\omega_m}$ in Equation (1) (i.e., the modulus is 1), and $\omega_m$ may be a random number (where m=1, 2, . . . , M).

As described above in the example of the joint processing performed by the determination unit, it is desirable to perform L≥M+1 channel measurements to obtain greater than or equal to M+1 channel estimations of the equivalent channel. Further, it is desirable that, for example, the training matrix Σ, constructed from Equation (7) based on the L extended reflection vectors obtained from Equation (4') based on L sets of reflection parameters, is full row rank, so that the determination unit (for example, by the channel estimation determining module 422) calculates the M+1 integrated sub-channels based on the (pseudo) inverse matrix of the training matrix Σ. Therefore, the reflection parameter determining module 421 uniformly determines the L sets of reflection parameters that meet the above requirements, so as to be utilized by the intelligent reflecting surface in L≥M+1 channel measurements.

As an example, referring to the (M+1)×L training matrix Σ shown in Equation (7), the reflection parameter determining module 422 may determine reflection parameters in a manner to determine Σ by determining each matrix element of the matrix. In the determined training matrix Σ, the $l^{th}$ column is equivalent to the $l^{th}$ extended reflection vector (where l=1, 2, . . . , L), and the 2nd to $(M+1)^{th}$ matrix elements $[\Sigma]_{k,l}$ (k=2, 3, . . . , M+1) in the $l^{th}$ column is the set of M reflection parameters to be utilized in the $l^{th}$ channel measurement.

For example, the reflection parameter determining module 421 may adopt a heuristic design for the training matrix Σ. For example, each element $[\Sigma]_{k,l}$ (k=1, 2, . . . , M+1, and l=1, 2, . . . , L) of the training matrix Σ may be determined as follows.

$$[\textstyle\sum]_{k,l} = \begin{cases} 1, & k \le l \\ -1, & k > l \end{cases} \tag{13}$$

The $l^{th}$ column in the above training matrix Σ is equivalent to the $l^{th}$ extended reflection vector. The reflection parameter determining module 421 may determine the second to M+1 matrix elements of this column as M reflection parameters to be utilized in the $l^{th}$ channel measurement.

In addition, the reflection parameter determining module 421 may also adopt a Hadamard matrix design for the training matrix Σ, for example. For example, values of the M reflection parameters utilized in each reflection may be selected from M matrix elements except a first row among matrix elements of an L-order Hadamard matrix.

Here, a brief introduction to the Hadamard matrix is given. Without loss of generality, in a case of $L=2^B$ (B is a natural number greater than 1), the Hadamard matrix may be constructed as follows.

$$G_2 = \begin{bmatrix} 1 & 1 \\ 1 & -1 \end{bmatrix}, G_{2^B} = \begin{bmatrix} G_{2^{B-1}} & G_{2^{B-1}} \\ G_{2^{B-1}} & -G_{2^{B-1}} \end{bmatrix} \tag{14}$$

For example, the L-order Hadamard matrix is recorded as $G_L$, and the reflection parameter determining module 421 determines the training matrix Σ based on $G_L$ by: determining the first row of $G_L$ as a first row of 2, and determining other different M rows of $G_L$ than the first row as the second row to the $(M+1)^{th}$ row of Σ. The $l^{th}$ column of the training matrix Σ obtained in this way is equivalent to the $l^{th}$ extended reflection vector (l=1, 2, . . . , L). The reflection parameter determining module 421 determines the second to $(M+1)^{th}$ matrix elements in this column as the M reflection parameters to be utilized in the $l^{th}$ channel measurement.

As another example, the reflection parameter determining module 421 may adopt a discrete Fourier transform (DFT) design for the training matrix Σ. For example, values of the M reflection parameters utilized in each reflection may be selected from M matrix elements except a first row among matrix elements of an L-order discrete Fourier transform matrix.

The L-order DFT matrix is represented as $F_L$, and an element of the $c^{th}$ row and $l^{th}$ column of $F_L$ (where c=1, 2, . . . , C, where C≥M+1, and l=1, 2, . . . , L) is defined as follows.

$$[F_L]_{c,l} = e^{-j2\pi \frac{(c-1)(l-1)}{L}} \qquad (15)$$

The reflection parameter determining module 421 determines the training matrix $\Sigma$ based on $F_L$ by determining a first row of $F_L$ as a first row of $\Sigma$, and determining other different M rows of $F_L$ that the first row as the second row to the $(M+1)^{th}$ row of $\Sigma$. The $l^{th}$ column of the training matrix $\Sigma$ obtained in this way is equivalent to the $l^{th}$ extended reflection vector $(l=1, 2, \ldots, L)$. The reflection parameter determining module 421 determines the second to $(M+1)^{th}$ matrix elements in this column as the M reflection parameters to be utilized in the $l^{th}$ channel measurement.

In the example above, the training matrix is described in such a way that the reflection parameters did not involve phase modulation. Each element in the matrix therefore has a modulus of 1, i.e., each matrix element in rows 2 to M+1 has the form $e^{j\omega_{k,l}}$ (where $k=2, 3 \ldots, M+1$, and $l=1, 2 \ldots, L$) (the matrices given by Equations (13)-(15) are special cases for this case). In a case that reflection parameters involve both amplitude modulation and phase modulation, an amplitude modulation coefficient is added to each matrix element in the 2nd to M+1 rows of such a training matrix, so that the matrix element becomes $a_{k,l}e^{j\omega_{k,l}}$ (where $k=2, 3 \ldots, M+1$, and $l=1, 2 \ldots, L$). Accordingly, a training matrix involving both amplitude modulation and phase modulation is obtained.

The simulation is performed for various reflection parameters of the above settings (with the random design scheme, the heuristic design scheme based on Equation (13), the Hadamard matrix design scheme based on Equation (14) and the DFT matrix design scheme based on Equation (15)), to determine a mean square error (MSE) between estimated and true values of the integrated sub-channel at various transmit powers (limited to 0 to 20 dBm). In this example, both the BS as the first communication device and the UE as the second communication device each adopt a 2×2 uniform planar antenna array. The intelligent reflecting surface IRS is an 8×8 uniform planar array. All arrays have a spacing of half a wavelength between elements. The simulation adopts the Rice channel model, and the Rice factor is 10 dB. A channel $H_0$ from BS to UE, a channel $H_t$ from BS to IRS, and a channel $H_r$ from IRS to UE are shown, for example, in FIG. 3. Therefore, the truth value of the integrated sub-channel is obtained based on $H_0$, $H_t$ and $H_r$ from Equation (5) described above. It is found from the simulation that various schemes conforming to the design principle (L≥M+1 and $\Sigma$ is of full row rank) of $(M+1)\times L$ training matrix $\Sigma$ can obtain good estimation performance. The MSE between the estimated value and the true value of the integrated sub-channel is very small (less than −70 dB) under the constraint on the transmit power of 0 to 20 dBm, which shows that the proposed sub-channel estimation is feasible. Further, under the constraint on the transmit power of 0 to 20 dBm, the MSE for the heuristic design scheme based on Equation (13) drops from −92 dB to −102 dB approximately, having better performance than the MSE of the random design scheme (from −78 dB to −85 dB approximately). The MSE for both the Hadamard matrix based on Equation (14) and the DFT matrix based on Equation (15) drops from −110 dB to −130 dB approximately, i.e., having the best performance. The reason for the excellent performance of these two schemes is that the DFT matrix and Hadamard matrix are both unitary matrices, and there exists no problem of amplifying noise when performing operations in Equation (12).

Examples of reflection parameters utilized in channel measurement are given above. On this basis, those skilled in the art may make appropriate modifications and variations, as long as the training matrix is constructed based on each set of reflection parameters and the inverse matrix (pseudo-inverse matrix) of such a training matrix is obtained, so as to be processed together with the observation matrix constructed based on multiple channel estimations (observation channels) to obtain the equivalent subchannel.

(Supplementary Example for Determination Unit to Restore Full Channel)

In this supplementary example, for example, after the integrated sub-channels are determined as described above, in view of the relationship between the integrated sub-channels and the actual channels (for example, refer to the previous Equations (2)-(6)), the determination unit further restores, by performing appropriate additional processing and based on the integrated sub-channels, the channel $H_0$ from the first communication device BS to the second communication device UE, the channel $H_t$ from the first communication device BS to the intelligent reflecting surface IRS (which has a reflection matrix $\Lambda$), and the channel $H_r$ from the intelligent reflecting surface IRS to the second communication device UE as shown in FIG. 3. In this supplementary example, the channels shown in FIG. 3 may be referred to as a direct channel $H_0$, an incident channel $H_t$, and a reflection channel $H_r$ respectively, and collectively referred to as full channels. As described before, the first link $H_0$ ("direct link") from the BS to the UE is formed through the direct channel $H_0$. The second link $H_r\Lambda H_t$ ("reflection link") from the BS to the UE via the IRS is formed by the incident channel $H_t$ and the channel $H_t$ of the intelligent reflecting surface IRS (with a reflection matrix $\Lambda$).

First, for the convenience of description, referring back to the integrated sub-channel $H_m$ described in Equation (5) above, $r_m = [H_r]_{(:,m)}$ is defined to represent the $m^{th}$ column of the reflection channel $$H_r, \text{ and } t_m^T = [H_t]_{(m,:)}$$

is defined to represent the $m^{th}$ row of the incident channel $H_t$. Then, Equation (5) is converted into the following form.

$$H_m = \begin{cases} H_0, & m = 0 \\ r_m t_m^T, & m = 1, \ldots, M \end{cases} \qquad (5\text{-}1)$$

Here, it is considered that M+1 integrated sub-channels $H_m$ have been estimated in the manner described above, where $m = 0 \ldots, M$.

As mentioned above, in the determined channel matrix of M+1 integrated sub-channels, the integrated sub-channel $H_0$ represents the first link (direct link) from the first communication device BS to the second communication device UE. The other M integrated sub-channels $H_m$ ($m = 1 \ldots, M$) together with the reflection parameters of the intelligent reflecting surface IRS (i.e., the previously described reflection matrix $\Lambda$) represent the second link (reflection link) from the first communication device BS to the second communication device UE via the intelligent reflecting surface IRS.

Among the M+1 integrated sub-channels, on the one hand, the determination unit may determine a channel matrix representing the integrated sub-channel $H_0$ of the first link as the channel matrix of the first channel (direct channel) $H_0$ from the first communication device BS to the second communication device UE.

On the other hand, the determination unit may determine, based on an eigenvector of a transposed matrix of the channel matrix of the M integrated sub-channels $H_m$ (m=1 . . . , M), the channel matrix of the second channel (incident channel) $H_t$ from the first communication device BS to the intelligent reflection surface IRS, and determine, based on an eigenvector of the channel matrix of the M integrated sub-channels $H_m$ (m=1 . . . , M), an channel matrix of the third channel (reflection channel) $H_r$ from the intelligent reflecting surface IRS to the second communication device UE.

The reflection channel $H_r$ is restored based on the eigenvector of the channel matrix of the M integrated sub-channels $H_m$ (m=1 . . . , M) as follows. An $N_r \times M$ matrix $A$ is constructed (where $N_r$ represents the number of antennas of the second communication device UE). $a_m$ represents an $m^{th}$ column of A, and m=1 . . . , M. The first column of $H_m$ serves as the $m^{th}$ column of A, that is, $a_m=[H_m]_{(:,1)}$. The matrix A constructed in this way may serve as the reflection channel $H_r$.

In addition, the incident channel $H_t$ is restored based on the eigenvector of the transposed matrix of the channel matrix of the M integrated sub-channels $H_m$ (m=1 . . . , M) as follows. First, an $M \times N_t$ matrix B is constructed (where $N_t$ represents the number of antennas of the first communication device BS).

$$b_m^T$$

represents an $m^{th}$ row of B, and m=1 . . . , M. The first row of $H_m$ serves as the $m^{th}$ row of B, that is, $$b_m^T = [H_m]_{(1,:)}.$$

The matrix B constructed in this way may serve as the incident channel $H_t$.

Optionally, in order to eliminate influence caused by a coefficient change in the matrix transformation, an $M \times M$ diagonal matrix is constructed as a bias, in which M diagonal elements are the elements $[H_m]_{(1,1)}$ at a position (1,1) of the channel matrix of the M integrated sub-channels $H_m$ (m=1 . . . , M). In a preferred example, a product of the diagonal matrix as the bias and the matrix B is determined as the incident channel $H_t$, as shown in the following Equation (5-2).

$$H_t = \begin{bmatrix} [H_1]_{(1,1)} & \cdots & 0 \\ \vdots & \ddots & \vdots \\ 0 & \cdots & [H_M]_{(1,1)} \end{bmatrix} B \qquad (5\text{-}2)$$

For example, the full channels, that is, the direct channel $H_0$, the incident channel $H_t$, and the reflection channel $H_r$ are restored based on the integrated sub-channels, as described above. Those skilled in the art should understand that the full channel restored based on the integrated sub-channel may be applied to various processing similarly to the channel obtained by existing measurement (such as direct measurement), and details are not described herein.

For ease of understanding, the following outlines the mathematical principles of the process of storing a full channel based on individual integrated sub-channels.

In a case of m=1 . . . , M, Equation (5-2) is converted as follows.

$$H_m = r_m t_m^T \begin{bmatrix} | & \cdots & | \\ t_{m,1} r_m & \cdots & t_{m,M} r_m \\ | & \cdots & | \end{bmatrix} \qquad (5\text{-}3)$$

Here, $t_{m,k}$ represents a $k^{th}$ element (k=1 . . . , M) of a row vector $$t_m^T,$$

that is, $$t_m^T = [t_{m1} \ldots t_{mM}].$$

$t_{m,k}$ is also an element of the matrix $H_t$ at a position (m, k), that is, $t_{m,k}=[H_t]_{m,k}$. It can be seen that each column of $H_m$ is a multiple of $r_m$, and $r_m$ is the $m^{th}$ column of $H_r$. Therefore, the first column $t_{m,1} r_m$ of $H_m$ is directly extracted as the $m^{th}$ column of $H_r$. For each $H_m$, m=1 . . . , M, the operation is performed, so as to obtain an estimated reflection channel $\hat{R}$ with multiplier ambiguity as follows.

$$\hat{R} = \begin{bmatrix} | & \cdots & | \\ t_{1,1} r_1 & \cdots & t_{M,1} r_M \\ | & \cdots & | \end{bmatrix} = \begin{bmatrix} | & \cdots & | \\ r_1 & \cdots & r_M \\ | & \cdots & | \end{bmatrix} \begin{bmatrix} t_{1,1} & \cdots & 0 \\ \vdots & \ddots & \vdots \\ 0 & \cdots & t_{M,1} \end{bmatrix} = H_r \qquad (5\text{-}4)$$

$$\begin{bmatrix} t_{1,1} & \cdots & 0 \\ \vdots & \ddots & \vdots \\ 0 & \cdots & t_{M,1} \end{bmatrix}$$

From the above Equation, it can be seen that the estimated reflection channel $\hat{R}$ is not exactly the same as the reflection channel $H_r$. The estimated reflection channel $\hat{R}$ involves a scaling transformation represented by the diagonal matrix of the following Equation (5-5).

$$\begin{bmatrix} t_{1,1} & \cdots & 0 \\ \vdots & \ddots & \vdots \\ 0 & \cdots & t_{M,1} \end{bmatrix} \qquad (5\text{-}5)$$

Similarly, $r_{k,m}$ represents a $k^{th}$ element (k=1 . . . , M) of a row vector $r_m$, that is, $r_m=[r_{1,m} \ldots r_{M,m}]^T$. $r_{k,m}$ is also an element of the matrix $H_r$ at a position (k, m), that is, $r_{k,m}=[H_r]_{k,m}$. It can be seen that each row of $H_m$ is a multiple of $$t_m^T,$$

and $$t_m^T$$

is the $m^{th}$ row of $H_r$. Therefore, the first row $$r_{1,m}t_m^T$$

of $H_m$ is directly extracted as the $m^{th}$ row of $H_r$. For each $H_m$, m=1 . . . , M, the operation is performed, so as to obtain an estimated incident channel $\hat{T}$ with multiplier ambiguity as follows.

$$\hat{T} = \begin{bmatrix} - & r_{1,1}t_1^T & - \\ \vdots & \vdots & \vdots \\ - & r_{1,M}t_M^T & - \end{bmatrix} = \begin{bmatrix} r_{1,M} & \cdots & 0 \\ \vdots & \ddots & \vdots \\ 0 & \cdots & r_{M,m} \end{bmatrix}\begin{bmatrix} - & t_1^T & - \\ \vdots & \vdots & \vdots \\ - & t_M^T & - \end{bmatrix} = \qquad (5\text{-}6)$$

$$\begin{bmatrix} r_{1,1} & \cdots & 0 \\ \vdots & \ddots & \vdots \\ 0 & \cdots & r_{1,M} \end{bmatrix}H_t$$

From the above Equation, it can be seen that the estimated incident channel $\hat{T}$ is not exactly the same as the incident channel $H_r$. The estimated incident channel $\hat{T}$ involves a scaling transformation represented by the diagonal matrix of the following expression (5-7).

$$\begin{bmatrix} r_{1,1} & \cdots & 0 \\ \vdots & \ddots & \vdots \\ 0 & \cdots & r_{1,M} \end{bmatrix} \qquad (5\text{-}7)$$

The following relationship can be seen from the expressions of $\hat{R}$ and $\hat{T}$.

$$\hat{R}\Lambda\hat{T} = H_r\begin{bmatrix} t_{1,1} & \cdots & 0 \\ \vdots & \ddots & \vdots \\ 0 & \cdots & t_{M,1} \end{bmatrix}\Lambda\begin{bmatrix} r_{1,1} & \cdots & 0 \\ \vdots & \ddots & \vdots \\ 0 & \cdots & r_{1,M} \end{bmatrix}H_t \ne H_r\Lambda H_t \qquad (5\text{-}8)$$

That is, the estimated reflection link $\hat{R}\Lambda\hat{T}$, which is the estimation of the "reflection link" $H_r\Lambda H_t$, is not the same as the reflection link $H_r\Lambda H_t$. The multiplier ambiguity, that is, the influence caused by the diagonal matrices of Equations (5-5) and (5-6), is eliminated in order to make the estimated reflection link RAT the same as the reflection link $H_r\Lambda H_t$. That is, the influence of the diagonal matrix expressed by the following expression (5-9) is eliminated.

$$\begin{bmatrix} t_{1,1} & \cdots & 0 \\ \vdots & \ddots & \vdots \\ 0 & \cdots & t_{M,1} \end{bmatrix}\begin{bmatrix} r_{1,1} & \cdots & 0 \\ \vdots & \ddots & \vdots \\ 0 & \cdots & r_{1,M} \end{bmatrix} = \begin{bmatrix} r_{1,1}t_{1,1} & \cdots & 0 \\ \vdots & \ddots & \vdots \\ 0 & \cdots & r_{1,M}t_{M,1} \end{bmatrix} \qquad (5\text{-}9)$$

Here, it can be found that the diagonal element $r_{1,m}t_{m,1}$, representing the multiplier ambiguity in Equation (5-9) is exactly the element at a position (1,1) of the sub-Therefore, after $\hat{R}$ and $\hat{T}$ are constructed, the diagonal matrix represented by Equation (5-9) serving as the bias (that is, the diagonal matrix in Equation (5-2) above) is multiplied by $\hat{T}$, so as to eliminate the influence of multiplier ambiguity. In other words, the estimated reflection channel $\hat{R}$ constructed in the above manner may be determined as the reflection channel $H_r$, the diagonal matrix represented by Equation (5-9) as the bias, for example, multiplied by the estimated incident channel $\hat{T}$ constructed in the above manner as the incident channel $H_r$, so as to obtain the reflected channel $H_r$.

and the incident channel $H_t$ obtained through the restore processing performed by the determination unit in this supplementary example.

For the wireless communication system assisted by an intelligent reflecting surface such as that shown in FIG. 3, the first configuration example of the electronic device according to the first embodiment of the present disclosure and the example of the integrated sub-channel that is applicable to the embodiments of the present disclosure and has nothing to do with the reflection parameters of the intelligent reflecting surface are described above. Further, examples of the processing performed by each unit in the electronic device or examples of the information/data/parameters involved in the processing are described in conjunction with the example of the integrated sub-channel.

As described above, according to the first configuration example of the present embodiment, the channel estimation of integrated sub-channels is obtained based on multiple channel measurements based on the reference signals with multiple sets of reflection parameters. The obtained channel estimation of integrated sub-channels can be advantageously utilized in various subsequent processing, such as precoding, which is to be described in detail later in the second embodiment.

2.2 Second Configuration Example

Figure 6:
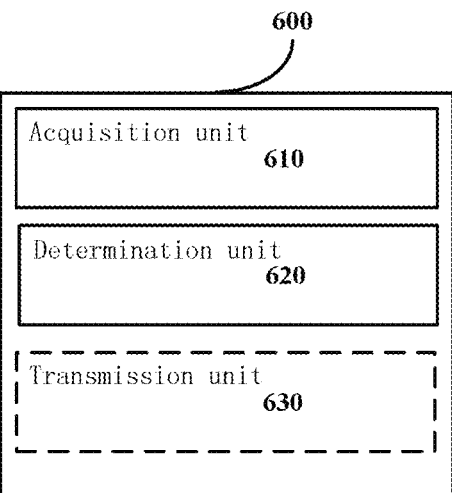
FIG. 6 is a block diagram illustrating a second configuration example of the electronic device according to the first embodiment of the present disclosure.

FIG. 6 is a block diagram showing a second configuration example of the electronic device according to the first embodiment of the present disclosure. The second configuration example shown in FIG. 6 relates to a case where the first configuration example shown in FIG. 4 is implemented in the first communication device, that is, an example in which the electronic device shown in FIG. 4 is included in the first communication device. Therefore, the following description is made on the basis of the first configuration example shown in FIG. 4.

As shown in FIG. 6, the electronic device 600 may include an acquisition unit 610 and a determination unit 620, which are respectively similar to the acquisition unit 410 and the determination unit 420 in the electronic device 400 shown in FIG. 4. In addition, the electronic device 600 further includes a transmission unit 630 configured to transmit a reference signal to the second communication device and the intelligent reflecting surface.

As an example, in a case that the electronic device 600 is a network side device BS such as that shown in FIG. 3, the reference signal sent by the transmission unit 630 may be, for example, a CSI-RS, for the second communication device UE shown in FIG. 3 performs channel measurement on the equivalent channel formed by the direct link and the reflection link based on the reference signal received by the second communication device(that is, a reference signal received directly from the BS and a reflection signal received from the IRS after the IRS modulates the reference signal sent by the BS based on the reflection parameters) and arriving at the UE through the direct link and the reflection link, and acquires channel information about the equivalent channel.

In this example, the acquisition unit 610 may receive, for example, directly from the second communication device, multiple pieces of channel information about an equivalent channel between the electronic device 600 as the first communication device and the second communication device. The multiple pieces of channel information are obtained based on multiple channel measurements of the reference channel sent by the transmission unit 630. As an example, each piece of channel information received may directly be the channel estimation of the equivalent channel, or may be the channel state information (for example, the channel state information returned by the second communication device UE in the form of CSI report shown in FIG. 3) of the equivalent channel obtained by the second communication device. In the latter case, the acquisition unit 610 may be configured to determine multiple channel estimations of the equivalent channel, such as multiple observation channels, in an existing manner based on the acquired multiple pieces of channel information.

The determination unit 620 may determine, by jointly processing, in a manner similar to that of the determination unit 420 in the electronic device 400 of FIG. 4, the multiple sets of reflection parameters utilized in multiple channel measurements and the acquired multiple pieces of channel information, the channel estimations of the multiple integrated sub-channels (independent of the reflection parameters), so as to characterize, together with the reflection parameters of the intelligent reflecting surface, the equivalent channel. Details are not repeated here.

In addition, the determination unit 620 may have an example configuration similar to that of the determination unit 420 shown in FIG. 5. That is, the determination unit 620 may optionally include a reflection parameter determining module and a channel estimation determining module (not shown). In this case, the determination unit 620 of the electronic device 600 as the first communication device may determine the reflection parameters of the intelligent reflecting surface utilized in each measurement through the reflection parameter determining module, and generate control information about the reflection parameters. The electronic device 600 may transmit the control information to the intelligent reflecting surface through the control link, for example, simultaneously with the reference signal via the transmission unit 610, so that the intelligent reflecting surface reflects the reference signal based on corresponding reflection parameters. The control link for transmitting control information between the electronic device 600 serving as the first communication device and the intelligent reflecting surface may be implemented with various existing technologies, which are not limited herein.

The second configuration example of the electronic device according to the first embodiment of the present disclosure has been described above with respect to wireless communication system assisted by the intelligent reflecting surface, for example, as shown in FIG. 3. As described above, in the second configuration example of this embodiment, the first communication device as the transmitting end has the functions of the acquisition unit and the determination unit of the electronic device described in the first configuration example, and the functions of transmitting the reference signal to the second communication device and the intelligent reflecting surface, and optionally functions of directly transmitting the control information about the reflection parameters to the intelligent reflecting surface. In this way, it is unnecessary to provide an electronic device for channel estimation of integrated sub-channels, thereby simplifying system.

2.3 Third Configuration Example

Figure 7:
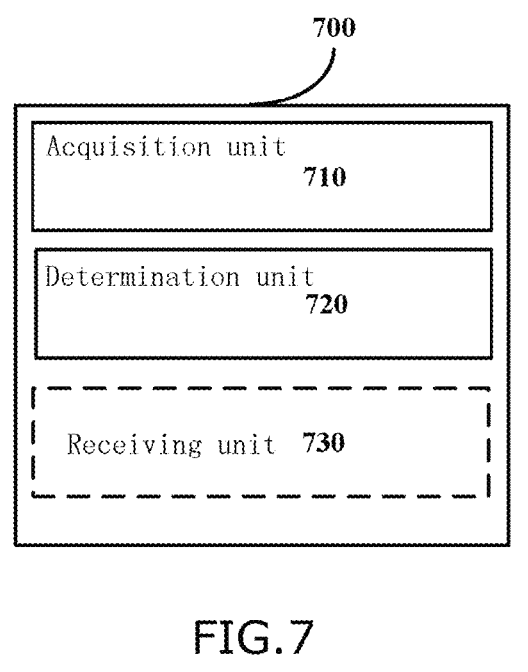

FIG. 7 is a block diagram showing a third configuration example of the electronic device according to the first embodiment of the present disclosure. The third configuration example shown in FIG. 7 relates to a case where the first configuration example shown in FIG. 4 is implemented as the second communication device, that is, an example in which the electronic device shown in FIG. 4 is included in the second communication device. Therefore, the following description is made on the basis of the above first configuration example shown in FIG. 4.

As shown in FIG. 7, the electronic device 700 may include an acquisition unit 710 and a determination unit 720, which are respectively similar to the acquisition unit 710 and the determination unit 720 in the electronic device 400 of FIG. 4. In addition, the electronic device 700 further includes a receiving unit 730 configured to receive a reference signal from the first communication device.

As an example, in a case that the electronic device 700 is the user equipment UE shown in FIG. 3, the reference signal received by the receiving unit 730 may be, for example, a CSI-RS. The acquisition unit 710 performs channel measurement on the equivalent channel formed by the direct link and the reflection link based on the reference signal (that is, the reference signal received directly from the BS and the reflected signal received from the IRS after the IRS modulates the reference signal sent by the BS based on the reflection parameters) received by the receiving unit 730 and arrives at the UE through the direct link and the reflection link, and acquires channel information about the equivalent channel. For example, the channel information obtained by the acquisition unit 710 by measuring the equivalent channel may be a channel estimation (observation channel) of the equivalent channel determined in an existing manner.

The determination unit 720 of the electronic device 700 determines, by jointly processing the multiple sets of reflection parameters utilized in multiple channel measurements and the acquired multiple pieces of channel information in a manner similar to that of the determination unit 420 in the electronic device 400 of FIG. 4, the channel estimations of the multiple integrated sub-channels (independent of the reflection parameters) that can characterize the equivalent channel together with the reflection parameters of the intelligent reflecting surface, and details are not repeated here.

Further, the determination unit 720 may have an example configuration similar to that of the determination unit 420 shown in FIG. 5. That is, the determination unit 720 may optionally include a reflection parameter determining module and a channel estimation determining module (not shown). In this case, the determination unit 720 of the electronic device 700 as the second communication device may determine the reflection parameters of the intelligent reflecting surface utilized in each measurement via the reflection parameter determining module, and generate control information about the reflection parameters. The electronic device 700 may transmit the control information to the first communication device at one time through a transmission unit not shown, for the first communication device to transmit the control information to the intelligent reflecting surface via a control link, for example, simultaneously with the reference signal, so that the intelligent reflecting surface reflects the reference signal based on the corresponding reflection parameters. Alternatively, in the case that the intelligent reflecting surface is equipped with corresponding processing circuitry, the electronic device 700 may directly transmit the control information about the reflection parameters to the intelligent reflecting surface at one time, for subsequent use by the intelligent reflecting surface in each reflection.

The third configuration example of the electronic device according to the first embodiment of the present disclosure has been described above with respect to wireless communication system assisted by the intelligent reflecting surface, for example, as shown in FIG. 3. As described above, in the third configuration example of the present embodiment, the second communication device as the receiving end has the functions of the acquisition unit and determination unit of the electronic device described in the first configuration example, and functions of receiving a reference signal from the first receiving device. In this way, it is unnecessary to provide an electronic device for channel estimation of integrated sub-channels, thereby simplifying system.

2.4 Example of Information Interaction

Next, an example of information interaction in the case that the electronic device of the first embodiment is applied to a wireless communication system assisted by an intelligent reflecting surface is described with reference to FIGS. 8 and 9.

Figure 8:
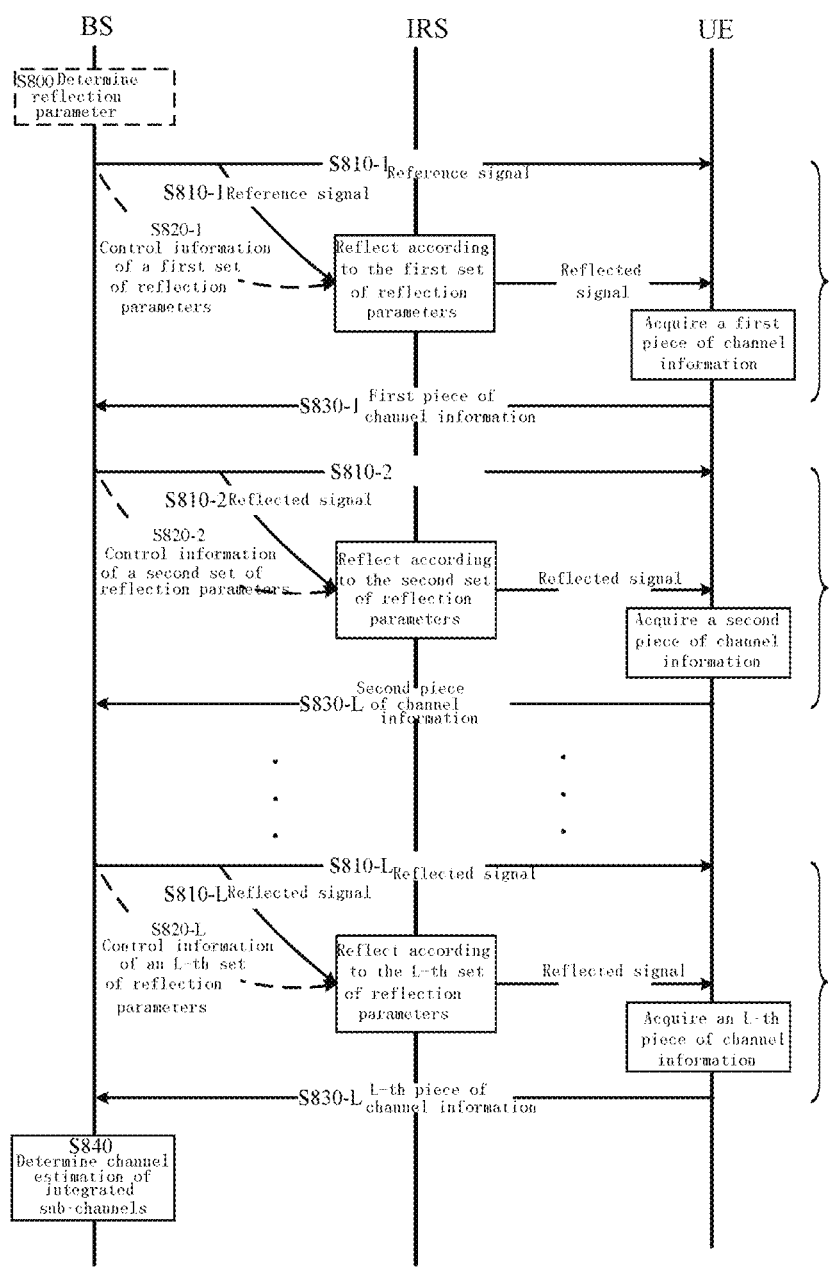
FIG. 8 is a flowchart illustrating an example of an information interaction process according to the first embodiment of the present disclosure.

FIG. 8 is a flowchart showing an example of an information interaction flow according to the first embodiment of the present disclosure.

In this example, the electronic device 600 such as that described with reference to FIG. 6 serves as the first communication device, and is in the form of a network side device BS. The user equipment UE serves as the second communication device. An intelligent reflecting surface IRS is arranged between the BS and the US (that is, the relationship between devices is as shown in FIG. 3). Note that although the interaction between the BS and the UE as the first and second communication devices is described here as an example, it should be understood that the present disclosure is not limited thereto.

As shown in FIG. 8, in step S800, the BS determines L sets of reflection parameters to be utilized in L channel measurements. Next, in step S810-1, the BS transmits a reference signal to the UE and the IRS. In step S820-1, the BS transmits control information about the first set of reflection parameters to the IRS, for example, via a control link, so that the IRS reflects the reference signal based on the received reflection parameters. After receiving the reference signal from the BS and the reflected signal from the IRS, the UE acquires the first piece of channel information of the equivalent channel by appropriate channel measurement (for example, in the existing manner). In step S830-1, the BS acquires the first piece of channel information from the UE. The above steps S810-1, S820-1, and S830-1 may be collectively referred to as the first channel measurement. Multiple channel measurements are performed in this manner until the predetermined L channel measurements are completed (where the processing similar to that in the first channel measurement, for example, the steps S810-2, S820-2, S830-2 . . . S810-L, S820-L, and S830-L, is performed each subsequent channel measurement).

Next, in step S840, the BS determines, by jointly processing the L sets of reflection parameters utilized in the L channel measurements and the acquired L pieces of channel information, channel estimations of the multiple integrated sub-channels (independent of the reflection parameters) that characterize, together with the reflection parameters of the IRS, the equivalent channel.

Figure 9:
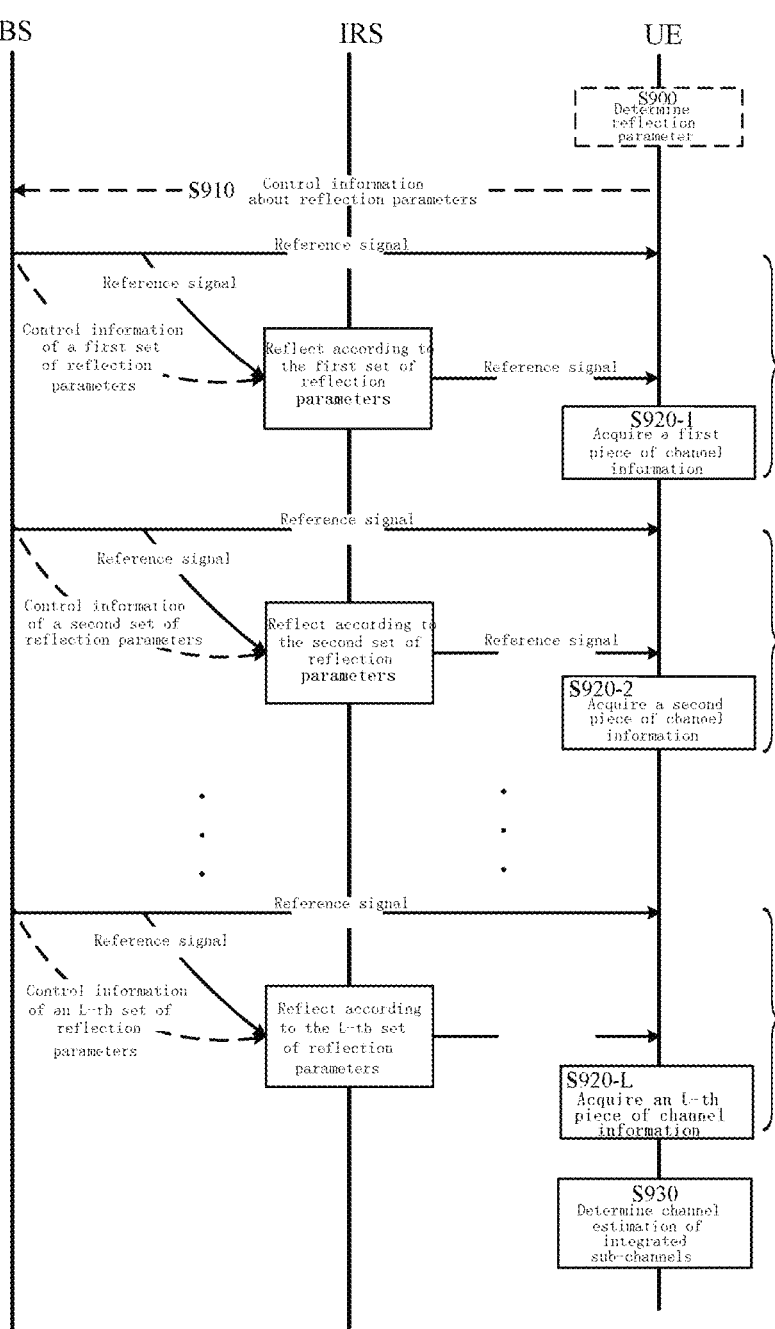
FIG. 9 is a flowchart illustrating another example of the information interaction process according to the first embodiment of the present disclosure.

FIG. 9 is a flowchart showing another example of an information interaction flow according to the first embodiment of the present disclosure.

In this example, the network side device BS serves as the first communication device. The electronic device 700, for example, described with reference to FIG. 7, serves as the second communication device, and is in the form of user equipment UE. An intelligent reflecting surface IRS is arranged between the BS and the US. Note that although the interaction between the BS and the UE as the first and second communication devices is described here as an example, it should be understood that the present disclosure is not limited thereto.

As shown in FIG. 9, in step S900, the UE as the second communication device determines L sets of reflection parameters to be utilized in L channel measurements. Optionally in step S910, the UE transmits control information about reflection parameters to the first communication device BS. Then, the BS transmits the reference signal to the UE and the IRS, and further transmits control information about the first set of reflection parameters to the IRS, e.g., via a control link, so that the IRS reflects the reference signal based on the received reflection parameters. In step S920-1, the UE that has received the reference signal from the BS and the reflected signal from the IRS acquires the first piece of channel information of the equivalent channel by appropriate channel measurement (for example, in the existing manner). The processing after the above step S910 (exclusive) to step S920-1 may be collectively referred to as the first channel measurement. Multiple channel measurements are performed in this manner until the predetermined L channel measurements are completed (where the processing similar to that in the first channel measurement, for example, the steps S910-2 to S910-L is performed in each channel measurement).

Next, in step S930, the UE determines, by jointly processing the L sets of reflection parameters utilized in the L channel measurements and the acquired L pieces of channel information, channel estimations of the multiple integrated sub-channels (independent of the reflection parameters) that characterize, together with the reflection parameters of the IRS, the equivalent channel.

It should be understood that the interaction described above with reference to FIG. 8 and FIG. 9 is only an example, and those skilled in the art may make appropriate modifications to the above interaction according to the principle of the present disclosure.

For example, the positions of BS and UE in FIG. 8 may be interchanged. That is, the UE having a configuration such as the electronic device 600 described with reference to FIG. 6 may serve as the transmitting end, and the BS may serve as the receiving end. Further, the processing of the first communication device may be performed by the UE having a configuration such as the electronic device 600 described with reference to FIG. 6, and the processing of the second communication device may be performed by the BS. Similarly, the positions of BS and UE in FIG. 9 maybe interchanged. That is, the UE serves as the transmitting end, and the BS having a configuration such as the electronic device 700 described with reference to FIG. 7 serves as the receiving end. The processing of the first communication device may be performed by the UE, and the processing of the second communication device may be performed by the BS having a configuration such as the electronic device 700 described with reference to FIG. 7.

In addition, for example, for the example interaction in FIG. 9, an electronic device 400 not shown such as described with reference to FIG. 4 may perform the processing of determining the reflection parameters such as step S900 and the processing of determining the channel estimation of the integrated sub-channel in step S930, and may perform necessary information interaction with the BS and UE shown in FIG. 9 (for example, the electronic device 400 may provide the BS with control information about the reflection parameters in step S910, and additionally acquires L pieces of channel information of the equivalent channel from the UE after step S920-L), which are not repeated here.

3. Configuration Example of Second Embodiment

For the wireless communication system assisted by the intelligent reflecting surface such as that shown in FIG. 3, the reflection parameters for use by the intelligent reflecting surface and a precoding matrix for precoding the data signal of the first communication device are acquired based on the channel estimations of the multiple integrated sub-channels independent of reflection parameters solved by the electronic device according to the first embodiment. Next, a second embodiment of calculating the reflection parameters and the precoding matrix based on the channel estimations of the integrated sub-channels is described.

3.1 First Configuration Example

Figure 10:
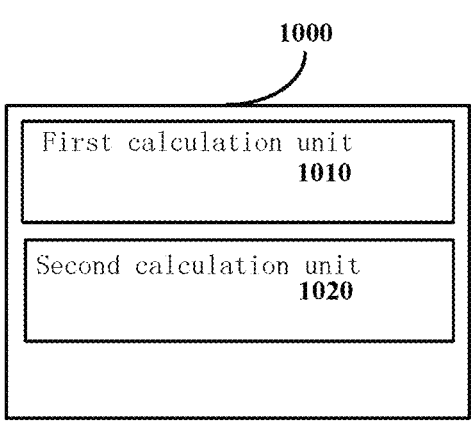
FIG. 10 is a block diagram illustrating a first configuration example of an electronic device according to a second embodiment of the present disclosure.

FIG. 10 is a block diagram showing a first configuration example of an electronic device according to the second embodiment of the present disclosure.

As shown in FIG. 10, the electronic device 1000 may include a first calculation unit 1010 and a second calculation unit 1020. The electronic device 1000 may calculate, through the processing of the two calculation units described later and based on the channel estimations of the multiple integrated sub-channels obtained, for example, by any one of the electronic device 400, the electronic device 600 and the electronic device 700 described above with reference to FIGS. 4 to 7, reflection parameters for use by the intelligent reflecting surface and a precoding matrix for precoding the data signal of the first communication device.

Here, each unit of the electronic device 1000 may be included in the processing circuitry. It should be noted that the electronic device 1000 may include one processing circuitry, or may include multiple processing circuitry. Further, the processing circuitry may include various discrete functional units to perform various functions and/or operations. It should be noted that these functional units may be physical entities or logical entities, and units with different titles may be realized by the same physical entity.

The first calculation unit 1010 of the electronic device 1000 may calculate the first precoding matrix based on, for example, channel estimation of the multiple integrated sub-channels obtained by any one of the electronic devices 400, 600, and 700 described above with reference to FIGS. 4 to 7.

As mentioned above, based on the proposed inventive concept of channel reformation, the channel between the first communication device and the second communication device in the wireless communication system assisted by the intelligent reflecting surface as shown in FIG. 3 can be reformed into multiple integrated sub-channels that have nothing to do with reflection parameters. The integrated sub-channels together with the reflection parameters of the intelligent reflecting surface represent the entire equivalent channel. Therefore, in calculation of the precoding matrix for the data signal of the first communication device, the electronic device 1000 may not consider the influence of the reflection parameters of the intelligent reflecting surface first. Instead, the electronic device 1000 first considers the multiple integrated sub-channels as effective channels in the sense of precoding through the processing of the first calculation unit 1010, and calculates the first precoding matrix based on channel estimations of these integrated sub-channels.

The first calculation unit 1010 may calculate the first precoding matrix based on the channel estimations of the integrated sub-channels in various existing manners, so as to optimize system performance. For example, the first calculation unit 1010 may determine the first precoding matrix by maximizing the capacity of an equivalent channel of the multiple integrated subchannels after precoding the data signal to be transmitted with the first precoding matrix.

The second calculation unit 1020 of the electronic device 1000 may calculate reflection parameters of the intelligent reflecting surface and a second precoding matrix (a precoding matrix for the data signal of the first communication device) of the first communication device based on the first precoding matrix calculated by the first calculation unit 1010 in the above manner, so that an equivalent precoding matrix generated based on the calculated reflection coefficients and the second precoding matrix is similar to the first precoding matrix. The reflection parameters calculated by the second calculation unit 1020 may include, for example, amplitude modification parameters for amplitude modification and/or phase modification parameters for phase modification by each reflection unit of the intelligent reflecting surface.

Here, after the first calculation unit 1010 calculates the first precoding matrix for the multiple integrated sub-channels (equivalent channels in the sense of precoding) by excluding the influence of the reflection parameters of the intelligent reflecting surface, the second calculation unit 1020 of the electronic device 1000 generates the equivalent precoding matrix based on the to be determined reflection parameters of the intelligent reflecting surface and the to be determined second precoding matrix of the first communication device, and determines the values of the reflection parameters of the intelligent reflecting surface and the second precoding matrix of the first communication device in a case that the generated equivalent precoding matrix is similar to the first precoding matrix.

The reflection parameters of the intelligent reflecting surface and the second precoding matrix of the first communication device determined by the second calculation unit 1020 in the above manner may approximately represent, for example, the first precoding matrix capable of maximizing the capacity of the equivalent channel. Therefore, in a case that the above reflection parameters and the second precoding matrix are applied to the wireless communication system assisted by an intelligent reflecting surface such as that shown in FIG. 3, the capacity of the equivalent channel can also be maximized. In other words, for example, after the first precoding matrix that optimizes the system performance is calculated based on the channel estimations of integrated sub-channels in the various existing manners, the reflection parameters and the second precoding matrix that can approximately represent the first precoding matrix can make the system performance of the wireless communication system assisted by the intelligent reflecting surface similarly optimized.

Next, referring back to the example of the wireless communication system assisted by the intelligent reflecting surface and its equivalent channel shown in FIG. 3 described in <1. Overview>, example processing implemented by each unit of the electronic device 1000 is further described based on the example integrated sub-channels described in (Example of integrated sub-channels) of [2.1 First configuration example] of <2. Configuration example of the first embodiment> earlier.

In the example of FIG. 3, it is assumed that the symbol to be sent by the first communication device BS to the second communication device UE is x (where x is an $N_s \times 1$ vector, and $N_s$ is the number of information streams), the precoding matrix adopted by the first communication device BS (the second precoding matrix of the first communication device) is W (where W is an $N_t \times N_s$ matrix, $N_t$ represents the number of antennas of the first communication device, and $N_s$ represents the number of information streams), and the transmit power is $\rho$. The symbol received by the second communication device UE is $y = y_d + y_r + z$. y is an $N_r \times 1$ vector (where $N_r$ represents the number of antennas of the second communication device). $y_d$ is a part received through the first link (direct link between BS and UE) which is a direct link. $y_r$ is a part received through the second link (the link from the BS to the UE via the IRS) which is a reflection link. z is additive noise of the UE at the receiving end. Based on the above definition, $y_d$ and $y_r$ are expressed as follows.

$$y_d = \sqrt{\rho}\, H_0 Wx \qquad (16)$$

$$y_r = \sqrt{\rho}\, H_r \Lambda H_t Wx \qquad (17)$$

$\Lambda$ is an $M \times M$ diagonal matrix, which represents amplitude and/or phase modulation on the reflection signal performed by the M reflection units of the IRS. Here, the reflection unit of the IRS only performs the phase modulation as an example for description. Therefore, the diagonal matrix $\Lambda$ is in the form of Equation (1) previously described in <1. Overview>, that is, the diagonal element (each reflection parameter) of the diagonal matrix $\Lambda$ adopts the phase modulation coefficient $e^{j\omega_m}$ (m=1, 2 . . . , M) with a modulus of 1. According to Equations (16) and (17), the symbol received by the second communication device UE may be expressed as follows.

$$y = y_d + y_r + z = \sqrt{\rho}\,(H_0 + H_r \Lambda H_t)Wx + z \qquad (18)$$

Based on Equation (2) $H_{eq}(\Lambda) = H_0 + H_r \Lambda H_t$ previously described in <1. Overview>, Equation (18) may be converted into the following Equation (19).

$$y = \sqrt{\rho}\, H_{eq}(\Lambda)Wx + z \qquad (19)$$

For a MIMO system, the precoding performance is usually measured by the capacity of an equivalent channel after precoding. Based on the above equation (19), the capacity of the equivalent channel after precoding can be expressed as follows.

$$C_{IRS-MIMO}(\Lambda, M) = \log_2\, \det\!\left(I_{N_r} + \frac{\rho}{\sigma^2}(H_{eq}(\Lambda))^H W^H W H_{eq}(\Lambda)\right) \qquad (20)$$

$I_{N_r}$ is an identity matrix of size $N_r$. $\sigma^2$ is noise power. $N_r$ represents the number of antennas of the second communication device UE. The various processing performed by the first calculation unit 1010 and the second calculation unit 1020 of the electronic device 1000 is to calculate, based on channel estimations of the multiple integrated sub-channels obtained, for example, by any one of the electronic devices 400, 600, and 700 described above with reference to FIGS. 4 to 7, the reflection parameters ($\Lambda$) of the intelligent reflecting surface and the second precoding matrix (W) of the first communication device, so as to maximize $C_{IRS-MIMO}$ ($\Lambda$, W).

Here, the (M+1) integration sub-channels $H_m$ previously described with reference to Equation (5) in the first configuration example of <2. Configuration example of the first embodiment> serve as the multiple integration sub-channels (m=0, 1, 2 . . . , M). Each integrated sub-channel $H_m$ has a matrix form of $N_r \times N_t$. $N_r$ represents the number of antennas of the second communication device. $N_t$ represents the number of antennas of the first communication device. These integrated sub-channels are considered to represent the capacity of the equivalent channel shown in Equation (20).

Based on such (M+1) integrated sub-channels $H_m$, the equivalent channel may have the form of Equation (6) in the first configuration example of <2. Configuration example of the first embodiment>, that is, $$H_{eq}(\tilde{\mu}) = \left(\tilde{\mu}^T \otimes I_{N_r}\right)\left[H_0^T \ldots H_M^T\right]^T.$$

$\tilde{\mu}$ is an extended reflection vector obtained by adding a predetermined constant to the set of reflection parameters utilized by the intelligent reflecting surface in one reflection. In this example, the reflection parameters do not involve phase modulation (i.e., the reflection parameters have a modulus of 1). Therefore, the extended reflection vector $\tilde{\mu}$ has, for example, the form $\tilde{\mu} = [1, e^{j\omega_1}, \ldots, e^{j\omega_M}]^T$ shown in Equation (4) in the first configuration example of <2. Configuration example of the first embodiment>.

The equivalent channel $H_{eq}(\tilde{\mu})$ based on the extended reflection vector $\tilde{\mu}$ is substituted into Equation (20), and the equivalent channel may be capacitated as follows.

$$C_{IRS-MIMO}(\tilde{\mu}, W) = \log_2\, \det\!\left(I_{N_r} + \frac{\rho}{\sigma^2}H_{eff}(\tilde{\mu} \otimes W)(\tilde{\mu} \otimes W)^H H_{eff}^H\right) \qquad (21)$$

$$C_{IRS-MIMO}(\tilde{\mu} \otimes W) = \log_2\, \det\!\left(I_{N_r} + \frac{\rho}{\sigma^2}H_{eff}(\tilde{\mu} \otimes W)(\tilde{\mu} \otimes W)^H H_{eff}^H\right) \qquad (21')$$

$H_{eff} = [H_0 \ldots H_M]$ may be regarded as an effective channel in the sense of precoding. Next, the channel estimation of the effective channel determined based on the channel estimation of the multiple integrated sub-channels obtained by one of the electronic devices 400, 600, and 700 in the first embodiment is substituted into the above Equation (21') to obtain the Equation (22).

$$C_{IRS-MIMO}(\tilde{\mu} \otimes W) = \log_2\, \det\!\left(I_{N_r} + \frac{\rho}{\sigma^2}\hat{H}_{eff}(\tilde{\mu} \otimes W)(\tilde{\mu} \otimes W)^H \hat{H}_{eff}^H\right) \qquad (22)$$

From Equations (21) to (22), it can be seen that when the (M+1) integrated sub-channels $H_m$ described earlier with reference to Equation (5) serve as the multiple integrated sub-channels, the electronic device 1000 has obtained the channel estimation $\hat{H}_0 \ldots \hat{H}_M$ of these integrated sub-channels and then obtains the channel estimation $\hat{H}_{eff}$ of the effective channels $H_{eff}$ of these integrated sub-channels in the sense of coding. Therefore, the problem of maximizing $C_{IRS-MIMO}$ ($\Lambda$, W) that the electronic device 1000 is to solve becomes a problem of maximizing $C_{IRS-MIMO}$ ($\tilde{\mu} \otimes W$) based on the channel estimation $\hat{H}_{eff}$.

In view of the above, in this example, the first calculation unit 1010 of the electronic device 1000 may determine the multiple integrated sub-channels as an effective channel in the sense of precoding without considering the influence of the reflection parameters of the intelligent reflecting surface, and calculate the first precoding matrix $P_1$ based on the channel estimation of the effective channel (such as the channel estimate $\hat{H}_{eff}$ described above).

In other words, the first precoding matrix $P_1$ replaces $\tilde{\mu} \otimes W$ in Equation (22), so as to obtain the following Equation.

$$C_{Ref}(P_1) = \log_2 \det\left(I_{N_r} + \frac{\rho}{\sigma^2}\hat{H}_{eff}{}^H P_1^H P_1 \hat{H}_{eff}\right) \qquad (23)$$

Here, since the first precoding matrix $P_1$ replaces $\tilde{\mu} \otimes W$ in Equation (22), this matrix has the same form (same dimension) as the operation result of $\tilde{\mu} \otimes W$, which is not repeated here. The first calculation subunit 1010 may maximize $C_{Ref}(P_1)$ based on various conventional precoding schemes, for example, from the above Equation (23), to obtain the precoding matrix $$P_1^{opt}$$

according to the channel estimation $\hat{H}_{eff}$ of the effective channel in the sense of precoding constructed based on the multiple integrated sub-channels, as an optimal value of the first precoding matrix $P_1$, for example, in the form of the following Equation (24).

$$P_1^{opt} = \mathrm{argmax}\, C_{Ref}(P_1) \qquad (24)$$

After the first precoding matrix (the optimal value of the first precoding matrix)

$$P_1^{opt}$$

as shown in the above Equation (24) is obtained, in a preferred embodiment, the second calculation unit 1020 of the electronic device 1000 may be configured to generate, based on an inner product of the extended reflection vector and the second precoding matrix, an equivalent precoding matrix for approximately representing the first precoding matrix. The extended reflection vector is obtained by adding a predetermined constant to a set of reflection parameters utilized by the intelligent reflecting surface in one reflection.

For example, the equivalent precoding matrix $P_{eff}$ generated by the second calculation unit 1020 based on the inner product of the extended reflection vector and the second precoding matrix may have the following form.

$$P_{eff} = \tilde{\mu} \otimes W \qquad (25)$$

In Equation (25), the extended reflection vector $\tilde{\mu}$, for example, has the form of the M+1 vector $[1, e^{j\omega_1}, \ldots, e^{j\omega_M}]^T$ in Equation (4). The second precoding matrix W is, for example, an $N_t \times N_s$ matrix. $N_t$ represents the number of antennas of the first communication device at the transmitting end. $N_s$ represents the number of information streams of the first communication device.

As an example way of an equivalent precoding matrix such as shown in Equation (25) approximately representing the first precoding matrix calculated by the first calculation unit 1010 such as shown in Equation (24) above, the second calculation unit 1020 may be configured to calculate the reflection parameters of the intelligent reflecting surface and the second precoding matrix, so that the F norm between the equivalent precoding matrix generated based on the calculated reflection parameter and the second precoding matrix and the first precoding matrix is minimized.

In other words, the second calculation unit 1020 may measure the similarity between the equivalent precoding matrix and the first precoding matrix based on the F norm, and determine that the generated equivalent precoding matrix is most similar to the first precoding matrix when the F norm is the smallest, so as to determine the reflection parameters of the intelligent reflecting surface generating the equivalent precoding matrix and the value of the second precoding matrix of the first communication device to be required optimal values.

For example, the second calculation unit 1020 may calculate the optimal values of the extended reflection vector $\tilde{\mu}$ and the second precoding matrix W satisfying the following Equation (26).

$$(\tilde{\mu}^{opt}, W^{opt}) = \arg\min_{(\tilde{\mu}, W) \in \mathcal{F}} \left\| P_1^{opt} - P_{eff} \right\|_F^2 \qquad (26)$$

In Equation (26), $(\tilde{\mu}^{opt}, W^{opt})$ represents the determined optimal values of the extended reflection vector g and the second precoding matrix W in a case that the F norm between the equivalent precoding matrix $P_{eff}$ and the first precoding matrix (the optimal value of the first precoding matrix)

$$P_1^{opt}$$

is the smallest. Based on $(\tilde{\mu}^{opt}, W^{opt})$ obtained in this way, the reflection parameters of the intelligent reflecting surface and the second precoding matrix of the first communication device are determined. Here, $\mathcal{F}$ represents a feasible region of IRS-MIMO precoding design, for specifying the constraints that $\tilde{\mu}$ and W should satisfy. $\|\cdot\|_F$ represents the F norm (Frobenius norm) of the matrix.

Note that the analytical expression of the optimal solution $(\tilde{\mu}^{opt}, W^{opt})$ may not be obtained from the optimization in Equation (26) in some cases. However, based on the design criteria given above, those skilled in the art can properly determine the optimal value of $(\tilde{\mu}, W)$ in various ways, which are not described in detail herein.

In the above example, it is considered that the reflection parameters adopted by the intelligent reflecting surface do not involve phase modulation, and thus the extended reflection vector has the form of Equation (4). In a case that the adopted reflectance parameters involve both amplitude modulation and phase modulation, an amplitude modulation coefficient $a_m$ may be added to each element in the extended reflection vector of Equation (4), so that the element becomes $a_m e^{j\omega_m}$ (m=1, 2, . . . , M). In this case, since the modulus of the reflection parameter is not 1, the predetermined constant added in Equation (4) to obtain the extended reflection vector may be an arbitrary value rather than limited to 1. Further, this example may similarly apply to the case where the reflection parameter involves both amplitude modulation and phase modulation. That is, the way of determining the precoding matrix of the first communication device and the reflection parameters of the intelligent reflecting surface from Equations (16) to (26) are also similarly applicable. The first configuration example of the electronic device according to the second embodiment of the present disclosure has been described above with respect to the wireless communication system assisted by an intelligent reflecting surface such as shown in FIG. 3.

An example of processing performed by each unit in the electronic device is further described in conjunction with a specific example of the integrated sub-channels. As described above, according to the first configuration example of the electronic device of this embodiment, the precoding matrix for the first communication device and the reflection parameters of the intelligent reflecting surface can be calculated based on the channel estimation of the integrated sub-channels obtained in advance. The reflection parameters and the precoding matrix calculated in this way can help optimize system performance.

3.2 Second Configuration Example

Figure 11:
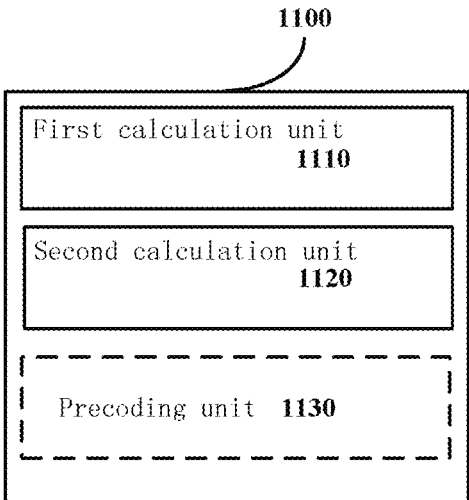
FIG. 11 is a block diagram illustrating a second configuration example of the electronic device according to the second embodiment of the present disclosure.

FIG. 11 is a block diagram showing a second configuration example of the electronic device according to the second embodiment of the present disclosure. The second configuration example shown in FIG. 11 relates to a further improvement of the first configuration example shown in FIG. 10. Therefore, the following description is made on the basis of the above first configuration example shown in FIG. 10.

As shown in FIG. 11, the electronic device 1100 may include a first calculation unit 1110 and a second calculation unit 1120, which are respectively similar to the first calculation unit 1010 and the second calculation unit 1020 in the electronic device 1000 of FIG. 10. In addition, the electronic device 1100 further includes a precoding unit 1130 configured to precode the data signal of the first communication device based on the calculated second precoding matrix.

As an example, the electronic device 1100 may be included in a first communication device such as the network side device BS shown in FIG. 3. That is, the electronic device 1100 as the first communication device calculates the reflection parameters of the intelligent reflecting surface and the precoding matrix of the first communication device. In this case, the electronic device 1100, when communicating as the first communication device in a system such as that shown in FIG. 3, transmits the data signal precoded by precoding unit 1130 based on the second precoding matrix calculated by the second calculation unit 1120 to the intelligent reflecting surface and the second communication device via a transmission unit not shown, and optionally transmits the reflection parameters calculated by the second calculation unit 1120 to the intelligent reflecting surface via a control link.

The second configuration example of the electronic device according to the second embodiment of the present disclosure has been described above with respect to the wireless communication system assisted by an intelligent reflecting surface such as that shown in FIG. 3. As described above, in the second configuration example of the present embodiment, the electronic device may precode the data signal of the first communication device, and may be included in the first communication device, for example. In this way, the system performance of the wireless communication system assisted by the intelligent reflecting surface is improved based on the generated precoding matrix.

In addition, it should be understood that the first embodiment for calculating the channel estimation of the integrated sub-channels and the second embodiment for calculating the precoding matrix based on the channel estimation of the integrated sub-channels are separately described in this specification and the drawings. However, these two embodiments may be appropriately combined with each other on the basis of the present disclosure.

For example, the second example configuration of the first embodiment (the electronic device 600 shown in FIG. 6) may be combined with the second example configuration of the second embodiment (the electronic device 1100 shown in FIG. 11), and then serve as the first communication device in the wireless communication system assisted by the intelligent reflecting surface as shown in FIG. 3. The device may determine the precoding matrix and reflection parameters after acquiring the channel estimation of the integrated sub-channels, perform precoding of the data signal to be sent accordingly, and optionally transmit the precoded data signal to the intelligent reflecting surface and the second communication device, and optionally transmit the determined reflection parameters to the intelligent reflecting surface, e.g., via a control link.

4. Configuration Example of Third Embodiment

Next, a special case where the direct link between the first and second communication devices is blocked in the wireless communication system assisted by the intelligent reflecting surface as shown in FIG. 3 is described. Further, the third embodiment of calculating the precoding matrix based on the idea of integrating sub-channels proposed in this special case is described. The scenario targeted by the third embodiment is the simplified scenario in FIG. 3, and the method for calculating the precoding matrix proposed in the third embodiment is based on the simplified method obtained in the second embodiment. Therefore, the following description about the third embodiment is made on the basis of the previous related description.

4.1 Precoding Calculation without Direct Link

First, the simplified algorithm, proposed for the special case where there is no direct link between the first and second communication devices in the wireless communication system assisted by the intelligent reflecting surface, for calculating the precoding matrix of the first communication device and the reflection parameters of the intelligent reflecting surface is described with reference to FIG. 12.

Figure 12:
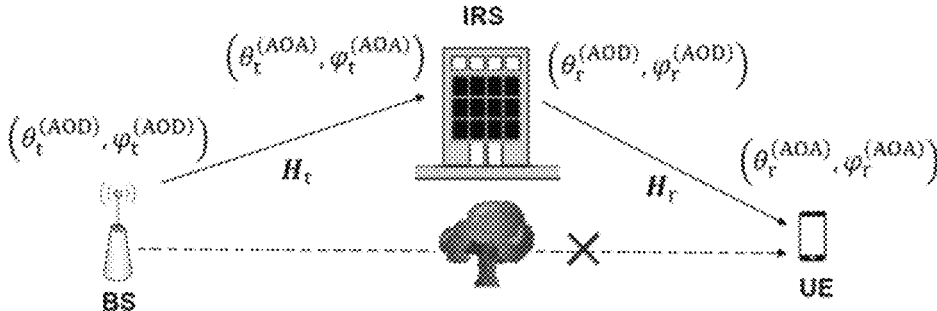
FIG. 12 is a schematic diagram illustrating an equivalent channel in a wireless communication system assisted by an intelligent reflecting surface under certain circumstances.

FIG. 12 is a schematic diagram for illustrating an equivalent channel in a wireless communication system assisted by an intelligent reflecting under a specific situation, which shows an example situation in which the direct link in the system is blocked, that is, the special case of the direct link $H_0 \approx 0$ between the first and second communication devices in the example shown in FIG. 3. In the example of FIG. 12, the wireless communication system includes a first communication device BS, a second communication device UE, and an intelligent reflecting surface IRS arranged on a building between the BS and the UE. The direct link between the first communication device BS and the second communication device UE is blocked, and the channel line-of-sight of the reflecting link is dominant. In this case, since there is no direct link, both the equivalent channel and the proposed integrated sub-channels such as in the form of Equation (5) are simplified. In this case, each sub-channel may be represented by a corresponding array steering vector and processed accordingly, which is beneficial to further simplify the calculation of the precoding matrix of the first communication device.

Here, each of the intelligent reflecting surface IRS, the first communication device BS at the transmitting end, and the second communication device UE at the receiving end shown in FIG. 12 may be regarded as a planar antenna array. Based on steering vectors of the antenna arrays, the channel $H_t$ from the BS to the IRS and the channel $H_r$ from the IRS to the UE are expressed in the beam domain by the following Equation (27).

$$H_t = \beta_t a_M\left(\theta_t^{(AOA)}, \varphi_t^{(AOA)}\right) a_{N_t}^H\left(\theta_t^{(AOD)}, \varphi_t^{(AOD)}\right) \quad (27)$$

$$H_r = \beta_r a_{N_r}\left(\theta_r^{(AOA)}, \varphi_r^{(AOA)}\right) a_M^H\left(\theta_r^{(AOD)}, \varphi_r^{(AOD)}\right)$$

In Equation (27), $\beta_t$ and $\beta_r$ represent the path loss of the channels (links), respectively.

In addition, without loss of generality, a($\theta$, $\varphi$) represents the steering vector of the planar antenna array in the ($\theta$, $\varphi$) direction of the target communication device with respect to the antenna array, and characterizes a phase delay of the plane wave caused by the different positions of the elements of the antenna array. The dimension of a($\theta$, $\varphi$) is determined by the elements (number of antennas) of the antenna array, where each element may be a complex number with a modulus of 1 and a corresponding phase. Here, $\theta$ and $\varphi$ respectively denote angles of the target communication device relative to a horizontal direction and a vertical direction with respect to the array elements in the antenna array. Therefore, ($\theta$, $\varphi$) may represent the spatial orientation of the target communication device with respect to the antenna array (elements therein) and may be referred to as an azimuth.

Without loss of generality, for a uniform planar array with N array elements, the horizontal and vertical dimensions are $N_H$ and $N_V$ respectively. In a case of $N_H N_V = N$, the steering vector may be expressed as follows.

$$a(\theta, \varphi) = \frac{1}{\sqrt{N}} \quad (28)$$

$$\left[ 1 \ \cdots \ e^{j\frac{2\pi}{\lambda}D(h\,\sin\theta\,\sin\varphi+v\,\cos\varphi)} \ \cdots \ e^{j\frac{2\pi}{\lambda}D((N_H-1)\sin\theta\,\sin\varphi+(N_V-1)\cos\varphi)} \right]$$

In Equation (28), h and v are natural numbers, $0 < h \le N_H-1$, and $0 < v \le N_V-1$. D is the spacing between array elements. $\lambda$ is a wavelength of the carrier. From the above equation (28), it can be seen that as long as the azimuth ($\theta$, $\varphi$) of the target communication device with respect to the antenna array is known, the steering vector a($\theta$, $\varphi$) of the antenna array at this azimuth can be determined.

In Equation (27), the subscripts M, $N_t$, and $N_r$ added to a($\theta$, $\varphi$) respectively represent the number of elements (i.e., the number of antennas) of the antenna array (i.e., the antenna arrays of the intelligent reflecting surface IRS, the first communication device BS at the transmitting end, and the second communication device UE at the receiving end) represented by the steering vector. The superscript AOA or AOD added to $\theta$ and $\varphi$ in a($\theta$, $\varphi$) indicates that the steering vector is the guidance of the corresponding antenna array about the angle of departure (AOD) or angle of arrival (AOA) vector. The subscript t or r added to $\theta$ and $\varphi$ indicates the channel to which it belongs (i.e., channel $H_t$ at the transmitting side or channel $H_r$ at the receiving end).

Based on the above definition, it can be understood that $$a_M\left(\theta_t^{(AOA)}, \varphi_t^{(AOA)}\right)$$

represents the steering vector (hereinafter also referred to as the first steering vector) of the intelligent reflecting surface IRS in the direction of the angle of arrival $$\left(\theta_t^{(AOA)}, \varphi_t^{(AOA)}\right)$$

of the first communication device BS with respect to the intelligent reflecting surface IRS.

$$a_M\left(\theta_r^{(AOD)}, \varphi_r^{(AOD)}\right)$$

represents the steering vector (hereinafter also referred to as the second steering vector) of the intelligent reflecting surface IRS in the direction of the angle of departure $$\left(\theta_r^{(AOD)}, \varphi_r^{(AOD)}\right)$$

of the second communication device UE with respect to the intelligent reflecting surface IRS.

$$a_{N_t}\left(\theta_t^{(AOD)}, \varphi_t^{(AOD)}\right)$$

represents the steering vector (hereinafter also referred to as the third steering vector) of the first communication device BS in the direction of angle of departure $$\left(\theta_t^{(AOD)}, \varphi_t^{(AOD)}\right)$$

of the intelligent reflecting surface IRS with respect to the first communication device BS.

$$a_{N_r}\left(\theta_r^{(AOA)}, \varphi_r^{(AOA)}\right)$$

represents the steering vector (hereinafter also referred to as the fourth steering vector) of the second communication device UE in the direction of the angle of arrival $$\left(\theta_r^{(AOA)}, \varphi_r^{(AOA)}\right)$$

of the second communication device UE on the intelligent reflecting surface IRS with respect to the second communication device UE.

Based on the first to fourth steering vectors described above, the channels in the wireless communication system shown in FIG. 12 are expressed in the form of Equation (27).

Next, reference is made back to the integrated sub-channels $H_m$ in the form of Equation (5) previously described in the first configuration example of <2. Configuration example of first embodiment>. Here, since the direct link $H_0 \approx 0$ between the first and second communication devices, Equation (5) degenerates into the form of (5') below.

$$H_m = [H_r]_{(:,m)}[H_t]_{(m,:)}, \quad m = 1, 2, \ldots, M \qquad (5')$$

Equation (27) is substituted into Equation (5'), the expression of the integrated sub-channels $H_m$ in this case is obtained as follows.

$$H_m = \qquad (29)$$

$$[H_r]_{(:,m)}[H_t]_{(m,:)} = \beta_r\beta_t b_m^* c_m a_{N_r}\left(\theta_r^{(AOA)_i}, \varphi_r^{(AOA)}\right) a_{N_t}^H\left(\theta_t^{(AOD)_i}, \varphi_t^{(AOD)}\right)$$

In Equation (29), $b_m^*$ represents an $m^{th}$ element of a conjugate transpose $$a_M^H\left(\theta_r^{(AOD)}, \varphi_r^{(AOD)}\right)$$

of the second steering vector $$a_M\left(\theta_r^{(AOD)}, \varphi_r^{(AOD)}\right)$$

of the intelligent reflecting surface in the direction of the angle of departure of the second communication device with respect to the intelligent reflecting surface. $c_m$ represents an $m^{th}$ element of the first steering vector $$a_M\left(\theta_t^{(AOA)}, \varphi_t^{(AOA)}\right)$$

of the intelligent reflecting surface in the direction of the angle of arrival of the first communication device with respect to the intelligent reflecting surface. Based on equation (29), for example, the effective channel (in the sense of precoding) between the first and second communication devices in the system shown in FIG. 12 may be obtained as follows.

$$H_{eff} = [H_1 \ \ldots \ H_M] = \qquad (30)$$

$$\beta_r\beta_t[b_1^* c_1 \ \ldots \ b_M^* c_M] \otimes \left(a_{N_r} a_{N_t}^H\right) = \beta_r\beta_t t^T \otimes \left(a_{N_r} a_{N_t}^H\right)$$

In Equation (30), $$t = [b_1^* c_1 \ \ldots \ b_M^* c_M]^T,$$

and for the sake of brevity, the parentheses of $$a_{N_r}\left(\theta_r^{(AOA)}, \varphi_r^{(AOA)}\right)$$

and $$a_{N_t}^H\left(\theta_t^{(AOD)}, \varphi_t^{(AOD)}\right)$$

are omitted.

Here, as previously described with reference to Equation (22) in the first configuration example of <3. Configuration example of second embodiment>, in a case that the integrated sub-channels $H_m$ with the form of Equation (5) serve as the multiple integrated sub-channels, since the channel estimation of these integrated sub-channels can be obtained, the channel estimation $\hat{H}_{eff}$ of the effective channel $H_{eff}$ of these integrated sub-channels in the sense of coding can be obtained. Therefore, the problem of maximizing the capacity of the equivalent channel after precoding that is to be solved in order to calculate the precoding matrix of the first communication device becomes the problem of maximizing $C_{IRS-MIMO}(\tilde{\mu} \otimes W)$ based on the channel estimation $\hat{H}_{eff}$ of the effective channel.

$$C_{IRS-MIMO}(\tilde{\mu} \otimes W) = \log_2 \det\left(I_{N_r} + \frac{\rho}{\sigma^2}\hat{H}_{eff}(\tilde{\mu} \otimes W)(\tilde{\mu} \otimes W)^H \hat{H}_{eff}^H\right) \qquad (22)$$

In other words, through processing performed by each unit of the electronic device 1000 of the second embodiment such as described above with reference to FIG. 10, the first precoding matrix $P_1$ that maximizes the capacity of the equivalent channel is calculated based on the channel estimation (for example, channel estimation $\hat{H}_{eff}$) of the effective channel, and the equivalent precoding matrix for approximately representing the first precoding matrix is generated based on the inner product $\tilde{\mu} \otimes W$ of the extended reflection vector $\tilde{\mu}$ and the second precoding matrix W for the first communication device. For example, when the F norm between the equivalent precoding matrix and the first precoding matrix $P_1$ is the smallest, the optimal values of the extended reflection vector $\tilde{\mu}$ and the second precoding matrix W are determined, and then the reflection parameters of the intelligent reflecting surface and the precoding matrix of the first communication device are determined.

The foregoing manner of determining the reflection parameters of the intelligent reflecting surface and the precoding matrix of the first communication device are also applicable to the specific case concerned in this embodiment, such as that shown in FIG. 12. Further, there is no direct link between the first and second communication devices in this case (i.e., $H_0 \approx 0$ in the example of FIG. 3). Therefore, the extended reflection vector $\tilde{\mu}$ in Equation (22) above may degenerate into the reflection vector $\mu$. The precoding matrix W of the first communication device may degenerate into a precoding vector w. Correspondingly, the first precoding matrix $P_1$ degenerates into the first precoding vector $p_1$.

Therefore, in the specific case such as that shown in FIG. 12, the manner of calculating the precoding matrix in the second embodiment may be changed to first calculating the first precoding vector $p_1$ that maximizes the capacity of the equivalent channel, and then calculating the precoding design ($\mu$,w) that approximately represents the first precoding vector.

In this case, the expression of the capacity of the equivalent channel after precoding degenerates into the following form.

$$C_{IRS-MIMO}(\mu \otimes w) = \log_2 \det\left(I_{N_r} + \frac{\rho}{\sigma^2}\hat{H}_{eff}(\mu \otimes w)(\mu \otimes w)^H \hat{H}_{eff}^H\right) \qquad (22')$$

In this case, the degenerated form of the first precoding matrix $P_1$, that is, the first precoding vector $p_1$ replaces $\mu \otimes w$ in Equation (22'), so that the following Equation (23') similar to Equation (23) is obtained.

$$C_{Ref}(p_1) = \log_2 \det\left(I_{N_r} + \frac{\rho}{\sigma^2}\hat{H}_{eff}^H p_1^H p_1 \hat{H}_{eff}\right) \qquad (23')$$

The first precoding vector $p_1$ replaces $\mu \otimes w$ in Equation (22'), and therefore has the same form (same dimension) as the operation result of $\mu \otimes w$, which is not repeated here.

For the capacity of the equivalent channel in the form of the above Equation (23'), the object to be solved has become the first precoding vector $p_1$ (instead of matrix). Therefore, the first precoding vector that maximizes $C_{Ref}(p_1)$ may be designed according to a singular value decomposition (SVD) precoding criterion.

In this case, $H_{eff}$ in Equation (23') is replaced by $H_{eff}$. According to the SVD criterion, the eigenvector of $H_{eff}^H H_{eff}$ is firstly calculated. It is assumed that the eigenvector to be solved is f, and the corresponding eigenvalue is $\gamma$, then there is the following Equation (31).

$$H_{eff}^H H_{eff} f = \gamma f \qquad (31)$$

The expression of $H_{eff}$ in Equation (30) is substituted into Equation (31), and therefore Equation (32) is obtained.

$$\left(t^* t^T\right) \otimes \left(a_{N_t} a_{N_t}^H\right) f = \frac{\gamma}{\beta_r^2 \beta_t^2 a_{N_r}^H a_{N_r}} f \qquad (32)$$

In order to meet Equation (32), $f = l \otimes a_{N_t}$ is necessary. l is a to be determined vector, and therefore Equation (32) is further transformed into Equation (33).

$$t^* t^T l = \frac{\gamma}{\beta_r^2 \beta_t^2 a_{N_r}^H a_{N_r}} l \qquad (33)$$

That is, l is the eigenvector of the matrix $t^* t^T$. Without loss of generality, in a case of $l = t^*$, Equation (34) is obtained.

$$f = t^* \otimes a_{N_t} \qquad (34)$$

Considering the power constraint, the optimal value $$p_1^{opt}$$

of the first precoding vector $p_1$ that maximizes $C_{Ref}(p_1)$ under the SVD precoding criterion is as follows.

$$p_1^{opt} = \frac{1}{\sqrt{N_t}} t^* \otimes a_{N_t} \qquad (35)$$

After the first precoding vector (the optimal value of the first precoding vector) in the form of (35) is obtained, the first precoding vector is approximately represented by an equivalent precoding vector generated based on an inner product of the reflection vector and the first precoding vector of the intelligent reflecting surface. In a case that the generated equivalent precoding vector is most similar to the first precoding vector, it is determined that the values of the reflection vector and the second precoding vector that generate the equivalent precoding vector are optimal values.

For example, the equivalent precoding vector $p_{eff}$ generated from the inner product of the reflection vector $\mu$ and the second precoding vector w may have the following (25') form modified from equation (25).

$$p_{eff} = \mu \otimes w \qquad (25')$$

The similarity between the equivalent precoding vector $p_{eff}$ and the first precoding vector (the optimal value of the first precoding vector) is measured based on the F norm between the equivalent precoding vector and the first precoding vector. When the F norm is the smallest, the optimal values for the reflection vector $\mu$ and the second precoding vector w are determined. For example, an optimum value satisfying the following Equation (26') which is a modification of Equation (26) is calculated.

$$(\mu^{opt}, w^{opt}) = \arg \min_{(\mu,w) \in \mathcal{F}} \left\| p_1^{opt} - p_{eff} \right\|_F^2 \qquad (26')$$

In Equation (26'), ($\mu^{opt}$, $w^{opt}$) represents the optimal values of $\mu$ and w determined when the F norm is minimum. Here, $\mathcal{F}$ represents the feasible domain of IRS-MIMO precoding design, for specifying the constraints that p and w should satisfy. $\|\cdot\|_F$ represents the F norm (Frobenius norm).

Equation (34) and Equation (25') are substituted into Equation (26), to obtain the following Equation (36).

$$(\mu^{opt}, w^{opt}) = \arg \min_{(\mu,w) \in \mathcal{F}} \left\| \frac{1}{\sqrt{N_t}} t^* \otimes a_{N_t} - \mu \otimes w \right\|_F^2 \qquad (36)$$

It is apparent that when the following Equations (37) and (38) are satisfied, there is $p^{opt} = \mu^{opt} \otimes w^{opt}$, that is, $$\|p^{opt} - \mu^{opt} \otimes w^{opt}\|_F^2 = 0$$

to the minimum.

$$\mu^{opt} = t^* = [b_1 c_1^* \quad \cdots \quad b_M c_M^*]^T \qquad (37)$$

$$w^{opt} = \frac{1}{N_t} a_{N_t}\left(\theta_t^{(AOD)}, \varphi_t^{(AOD)}\right) \qquad (38)$$

In Equation (37), the product (also regarded as the product of the corresponding elements of the second steering vector and the conjugate of the first steering vector), of the $m^{th}$ element $b_m$ of the second steering vector $$a_M\left(\theta_r^{(AOD)}, \varphi_r^{(AOD)}\right)$$

of the intelligent reflecting surface in the direction of the angle of departure of the second communication device with respect to the intelligent reflecting surface and the $m^{th}$ element $$c_m^*$$

of the conjugate transpose $$a_M^H\left(\theta_t^{(AOA)}, \varphi_t^{(AOA)}\right)$$

of the first steering vector $$a_M\left(\theta_t^{(AOA)}, \varphi_t^{(AOA)}\right)$$

of the intelligent reflecting surface in the direction of the angle of arrival of the first communication device with respect to the intelligent reflecting surface, serves as reflection parameters in the optimal value $\mu^{opt}$ of the reflection vector of the intelligent reflecting surface. In other words, the Hadamard product of the transpose of the second steering vector and the conjugate transpose of the first steering vector may serve as the optimal value $\mu^{opt}$ of the reflection vector of the intelligent reflecting surface (that is, the elements of the optimal value vector serve as reflection parameters). In Equation (38), the third steering vector $$a_{N_t}\left(\theta_t^{(AOD)}, \varphi_t^{(AOD)}\right)$$

of the first communication device BS at the angle of departure direction of the first communication device BS on the intelligent reflecting surface IRS with respect to the first communication device BS is divided by the number of antennas $N_t$ of the first communication device, as the optimal value $w^{opt}$ of the calculated precoding vector.

From the above Equations (37) and (38), it can be seen that in this way of calculating the precoding vector and reflection parameters, $(\mu^{opt}, w^{opt})$ is related to only the steering vector, that is, the azimuth angle. Therefore, it is only necessary to know the angle of departure and angle of arrival between the first communication device at the transmitting end and the intelligent reflecting surface, and the angle of departure and angle of arrival between the intelligent reflecting surface and the second communication device at the receiving end to perform precoding. Such calculation has low complexity and strong practical operability.

Note that in the case of this example, the reflection vector $\mu$ is an intermediate variable. Therefore, even if the reflection vector $\mu$ is modified to cover the form of the amplitude modulation (the modulus of each element is with a pending amplitude modulation coefficient rather than 1), the calculation of Equations (37) and (38) may not be affected. That is, the above algorithm is appliable without modification to the case where the reflection parameters include the amplitude modulation coefficient and the phase modulation coefficient.

Based on the above inventive concepts, the electronic device of the third embodiment is proposed. The precoding vector of the first communication device and the reflection parameters of the intelligent reflecting surface are calculated based on the steering vector of the corresponding antenna array (the first communication device, the second communication device or the intelligent reflecting surface) in the direction of the angle of departure/arrival of the target communication device with respect to the antenna array. Next, a configuration example of the electronic device is described.

4.2 First Configuration Example

Figure 13:
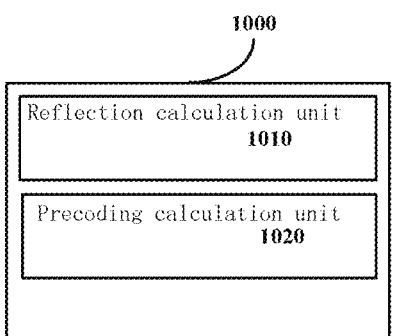
FIG. 13 is a block diagram illustrating a first configuration example of an electronic device according to a third embodiment of the present disclosure.

FIG. 13 is a block diagram showing a first configuration example of an electronic device according to the third embodiment of the present disclosure.

As shown in FIG. 13, an electronic device 1300 may include a reflection calculation unit 1310 and a precoding calculation unit 1320.

Here, each unit of the electronic device 1300 may be included in processing circuitry. It should be noted that the electronic device 1300 may include one processing circuitry, or may include multiple processing circuitry. Further, the processing circuitry may include various discrete functional units to perform various functions and/or operations. It should be noted that these functional units may be physical entities or logical entities, and units with different titles may be implemented by the same physical entity.

As an example, the electronic device 1300 shown in FIG. 13 may be applied to a wireless communication system assisted by an intelligent reflecting surface as described above with reference to FIG. 12. Hereinafter, the processing implemented by the electronic device 1300 and its functional units are described with reference to the example in FIG. 12.

For a wireless communication system assisted by an intelligent reflecting surface such as that shown in FIG. 12, the reflection calculation unit 1310 of the electronic device 1300 may calculate, based on the first steering vector of the intelligent reflecting surface in the direction of the angle of arrival of the first communication device with respect to the intelligent reflecting surface and the second steering vector of the intelligent reflecting surface in the direction of the angle of departure of the second communication device with respect to the intelligent reflecting surface, reflection parameters of the intelligent reflecting surface located between the first communication device and the second communication device. There is no direct link between the first communication device and the second communication device.

As an example, the reflection parameter calculated by the reflection calculation unit 1310 may include an amplitude parameter for amplitude modulation and/or a phase parameter for phase modulation by each reflection unit of the intelligent reflecting surface on a signal.

In addition, the precoding calculation unit 1320 of the electronic device 1300 may calculate the precoding vector of the first communication device based on the third steering vector of the first communication device in the direction of the angle of departure of the intelligent reflecting surface with respect to the first communication device.

In a wireless communication system assisted by the intelligent reflecting surface such as that shown in FIG. 12, the first and second communication devices and the intelligent reflecting surface each may transmit and receive signals via a planar array antenna. Correspondingly, the angle of departure or angle of arrival involved in each of the first to third steering vectors involved in the reflection calculation unit 1310 and the precoding calculation unit 1320 of the electronic device 1300 includes an angle of departure or an angle of arrival in the horizontal direction and in the vertical direction. In other words, each of the first to third steering vectors may be a plane array steering vector based on azimuths in both horizontal and vertical directions.

For example, the first to third steering vectors may be $$a_M(\theta_t^{(AOA)}, \varphi_t^{(AOA)}), a_M(\theta_r^{(AOD)}, \varphi_r^{(AOD)}), \text{ and } a_{N_t}(\theta_t^{(AOD)}, \varphi_t^{(AOD)})$$

described above with reference to Equation (27) in [4.1 Precoding calculation without direct link], respectively.

Preferably, the reflection calculation unit 1310 may be configured to calculate the product of the corresponding elements of the second steering vector and the conjugate of the first steering vector, as each reflection parameter of the intelligent reflecting surface. That is, the reflection calculation unit 1310 may calculate various reflection parameters of the intelligent reflecting surface from the above Equation (37).

In addition, preferably, the precoding calculation unit 1320 may be configured to divide the third steering vector by the number of antennas of the first communication device, as the calculated precoding vector. That is, the precoding calculation unit 1320 may calculate each precoding vector of the intelligent reflecting surface in the manner of the above Equation (38).

The first configuration example of the electronic device of the third embodiment of the present disclosure has been described above for the wireless communication system assisted by an intelligent reflecting surface such as shown in FIG. 12. According to the first configuration example of the electronic device of the present embodiment, the precoding vector of the first communication device and the reflection parameters of the intelligent reflecting surface are calculated based on the first to third steering vectors of the first communication device and the intelligent reflecting surface with respect to corresponding angle of departure or arrival.

In other words, it is only necessary to know the angle of departure and the angle of arrival between the first communication device at the transmitting end and the intelligent reflecting surface, and between the intelligent reflecting surface and the second communication device at the receiving end to perform precoding. Such calculation has low complexity and strong practical operability. Moreover, similar to the second embodiment, the calculated precoding vector and reflection parameters may be beneficial to optimize system performance.

4.3 Second Configuration Example

Figure 14:
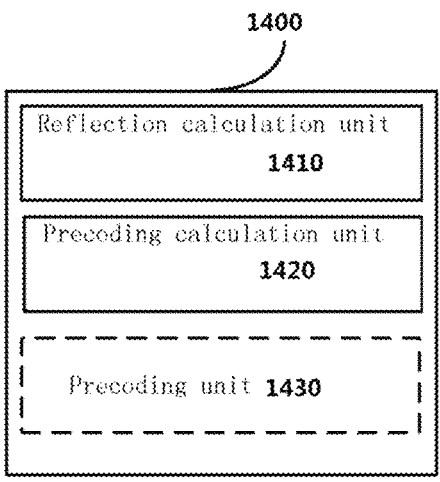
FIG. 14 is a block diagram illustrating a second configuration example of an electronic device according to a third embodiment of the present disclosure.

FIG. 14 is a block diagram showing a second configuration example of the electronic device according to the third embodiment of the present disclosure. The second configuration example shown in FIG. 14 relates to a further improvement of the first configuration example shown in FIG. 13. Therefore, the following description is made on the basis of the above first configuration example shown in FIG. 13.

As shown in FIG. 14, the electronic device 1400 may include a reflection calculation unit 1410 and a precoding calculation unit 1420, which are respectively similar to the reflection calculation unit 1310 and the precoding calculation unit 1320 in the electronic device 1300 of FIG. 13. In addition, the electronic device 1400 further includes a precoding unit 1430 configured to precode the data signal of the first communication device based on the calculated precoding vector.

As an example, the electronic device 1400 may be included in a first communication device such as the network side device BS shown in FIG. 12. That is, the electronic device 1400 as the first communication device calculates the reflection parameters of the intelligent reflecting surface and the precoding vector of the first communication device. In this case, when communicating as the first communication device in a system such as that shown in FIG. 12, the electronic device 1400 transmits the data signal precoded by the precoding unit 1430 according to the precoding vector calculated by the precoding calculation unit 1420 to the intelligent reflecting surface and the second communication device via a transmission unit not shown, and optionally transmits the reflection parameters calculated by the parameter calculation unit 1310 to the intelligent reflecting surface via a control link.

The second configuration example of the electronic device of the second embodiment of the present disclosure has been described above for the wireless communication system assisted by the intelligent reflecting surface such as shown in FIG. 12.

As described above, in the second configuration example of the present embodiment, the electronic device may precode the data signal of the first communication device, and may be included in the first communication device, for example. In this way, the system performance of wireless communication system assisted by the intelligent reflecting surface is improved based on the generated precoding matrix.

5. Method Embodiments of First to Third Embodiments

5.1 Method Embodiment of First Embodiment

Next, the method for wireless communications according to a first embodiment of the present disclosure is described in detail.

Figure 15:
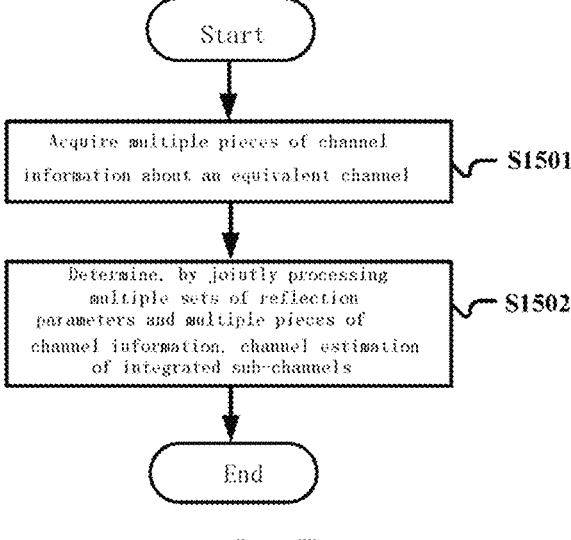
FIG. 15 is a flowchart illustrating an example of a method for wireless communications according to a first embodiment of the present disclosure.

FIG. 15 is a flowchart illustrating a procedure example of a method for wireless communications according to the first embodiment of the present disclosure. The method shown in FIG. 15 may be applied, for example, to the wireless communication system assisted by the intelligent reflecting surface as described above with reference to FIG. 3.

As shown in FIG. 15, in step S1501, multiple pieces of channel information about an equivalent channel between a first communication device and a second communication device obtained through multiple channel measurements are obtained. In each channel measurement, the second communication device acquires a piece of channel information about the equivalent channel based on a received reference signal transmitted from the first communication device and a reflection signal sent by the intelligent reflecting surface between the first communication device and the second communication device reflecting the reference signal based on a set of reflection parameters.

Next, in step S1502, channel estimation of multiple integrated sub-channels that characterize the equivalent channel together with the reflection parameters of the intelligent reflecting surface is determined by jointly processing multiple sets of reflection parameters utilized in multiple channel measurements and multiple pieces of acquired channel information.

As an example, the equivalent channel may include a first link from the first communication device to the second communication device and a second link from the first communication device to the second communication device via the intelligent reflecting surface. In addition, for example, the reflection signal of the intelligent reflecting surface may be sent by each reflection unit of the intelligent reflecting surface after modulating the amplitude and/or phase of the reference signal according to the respective reflection parameters.

In one example, the multiple pieces of channel information acquired in step S1501 include multiple pieces of channel state information of the equivalent channel. In this case, step S1501 may further include the following processing: determine the multiple channel estimations of the equivalent channel based on the acquired multiple pieces of channel information, respectively.

Alternatively, in an example, the multiple pieces of channel information acquired in step S1501 include multiple channel estimations of the equivalent channel.

As an example, the joint processing performed in step S1502 may include: multiplying an inverse matrix of the training matrix constructed based on multiple extended reflection vectors obtained based on multiple sets of reflection parameters by the observation matrix constructed by multiple channel estimations to determine the channel matrix for each integrated sub-channel. The multiple extended reflection vectors are obtained by adding a predetermined constant to each set of reflection parameters in the multiple sets of reflection parameters.

As an example, the intelligent reflecting surface may include M reflection units and adopt a set of M reflection parameters respectively corresponding to the M reflection units in each reflection, where M is a natural number greater than 1.

In this case, in the joint processing performed in step S1502, channel matrices of M+1 integrated sub-channels may be determined through the multiplication. Preferably, the number of channel measurements performed or the number L of the sets of reflection parameter is greater than or equal to M+1.

In the joint processing performed in step S1502, each integrated sub-channel may be represented as a channel matrix of $N_r*N_t$. $N_r$ represents the number of antennas of the second communication device. $N_t$ represents the number of antennas of the first communication device.

Preferably, the values of the M reflection parameters utilized in each reflection may be selected from the M matrix elements except the first row among the matrix elements of the L-order discrete Fourier transform matrix. Alternatively, the values of the M reflection parameters utilized in each reflection may be selected from the M matrix elements except the first row among the matrix elements of the L-order Hadamard matrix.

Optionally, although not shown in FIG. 15, the method may additionally include a step of determining reflection parameters of the intelligent reflecting surface utilized in each measurement before step S1501. Furthermore, the method may also include a step of providing (directly or indirectly) control information about reflection parameters to the intelligent reflecting surface.

In an example, the first communication device may be a network side device, and the second communication device may be user equipment.

Optionally, each step of the method shown in FIG. 15 may be implemented in the first communication device. The method may further include the step of transmitting a reference signal to the second communication device and the intelligent reflecting surface through the first communication device.

In addition, optionally, each step of the method shown in FIG. 15 may be performed in the second communication device. The method may further include the step of receiving the reference signal from the first communication device and the reflection signal from the intelligent reflecting surface through the second communication device.

According to an embodiment of the present disclosure, the subject performing the above method may be the electronic device 400, 600 or 700 according to the first embodiment of the present disclosure. Therefore, various aspects of the foregoing embodiments of the electronic device 400, 600 or 700 are applicable here.

5.2 Method Embodiment of Second Embodiment

Next, a method for wireless communications according to a second embodiment of the present disclosure is described in detail.

Figure 16:
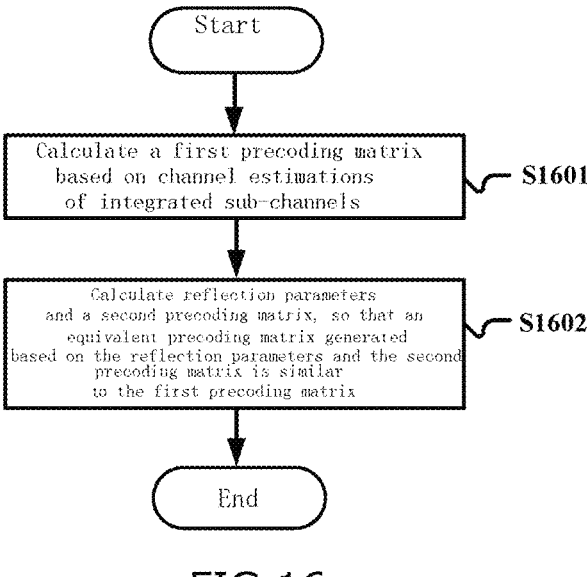
FIG. 16 is a flowchart illustrating an example of a method for wireless communications according to a second embodiment of the present disclosure.

FIG. 16 is a flowchart illustrating a procedure example of a method for wireless communications according to the second embodiment of the present disclosure. The method shown in FIG. 16 may be applied, for example, to a wireless communication system assisted by an intelligent reflecting surface as described above with reference to FIG. 3.

As shown in FIG. 16, in step S1601, a first precoding matrix is calculated according to channel estimates of multiple integrated sub-channels obtained by the electronic device (e.g., the electronic device 400, 600 or 700) of the first embodiment or the method (e.g., the method shown in FIG. 15) for wireless communications of the first embodiment. Next, in step S1602, based on the first precoding matrix, the reflection parameters of the intelligent reflecting surface and the second precoding matrix of the first communication device are calculated, so that the equivalent precoding matrix generated based on the calculated reflection coefficients and the second precoding matrix is similar to the first precoding matrix.

As an example, the reflection parameter calculated through the processing of step S1602 may include an amplitude parameter for amplitude modulation and/or a phase parameter for phase modulation by each reflection unit of the intelligent reflecting surface on a signal.

As an example, in step S1602, an equivalent precoding matrix may be generated based on the inner product of the extended reflection vector and the second precoding matrix. The extended reflection vector is obtained by adding a predetermined constant to a set of reflection parameters utilized by the intelligent reflecting surface in a reflection.

In addition, as an example, in step S1602, the reflection parameters of the intelligent reflecting surface and the second precoding matrix may be calculated, so that the F norm between the equivalent precoding matrix, generated based on the calculated reflection parameters and the second precoding matrix, and the first precoding matrix is minimized.

Optionally, although not shown in FIG. 16, after step S1602, the method may additionally include a step of precoding the data signal of the first communication device based on the calculated second precoding matrix.

According to an embodiment of the present disclosure, the subject performing the above method may be the electronic device 1000 or 1100 according to the second embodiment of the present disclosure. Therefore, various aspects of the foregoing embodiments of the electronic device 1000 or 1100 are applicable here.

5.2 Method Embodiment of Third Embodiment

Next, a method for wireless communications according to a third embodiment of the present disclosure is described in detail.

Figure 17:
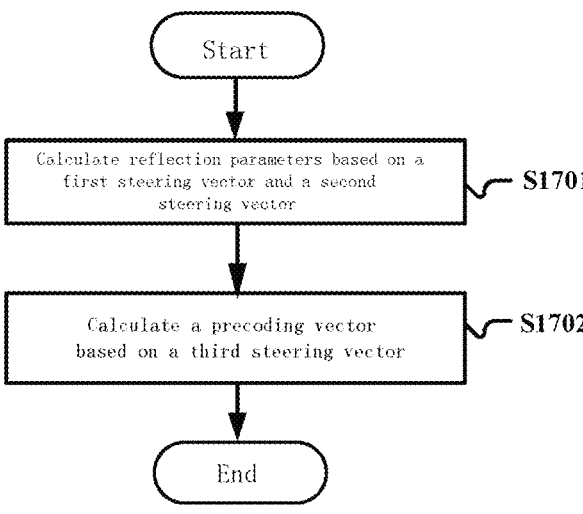
FIG. 17 is a flowchart illustrating a method for wireless communications according to a third embodiment of the present disclosure.

FIG. 17 is a flowchart illustrating a procedure example of a method for wireless communications according to the third embodiment of the present disclosure. The method shown in FIG. 17 may be applied, for example, to a wireless communication system assisted by an intelligent reflecting as previously described with reference to FIG. 12.

As shown in FIG. 17, in step S1701, the reflection parameters of the intelligent reflecting surface located between the first communication device and the second communication device are calculated based on the first steering vector of the intelligent reflecting surface in the direction of the angle of arrival of the first communication device with respect to the intelligent reflecting surface and the second steering vector of the intelligent reflecting surface in the direction of the angle of departure of the second communication device with respect to the intelligent reflecting surface. There is no direct link between the first communication device and the second communication device.

Next, in step S1702, the precoding vector of the first communication device is calculated based on the third steering vector of the first communication device in the direction of the angle of departure of the intelligent reflecting surface with respect to the first communication device.

The angle of departure or angle of arrival involved in each of the first to third steering vectors involved in the processing of steps S1701 and S1702 includes an angle of departure or an angle of arrival in the horizontal direction and in the vertical direction.

As an example, the reflection parameter calculated in step S1701 may include an amplitude parameter for amplitude modulation and/or a phase parameter for phase modulation by each reflection unit of the intelligent reflecting surface on a signal.

As an example, in step S1701, the product of corresponding elements of the second steering vector and the conjugate of the first steering vector may be calculated as each reflection parameter of the intelligent reflecting surface.

As an example, in step S1702, the third steering vector may be divided by the number of antennas of the first communication device, as the calculated precoding vector.

Optionally, although not shown in FIG. 17, after step S1702, the method may additionally include a step of precoding the data signal of the first communication device based on the calculated precoding vector.

According to the embodiment of the present disclosure, the subject performing the above method may be the electronic device 1300 or 1400 according to the third embodiment of the present disclosure. Therefore, various aspects of the foregoing embodiments of the electronic device 1300 or 1400 are applicable here.

6. Configuration Example of Fourth Embodiment

6.0 Generation of Delay Difference

First, reference is made back to FIG. 3. As described above with reference to FIG. 3 in the second embodiment, when the symbol to be sent by the BS at the transmitting side to the UE at the receiving side is x and the precoding matrix adopted by the BS is W, the symbol received by the UE is $y=y_d+y_r+z$. $y_d$ is a part received through a direct link (direct link between the BS and the UE). $y_r$ is the part received through the reflection link (the link from the BS to the UE via the IRS). z is the additive noise of the UE at the receiving end. Further, as previously described, the symbol y received by the UE may be further expressed in the form of Equation (18) reproduced below based on Equations (16) and (17).

$$y = y_d + y_r + z = \sqrt{\rho}\,(H_0 + H_r \Lambda H_t)Wx + z \qquad (18)$$

In practical applications, the above Equation (18) is satisfied based on a default assumption, that is, the propagation delays of the direct link and the reflection link are almost the same. Therefore, the signals of the two links are aligned in time for the communication device on the receiving side, such as the UE.

However, in an actual system, there may be a large delay difference between the direct link and the reflection link. In this case, the signals of the two links cannot be aligned at the communication device on the receiving side, which may introduce serious cross link interference and affect system performance.

More specifically, in the example of FIG. 3, if the distance between the UE and the IRS is $d_{IU}$. The distance between the IRS and the BS is $d_{TI}$. The distance between the UE and the BS is $d_{TU}$. The distance difference between the reflection link and the direct link is expressed as $\Delta d = d_{TI} + d_{IU} - d_{TU}$. Assuming that the delay difference between the direct link and the reflection link is $\Delta\delta$, the following corresponding relationship exists between the distance difference $\Delta d$ and the delay difference $\Delta\delta$.

$$\Delta d = \Delta\delta \times 3 \times 10^8 \,\text{m/s} \qquad (39)$$

When the distance difference $\Delta d$ or the delay difference $\Delta\delta$ between the direct link and the reflection link is too large, intolerable link interference may be caused.

Here, without loss of generality, as an example, it is assumed that the transceiver adopts an orthogonal frequency division multiple access (OFDMA) scheme, the sub-carrier spacing (SCS) is 15 kHz, and the cyclic prefix (CP) is 6.67% in length. In this case, the delay difference threshold $\Delta\delta_{th}$ between different links that the cyclic prefix can tolerate and the corresponding electromagnetic wave propagation distance threshold $d_{th}$ are calculated as follows.

$$\Delta\delta_{th} = \frac{1}{15\ \text{kHz}} \times 6.67\% = 4.45 \times 10^{-7} \text{ seconds;} \qquad (40)$$

$$d_{th} = \frac{1}{15\ \text{kHz}} \times 6.67\% \times 3 \times 10^8 \text{ m/s} = 1.4 \text{ km}$$

This result means that when the delay difference $\Delta\delta$ between the direct link and the reflection link is greater than $\Delta\delta_{th}$ or the distance difference $\Delta d$ between the direct link and the reflection link is greater than $d_{th}$, the delay difference cannot be tolerated by the prefix, and the signal model in Equation (18) cannot be established.

As an example, consider the following situation: in the example shown in FIG. 3, the BS at the transmitting side first transmits the symbol $x_1$ at a time t0, and then transmits the symbol $x_2$ after the delay difference $\Delta\delta$, that is, at a time t0+$\Delta\delta$, via the direct link (DTL) and the reflection link (RTL). For the UE at the receiving side, if the symbol $x_{1(DTL)}$ sent via the direct link is received at the first time t1, the symbol $x_{1(RTL)}$ sent via the reflection link is to be received at the second time t2=t1+$\Delta\delta$ (note that for ease of description, related content or processing such as the pre-coding matrix is omitted here). In addition, the BS transmits the symbol $x_2$ when the delay difference $\Delta\delta$ elapses from the time t0 when transmitting the symbol $x_1$. Therefore, the UE at the receiving side receives, after receiving the symbol $x_{1(DTL)}$ transmitted via the direct link, the symbol $x_{2(DTL)}$ sent via the direct link at the second time t2=t1+$\Delta\delta$ when the delay difference $\Delta\delta$ elapses immediately after the first time t1.

In this case, for the UE at the receiving side, the signal received at the second time t2 is actually a superposition of the symbol $x_{1(RTL)}$ sent at the time t0 and transmitted via the reflection link and the symbol $x_{2(DTL)}$ sent at time the time t0+$\Delta\delta$ and transmitted via the direct link. When the time difference between the above two received symbols $x_{1(RTL)}$ and $x_{2(RTL)}$, i.e., the delay difference $\Delta\delta$ between the two links, is greater than the delay difference threshold $\Delta\delta_{th}$ represented by e.g., Equation (40), the time difference cannot be tolerated by the cyclic prefix, and the signal model in Equation (18) cannot be established.

Therefore, it is desirable to properly determine the delay difference, for example, when the delay difference between the direct link and the reflection link is too large, in order to facilitate subsequent processing, such as but not limited to signal detection of the communication device at the receiving side and the like.

In view of the above problems, there is proposed a fourth embodiment of the present disclosure, which can properly estimate the delay difference between the propagation delays of the direct link and the reflection link.

6.1 Configuration Example

Figure 18:
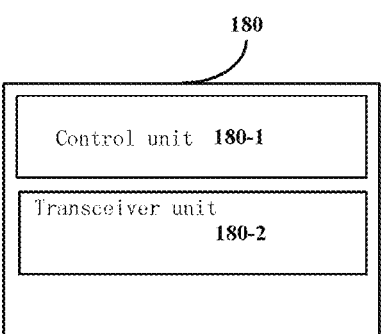
FIG. 18 is a block diagram illustrating a configuration example of an electronic device according to fourth and fifth embodiments of the present disclosure.

FIG. 18 is a block diagram showing a configuration example of an electronic device according to a fourth embodiment of the present disclosure.

As shown in FIG. 18, the electronic device 180 may include a control unit 180-1 and a transceiver unit 180-2.

Here, each unit of the electronic device 180 may be included in processing circuitry. It should be noted that the electronic device 180 may include one processing circuitry, or may include multiple processing circuitry. Further, the processing circuitry may include various discrete functional units to perform various functions and/or operations. It should be noted that these functional units may be physical entities or logical entities, and units with different titles may be realized by the same physical entity.

As an example, the electronic device 180 shown in FIG. 18 may be applied to a wireless communication system assisted by an intelligent reflecting surface as previously described with reference to FIG. 3. Hereinafter, the processing implemented by the electronic device 180 and its functional units are to be described in conjunction with the example of FIG. 3.

According to the embodiment of the present disclosure, under the control of the control unit 180-1 of the electronic device 180, the transceiver unit 180-2 may receive a predetermined reference signal sent by the other communication device via a first link (direct link) from the other communication device to the electronic device and a second link (reflection link) from the other communication device to the electronic device via an intelligent reflecting surface.

In addition, the control unit 180-1 of the electronic device 180 may estimate a delay difference between the propagation delay of the first link and the propagation delay of the second link based on the difference between a first reception time at which the predetermined reference signal is expected to be received via the first link and a second reception time at which the predetermined reference signal is actually received via the second link.

Figure 19:
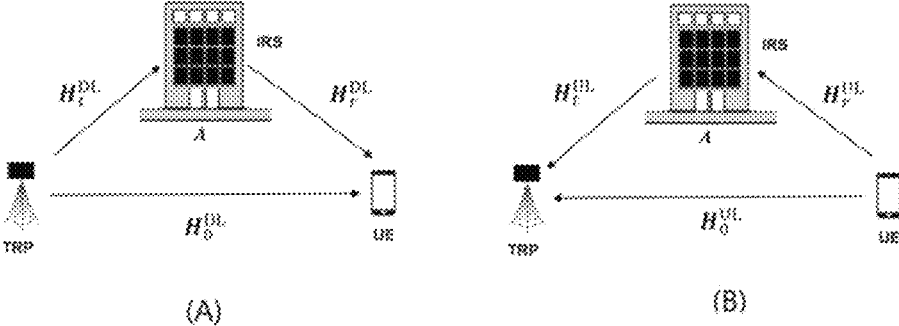
FIG. 19 is a schematic diagram illustrating a channel in a wireless communication system assisted by an intelligent reflecting surface.

Here, the electronic device 180 may be, for example, a device at the receiving side in the system shown in FIG. 3. Since the system shown in FIG. 3 only illustrates the scenario of downlink transmission, FIG. 19 as a modification of FIG. 3 is introduced here for the convenience of subsequent description. FIG. 19 is a schematic diagram explaining channels in a wireless communication system assisted by an intelligent reflecting surface. The difference between FIG. 19 and FIG. 3 lies in that: on the one hand, the TRP serves as an example of the network side device to replace the base station BS; and on the other hand, scenarios of uplink and downlink transmission are distinguished. That is, in FIG. 19, by adding the superscript "DL" or "UL" to each channel in FIG. 3, so that channels $$H_0^{DL}, H_t^{DL}, \text{ and } H_r^{DL}$$

in the downlink scenario or channels $$H_0^{UL}, H_t^{UL}, \text{ and } H_r^{UL}$$

in the uplink scenario are indicated.

In addition, in the following, for convenience of description, the first link or the direct link corresponding to the channel $$H_0^{DL} \text{ or } H_0^{UL}$$

is referred to as DTL, and the second link or reflection link $$\left(H_t^{DL}\Lambda H_r^{DL}\right)$$

corresponding to channel $$H_t^{DL},$$

reflection matrix $\Lambda$, and channel $$H_r^{DL}$$

or the second link or reflection link $$\left(H_r^{UL}\Lambda H_t^{UL}\right)$$

corresponding to channel $$H_r^{UL},$$

reflection matrix $\Lambda$, and channel $$H_t^{UL}$$

is referred to as RTL for short. Note that although the communication device on the network side is shown as a TRP in FIG. 19, the communication device on the network side may also be any network-side device such as a base station.

In this embodiment, the electronic device 180 is a device that receives a predetermined reference signal and estimates a delay difference, that is, a UE in (A) of FIG. 19 or a TRP in (B) of FIG. 19. Another communication device communicating with the electronic device 180 may be a TRP in (A) of FIG. 19 or a UE in (B) of FIG. 19.

In one example, preferably, the predetermined reference signal received by the electronic device 180 such as the UE in (A) of FIG. 19 or the TRP in (B) of FIG. 19 may be in a null space of the channel of the first link or direct link DTL.

For example, depending on whether the SDRS is sent in the downlink or uplink scenario, the SDRS may satisfy one of the following Equations.

$$H_0^{DL}s_{DRS} = 0 \tag{41-1}$$

$$H_0^{UL}s_{DRS} = 0 \tag{41-2}$$

In this way, in a case that another communication device (e.g., TRP in (A) of FIG. 19 or UE in (B) of FIG. 19) simultaneously transmits the predetermined reference signal $S_{DRS}$ via the direct link DTL and the reflection link RTL, the DTL spatially blocks the $S_{DRS}$, and the electronic device 180 actually only receives the predetermined reference signal $S_{DRS}$ transmitted via the RTL.

Here, the reference signal received by the electronic device 180 is simply described by taking the transmitting of the predetermined reference signal in the downlink scenario of (A) of FIG. 19 as an example. In this example, when a TRP as another communication device transmits a predetermined reference signal SDRS satisfying the above equation (41-1), a signal received by the electronic device 180 as UE may be expressed as follows.

$$y_{DRS} = H_0^{DL}s_{DRS} + H_t^{DL}\Lambda H_r^{DL}s_{DRS} + z = H_t^{DL}\Lambda H_r^{DL}s_{DRS} + z \tag{42}$$

Since $S_{DRS}$ satisfies Equation (41-1), the reference signal ( ) via DTL is spatially blocked $$H_0^{DL}s_{DRS} = 0.$$

Therefore, the electronic device 180 as the UE only receives the reference signal $$H_t^{DL}\Lambda H_r^{DL}s_{DRS}$$

from the RTL.

For the uplink scenario in (B) of FIG. 19, where the UE as another communication device transmits a predetermined reference signal, when the predetermined reference signal $S_{DRS}$ satisfies equation (41-2), the above description is similarly applicable. That is, the reference signal via the DTL is spatially blocked $$\left(H_0^{UL}s_{DRS} = 0\right),$$

and the electronic device 180 as the TRP only receives the reference signal $$H_r^{UL}\Lambda H_t^{UL}$$

from the RTL, which is not repeated here.

For the predetermined reference signal SDRS within the null space of the channel of the DTL such as described above, the electronic device 180 actually only receives the reference signal transmitted via the RTL. Therefore, the electronic device 180 may directly measure the second reception time of receiving the predetermined reference signal via the RTL, for example, through appropriate processing of the control unit 180-1, and compares the second reception time with the estimated first reception time expected to receive the predetermined reference signal via DTL, so as to estimate the delay difference between the two links.

Next, in conjunction with the examples of (A) and (B) in FIG. 19, example processing such as estimating the delay difference performed by each control unit of the electronic device 180 in different scenarios (that is, the case where the electronic device 180 receives the reference signal as the UE in (A) of FIG. 19 or the TRP in (B) of FIG. 19), and optional subsequent processing based on the estimated delay difference are described.

6.2 First Example

In the first example, for example, the electronic device 180 is first implemented as a UE in (A) of FIG. 19, that is, receives the predetermined downlink reference signal $S_{DRS}$ that satisfies the above Equation (41-1) and is sent by the TRP as another communication device.

Example Processing for Estimating Delay Difference

In this example, the control unit 180-1 of the electronic device 180 serving as the UE may be configured to: determine the transmission time of the predetermined reference signal according to the configuration and/or scheduling information of the predetermined reference signal obtained from another communication device; and estimate, based on the determined transmission time of the predetermined reference signal and timing advance information obtained from the other communication device, a first reception time when to expected to receive the predetermined reference signal via the first link.

Here, the predetermined reference signal may be a periodic, semi-periodic or aperiodic reference signal, and its specific form is not limited, as long as it meets the requirements of Equation (41-1). For a periodic predetermined reference signal, the electronic device 180 serving as a UE may, for example, obtain configuration information of the reference signal (indicating, for example, the time-frequency resource for transmitting the reference signal, etc.) from another communication device serving as a TRP via its transceiver unit 180-2 in advance. The control unit 180-1 may determine the transmission time of the reference signal accordingly. For semi-periodic or non-periodic predetermined reference signals, in addition to the configuration information, the electronic device 180 may also acquire scheduling information of the reference signal. The control unit 180-1 may determine the transmission time of the reference signal accordingly.

In addition, the electronic device 180 serving as a UE may, for example, obtain timing advance information from another communication device serving as a TRP during a random-access procedure. For example, the control unit 180-1 may acquire timing advance information based on a timing advance command (TAC) sent by the TRP. The timing advance information indicates the timing advance value configured by the network side for the UE.

The timing advance mechanism is a mechanism introduced to ensure (approximately) alignment of uplink time slot boundaries at a network side device such as a base station or a TRP in an uplink transmission scenario. The network side device such as a base station or a TRP controls the timing of receiving signals of each terminal by controlling an appropriate timing advance value (offset) of the terminal. In other words, the timing advance value set for the terminal reflects the propagation delay between the terminal and the network side device. Therefore, in an example, the control unit 180-1 of the electronic device 180 as the UE may determine, based on the timing advance information pre-acquired from another communication device serving as a TRP, the propagation delay of the first link or the direct link DTL between the UE and the TRP, for example.

The control unit 180-1 may estimate, according to the transmission time of the predetermined reference signal determined based on the configuration and/or scheduling information of the predetermined reference signal and the obtained timing advance information, the first reception time at which the predetermined reference signal SDRS is expected to be received via the first link or the direct link DTL in the above-described manner. In an example, the control unit 180-1 may add the above transmission time to the propagation delay of the DTL determined based on the timing advance information, as the first reception time.

Furthermore, since the predetermined reference signal $S_{DRS}$ is within the null space of the channel of the DTL, the electronic device 180 actually only receives the reference signal transmitted via the RTL. Therefore, the control unit 180-1 may, for example, directly measure the second reception time of receiving the predetermined reference signal via the RTL in various existing manners, and calculate a difference between the second reception time and the estimated first reception time, as the delay difference between the estimated propagation delays of the two links.

Figure 20:
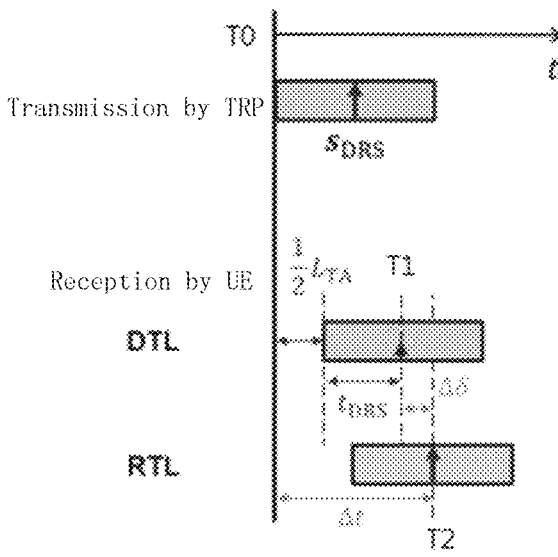
FIG. 20 is a schematic diagram illustrating an example process of estimating a delay difference based on a predetermined downlink reference signal.

Next, a specific example in which the control unit 180-1 estimates the delay difference in the above-described manner is described with reference to FIG. 20. FIG. 20 is a schematic diagram illustrating an example process of estimating a delay difference based on a predetermined downlink reference signal. In the example of FIG. 20, timing, that another communication device as the TRP transmits a predetermined reference signal $S_{DR}S$ and the electronic device 180 as the UE receives (or expects to receive) the reference signal via two links, is shown based on the time of the network side, for example, the TRP side.

As shown in the upper part of FIG. 20, the TRP transmits a radio frame carrying a predetermined reference signal $S_{DRS}$ at the time TO. The position of the $S_{DRS}$ in the radio frame is shown with a thick upward arrow. This position is determined by the timing offset $t_{DRS}$ of the $S_{DRS}$ in the radio frame.

Note that although not shown in the drawings, the electronic device 180 as the UE determines the transmission time TO of the radio frame carrying the $S_{DRS}$ and the timing offset $t_{DRS}$ of the $S_{DRS}$ in the radio frame, for example, based on configuration and/or scheduling information obtained from the TRP. In addition, the UE may acquire the timing advance information based on a timing advance command sent by the TRP, for example. The timing advance information may indicate the timing advance value $L_{TA}$ configured for the UE by the network side.

As shown in the middle part of FIG. 20, the electronic device 180 as the UE originally expects to receive the reference signal $S_{DRS}$ via the direct link DTL at the first reception time T1. The control unit 180-1 may estimate the expected first reception time T1 based on the previously obtained transmission time TO of the radio frame carrying the $S_{DRS}$, the timing advance value $L_{TA}$, and the timing offset $t_{DRS}$ of the $S_{DRS}$ in the radio frame as follows.

$$T1 = T0 + \frac{1}{2}L_{TA} + t_{DRS} \tag{43}$$

As shown in the lower part of FIG. 20, the electronic device 180 as the UE receives the reference signal $S_{DRS}$ via the reflection link RTL at the second reception time T2. For example, the control unit 180-1 may directly measure the second reception time T2 of receiving the predetermined reference signal $S_{DRS}$ via the RTL in various existing manners.

As shown in FIG. 20, the second reception time T2 satisfies the following relationship.

$$T2 = T0 + \frac{1}{2}L_{TA} + t_{DRS} + \Delta\delta \tag{44}$$

Therefore, based on the difference between the actually measured second reception time T2 and the estimated first reception time T1, the delay difference $\Delta\delta$ may be estimated in the following manner.

$$\Delta\delta = T2 - T1 \tag{45}$$

In an alternative embodiment, the control unit 180-1 may also directly measure the time difference $\Delta t$ between the time point of the received reference signal $S_{DRS}$ on the RTL link and a frame header of the radio frame sent by the TRP, and estimate the delay difference $\Delta\delta$ based on the time difference $\Delta t$ and the timing advance value $L_{TA}$ and timing offset $t_{DRS}$ in the following manner.

$$\Delta\delta = \Delta t - \frac{1}{2}L_{TA} - t_{DRS} \tag{46}$$

After the delay difference is determined, for example, in the above manner, the control unit 180-1 of the electronic device 180 serving as the UE may control the transceiver unit 180-2 to transmit, for example, delay difference information indicating the estimated delay difference to another communication device serving as the TRP.

In the subsequent communication, another communication device as the TRP may, for example, perform joint signal detection on data signals received via the first link and the second link based on the received delay difference information, to obtain a data signal sent by the electronic device 180 serving as the UE. In addition, another communication device serving as the TRP may, for example, determine a second timing advance value applicable to the second link based on the first timing advance value applicable to the first link and the received delay difference information, and transmit timing advance information indicating the first and second timing advance values to the electronic device 180 serving as the UE.

Example Processing Related to Timing Advance Value Based on Delay Difference In this example, the transceiver unit 180-2 of the electronic device 180 as the UE may be configured to receive timing advance information indicating two timing advance values from another communication device such as the TRP. The two timing advance values include: a first timing advance value $L_{TA}$ applicable to the first link or direct link DTL, and a second timing advance value $$L'_{TA}$$

that is determined based on the first timing advance value and the delay difference information and is applicable to the second link or reflection link RTL.

In an example, the second timing advance value $$L'_{TA}$$

determined based on the first timing advance value $L_{TA}$ and $\Delta\delta$ obtained from the delay difference information satisfies the following equation.

$$L'_{TA} = L_{TA} + 2\Delta\delta \tag{47}$$

After the above timing advance value is set, in an uplink scenario such as that shown in (B) of FIG. 19, the transceiver unit 180-2 of the electronic device 180 serving as the UE may, for example, under the control of the control unit 180-1, transmit a data signal to another communication device as the TRP based on the first timing advance value $L_{TA}$ via a first link or direct link (e.g., the direct link DTL in (B) of FIG. 19), and transmits a data signal to another communication device as the TRP via a second link or reflection link (e.g., the reflection link RTL in (B) of FIG. 19) based on the second timing advance value $$L'_{TA}.$$

The data signals of the two links arrive at another communication device serving as the TRP at the same time, which is equivalent to eliminate the time delay difference between the two data signals. In other words, it can be considered that the direct link DTL and the reflection link RTL are "aligned", which helps to eliminate link interference between the two links.

In practical applications, when each uplink channel such as shown in (B) of FIG. 19 satisfies the sparse channel condition, the control unit 180-1 and the transceiver unit 180-2 of the electronic device 180 as the UE may perform appropriate transmission processing through appropriate precoding processing and based on the two timing advance values, so that the data signals of the two links arrive at another communication device as the TRP at the same time, and are appropriately detected by the TRP.

Figure 22:
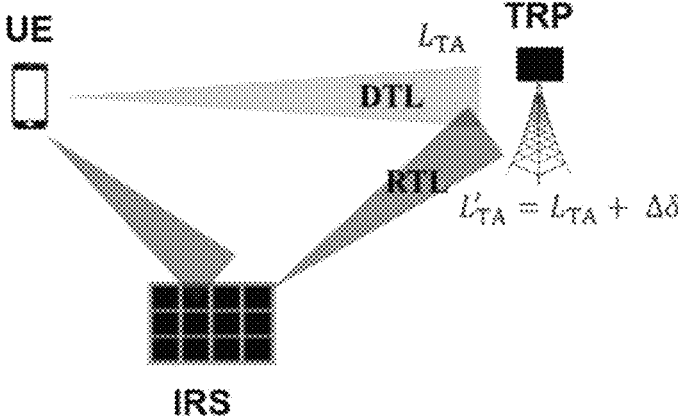
FIG. 22 is a schematic diagram illustrating a direct link and a reflection link in a case where two timing advance values are set and applied.

For intuition, reference is made back to FIG. 22. FIG. 22 is a schematic diagram explaining the direct link DTL and the reflection link RTL in the case where two timing advance values are set and applied. In the example in FIG. 22, each uplink channel satisfies the sparse channel condition, and the data signals processed by proper precoding are transmitted via the DTL and the RTL and arrive at the receiving side at the same time. In this example, the electronic device 180 as the UE transmits a data signal processed through appropriate precoding to another communication device as the TRP via the direct link DTL based on the first timing advance value $L_{TA}$, and transmits the data signal processed by proper precoding to the TRP via the reflection link RTL (via the intelligent reflecting surface IRS) based on the second timing advance value $$L'_{TA}.$$

The data signals of the two links arrive at the TRP at the same time, which is equivalent to eliminate the delay difference between the two data signals.

Next, reference is made back to FIG. 19. Here, each uplink channel satisfying the sparse channel condition refers to: each of the first channel $$\left(H_0^{UL}\right)$$

from the electronic device 180 as the UE to another communication device as the TRP, the second channel $$\left(H_r^{UL}\right)$$

from the electronic device 180 as the UE to the intelligent reflecting surface IRS, and the third channel $$\left(H_t^{UL}\right)$$

from the intelligent reflecting surface IRS to another communication device as the TRP is a sparse channel.

The sparse channel condition may be expressed by the following mathematical formula.

$$\begin{cases} \operatorname{rank}\left(H_0^{UL}\right) < \min\{N_t, N_r\} \\ \operatorname{rank}\left(H_t^{UL}\right) < \min\{N_t, M\} \\ \operatorname{rank}\left(H_r^{UL}\right) < \min\{M, N_r\} \end{cases} \tag{48}$$

In Formula (48), rank(•) represents the rank of the matrix. $N_r$ represents the number of antennas of the electronic device 180 as the UE. $N_t$ represents the number of antennas of another communication device as the TRP. M represents the number of reflection units of the intelligent reflecting surface. The above formula (48) requires the rank of each channel matrix to be small enough, that is, the physical channel should be sparse enough.

When the sparse channel condition is met, the transceiver unit 180-2 of the electronic device 180 as the UE may, under the control of the control unit 180-1, transmits, based on the first timing advance value $L_{TA}$, the first data signal precoded by the first precoding matrix $P_{DTL}$ to another communication device as the TRP via the first link DTL and the second link RTL. In addition, the transceiver unit 180-2 may transmits, under the control of the control unit 180-1 and based on the second timing advance value, the second data signal precoded by the second precoding matrix $P_{RTL}$ to another communication device serving as the TRP via the DTL and the second link RTL.

Here, the first precoding matrix $P_{DTL}$ is in the null space of the second channel $$H_r^{UL},$$

and the second precoding matrix $P_{RTL}$ is in the null space of the first channel $$H_0^{UL}.$$

That is, the following equation is satisfied.

$$H_0^{DL}P_{DTL} = 0 \tag{49-1}$$

$$H_0^{UL}P_{RTL} = 0 \tag{49-2}$$

In this case, it is assumed that symbols of data signals to be transmitted via the DTL and RTL are $S_{DTL}$ and $S_{RTL}$, respectively. Then, for example, the first and second data signals precoded by the control unit 180-1 with the first and second precoding matrices respectively are $x_{DTL}=P_{DTL}S_{DTL}$ and $x_{RTL}=P_{RTL}S_{RTL}$. Since the difference between the timing advance values of the first and second precoding matrices corresponds to the propagation delay difference, the two data signals arrive at the TRP side at the same time. Further, Equations (48-1) and (48-2) are substituted, and the received signal at the TRP side may be expressed as follows.

$$y = \left(H_0^{DL} + H_r^{UL}\Lambda H_t^{UL}\right)(x_{DTL} + x_{RTL}) + z = \tag{50}$$

$$H_0^{DL}P_{DTL}s_{DTL} + H_r^{UL}\Lambda H_t^{UL}P_{RTL}s_{RTL} + z$$

For the above received signal, for example, the TRP side may perform joint data signal detection by appropriately setting a detection matrix, so as to obtain the first and second data signals sent by the UE side.

6.3 Second Example

In the second example, the electronic device 180 is first implemented as the TRP in (B) of FIG. 19, that is, receives an uplink predetermined reference signal $S_{DRS}$ that satisfies the above Equation (41-2) and is sent by the UE that is another communication device.

Example Processing for Estimating Delay Difference

In this example, the transceiver unit 180-2 of the electronic device 180 as the TRP may be configured to: under the control of the control unit 180-1, receive the first reception time of the predetermined reference signal via the first link based on a predetermined expectation, and provide configuration and/or scheduling information of a predetermined reference signal to another communication device serving as the UE.

The transmission time or reception time of the uplink reference signal is determined according to the configuration and/or scheduling of the network side. Therefore, in this example, the electronic device 180 as the network side device TRP, for example, may first determine the first reception time at which the predetermined reference signal is expected to be received via the first link DTL, and provides corresponding configuration and/or scheduling information to another communication device serving as the UE based on the determined first reception time, so that the predetermined reference signal sent by another communication device serving as the UE according to the configuration and/or scheduling information is received by the electronic device 180 serving as the network side device TRP at the first reception time.

Here, the predetermined reference signal may be a periodic, semi-periodic or aperiodic reference signal, and its specific form is not limited, as long as the requirements of Equation (41-2) are meet. For a periodic predetermined reference signal, the electronic device 180 as the network side device TRP may, for example, transmit the configuration information (where the configuration information of the reference signal indicates, for example, the time-frequency resource for transmitting the reference signal, etc.) of the reference signal to another communication device as the UE via its transceiver unit 180-2 in advance, so that the UE can determine the transmission time of the reference signal accordingly. For a semi-periodic or non-periodic predetermined reference signal, in addition to the configuration information, scheduling information of the reference signal may also be provided, so that the UE can determine the transmission time of the reference signal accordingly.

In addition, the electronic device 180 serving as the network side device TRP may, for example, provide timing advance information to another communication device serving as the UE during a random access process. For example, the transceiver unit 180-2 may transmit, under the control of the control unit 180-1, a timing advance command (TAC) as the timing advance information, which indicates the timing advance value configured by the network side for the UE. For example, the UE may determine the time for actually transmitting the predetermined reference signal based on the configuration and/or scheduling information of the predetermined reference signal and the timing advance information, so that the network side can expect to receive the predetermined reference signal via the first link at the predetermined first reception time. In an example, the UE may subtract the first reception time from the propagation delay of the DTL determined based on the timing advance information, as the time for transmitting the predetermined reference signal.

Furthermore, since the predetermined reference signal $S_{DRS}$ is within the null space of the channel of the DTL, the electronic device 180 actually only receives the reference signal transmitted via the RTL. Therefore, the control unit 180-1 may, for example, directly measure the second reception time of receiving the predetermined reference signal via the RTL in various existing manners, and calculate a difference between the second reception time and the predetermined first reception time, as the delay difference between the estimated propagation delays of the two links.

Figure 21:
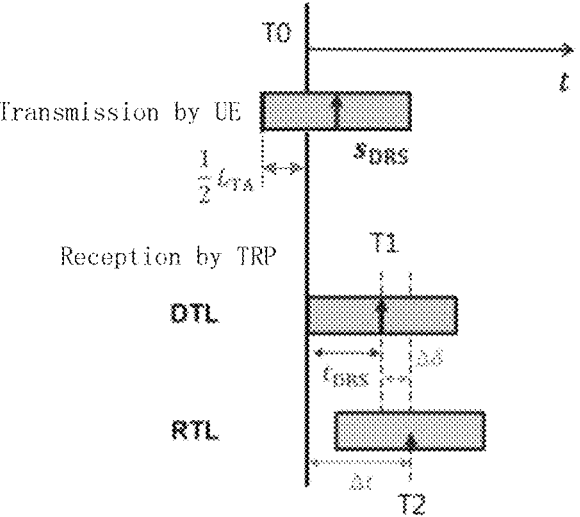
FIG. 21 is a schematic diagram illustrating an example process of estimating a delay difference based on a predetermined uplink reference signal.

Next, a specific example in which the control unit 180-1 estimates the delay difference in the above manner is described with reference to FIG. 21. FIG. 21 is a schematic diagram illustrating an example process of estimating a delay difference based on a predetermined uplink reference signal. In the example of FIG. 21, taking the time on the network side, such as the electronic device 180 as the TRP, as a reference, a timing sequence in which another communication device as the UE transmits a predetermined reference signal $S_{DRS}$ and the electronic device 180 as the TRP receives (or expects to receive) the reference signal via the two links is shown.

As shown in the upper part of FIG. 21, the UE as another device transmits a radio frame carrying a predetermined reference signal $S_{DRS}$ at $(T0-0.5L_{TA})$ before the time TO. The position of the $S_{DRS}$ in the radio frame is shown with a thick upward arrow. The position is determined by, for example, a timing offset $t_{DRS}$ of the $S_{DRS}$ in a radio frame determined based on configuration information or the like.

Note that although not shown in the drawings, the electronic device 180 as the TRP may, for example, provide configuration and/or scheduling information of the reference signal $S_{DRS}$ to the UE. The information indicates, for example, the reception time TO at which the radio frame carrying the $S_{DRS}$ is expected to be received via the DTL and the timing offset $t_{DRS}$ of the $S_{DRS}$ in the radio frame. The above information is obtained, for example, by the control unit 180-1 of the electronic device 180 based on the predetermined first reception time T1 expected to receive the $S_{DRS}$ via the DTL. In addition, the UE may acquire timing advance information based on a timing advance command sent by the electronic device 180 serving as the TRP, for example. The timing advance information may indicate the timing advance value $L_{TA}$ configured for the UE by the network side. The UE may transmit a radio frame carrying a predetermined reference signal $S_{DRS}$ with a specified timing offset $t_{DRS}$ at $(T0-0.5L_{TA})$ before the time TO based on the acquired above information.

As shown in the middle part of FIG. 21, the electronic device 180 as the TRP originally expects to receive the reference signal $S_{DRS}$ via the direct link DTL at the first reception time T1.

$$T1 = T0 + t_{DRS} \tag{51}$$

In addition, as shown in the lower part of FIG. 21, the electronic device 180 as the TRP receives the reference signal $S_{DRS}$ via the reflection link RTL at a second reception time T2. The control unit 180-1 may directly measure the second reception time T2 of receiving the predetermined reference signal $S_{DRS}$ via the RTL, for example, in various existing manners.

As shown in FIG. 21, the second reception time T2 satisfies the following relationship.

$$T2 = T0 + t_{DRS} + \Delta\delta \tag{52}$$

Therefore, based on the difference between the actually measured second reception time T2 and the predetermined first reception time T1, the delay difference $\Delta\delta$ is estimated as follows.

$$\Delta\delta = T2 - T1 \tag{53}$$

In an alternative implementation, the control unit 180-1 of the electronic device 180 as TRP may also directly measure the time difference $\Delta t$ between the time point of the received reference signal $S_{DRS}$ on the RTL link and the frame header of the radio frame expected to be received by the TRP, and estimate the delay difference $\Delta\delta$ in the following manner based on the time difference $\Delta t$ and the timing offset $t_{DRS}$ of the reference signal $S_{DRS}$ in the radio frame.

$$\Delta\delta = \Delta t - t_{DRS} \tag{54}$$

After the delay difference is determined, for example, the control unit 180-1 of the electronic device 180 as the TRP may perform subsequent processing in an appropriate manner based on the determined delay difference, so as to eliminate adverse effects of the delay difference.

Example Processing of Joint Channel Detection Based on Delay Difference

In an example, in the subsequent communication, the electronic device 180 as the TRP may, for example, perform joint signal detection on the data signals received via the first link and the second link based on the estimated delay difference, to obtain a data signal sent by another communication device serving as the UE.

As an example only, an example process of joint channel detection performed by the control unit 180-1 of the electronic device 180 is described here under the condition of known time delay difference.

It is assumed that another communication device serving as the UE transmits a signal $x_1$ at time t, and a signal $x_2$ at time $t+\Delta\delta$. Then, on the side of the electronic device 180 serving as the TRP, the received signal $x_1$ from the RTL may superimpose the signal $x_2$ from the DTL. Therefore, the signal actually received by the TRP is in the following form.

$$y_{UL} = H_0^{UL} x_2 + H_r^{UL} \Lambda H_t^{UL} x_1 + z \qquad (55)$$

The specific signal detection may be flexibly designed, and only one example is given herein. As mentioned earlier, $$H_0^{UL}$$

is a $N_r \times N_r$ matrix. The rank of the matrix $$H_0^{UL}$$

is expressed as r, that is, $$r = \text{rank}\big(H_0^{UL}\big).$$

r is a positive integer, and there is a relationship of $r \leq \min\{N_t, N_r\}$.

First, SVD decomposition is performed on $$H_0^{UL}$$

to obtain the following Equation (56).

$$H_0^{UL} = \begin{bmatrix} U & \tilde{U} \end{bmatrix} \begin{bmatrix} \sum' & 0 \\ 0 & 0 \end{bmatrix} \begin{bmatrix} V^H \\ \tilde{V}^H \end{bmatrix} = \begin{bmatrix} U\sum' & 0 \end{bmatrix} \begin{bmatrix} V^H \\ \tilde{V}^H \end{bmatrix} = U\sum' V^H \qquad (56)$$

In Equation (56), $U^H \tilde{U}=0$. Here, U is a $N_r \times r$ matrix. $\tilde{U}$ is a $N_r \times (N_r-r)$ matrix, and there are relationships of $U^H \tilde{U}=0$, $U^H U=I_r$, and $\tilde{U}^H \tilde{U}=I_{N_r-r}$. I represents an identity matrix of the corresponding dimension. $\Sigma'$ is an $r \times r$ diagonal matrix, and its diagonal elements are the singular values of $$H_0^{UL}.$$

V is a $N_r \times r$ matrix. $\tilde{V}$ is an $N_r \times (N_r-r)$ matrix, and there are relationships of $V^H \tilde{V}=0$, $V^H V=I_r$, and $\tilde{V}^H \tilde{V}=I_{N_r-r}$.

Next, $N_r$ column vectors are randomly selected from $\tilde{U}$ to form a new matrix F, and it is easy to verify that $F^H U=0$.

Then, $y_{UL}$ of Equation (55) is multiplied by $F^H$ to the left to obtain the following Equation (57).

$$y_1 = F^H y_{UL} = F^H H_0^{UL} x_2 + F^H H_r^{UL} \Lambda H_t^{UL} x_1 + F^H z \qquad (57)$$

Here, there is a relationship of $$F^H H_0^{UL} x_2 = F^H U \sum' V^H x_2 = 0.$$

It is assumed that $$T_e = F^H H_r^{UL} \Lambda H_t^{UL}$$

is the equivalent transmission matrix of signal $x_1$, then there is the following Equation (58).

$$y_1 = T_e x_1 + F^H z \qquad (58)$$

Through zero forcing (Zero Forcing, ZF) detection, the detection result that the signal $x_1$ sent at the time t is obtained as follows.

$$\hat{x}_1 = T_e^{-1} y_1 = x_1 + T_e^{-1} F^H z \qquad (59)$$

Equation (60) is obtained according to Equation (55).

$$y_2 = y_{UL} - H_r^{UL} \Lambda H_t^{UL} x_1 = H_0^{UL} x_2 + \hat{z} \qquad (60)$$

In Equation (60), $$\hat{z} = \big(I - H_r^{UL} \Lambda H_t^{UL} T_e^{-1} F^H\big)z$$

is the equivalent noise. Through the ZF detection, the detection result that the signal $x_2$ sent at time $t+\Delta\delta$ is obtained as follows.

$$\hat{x}_2 = H_0^{UL\dagger} y_2 = x_2 + H_0^{UL\dagger} \hat{z} \qquad (61)$$

In Equation (61), $$H_0^{UL\dagger}$$

is the pseudo-inverse matrix of $$H_0^{UL}.$$

The foregoing describes an example process of joint channel detection performed by an electronic device when a time delay difference is known. Those skilled in the art can understand that in the case of knowing the propagation delay difference, various existing manners can be applied to perform the joint signal detection, not limited to the situation described above as an example.

In addition, when performing joint channel detection, it is necessary to know the channel matrix of each channel. These channel matrices may be obtained through actual measurements. Alternatively, these channel matrices are obtained in the manner described in the "supplementary example of the determination unit recovering the complete channel" in the first embodiment above, that is, the manner of recovering the complete channel based on the integrated sub-channels, which is not repeated here.

Example Processing Related to Timing Advance Value Based on Delay Difference In this example, the control unit 180-1 of the electronic device 180 serving as the TRP may be configured to: determine the second timing advance value $$L'_{TA}$$

applicable to the second link or the reflection link RTL, based on the first timing advance value $L_{TA}$ applicable to the first link or direct link DTL and the estimated delay difference. In addition, the transceiver unit 180-2 of the electronic device 180 may be configured to: transmit timing advance information indicating the first timing advance value and the second timing advance value to another communication device serving as the UE.

In one example, the second timing advance value $$L'_{TA}$$

determined by the control unit 180 based on the first timing advance value $L_{TA}$ and $\Delta\delta$ obtained from the delay difference information satisfies the following Equation (47).

$$L'_{TA} = L_{TA} + 2\Delta\delta \qquad (47)$$

After the above timing advance value is set, in an uplink scenario such as that shown in (B) of FIG. 19, another communication device as the UE may, for example, transmit a data signal to another communication device as the TRP via the direct link DTL based on the first timing advance value $L_{TA}$ in the manner described in the first example of 6.2 above, and transmit a data signal to the TRP via the reflection link RTL based on the second timing advance value $$L'_{TA}.$$

In practical applications, when each uplink channel such as shown in (B) of FIG. 19 satisfies the previously described sparse channel condition, another communication device as the UE may perform appropriate transmission processing through appropriate precoding processing and based on two timing advance values, so that the data signals of the two links arrive at the electronic device 180 as the TRP at the same time (for example, similar to the situation previously described with reference to FIG. 22), and may be detected by the electronic device 180 as the TRP through appropriate processing.

Here, each uplink channel satisfying the sparse channel condition refers to: each of the first channel $$\left(H_0^{UL}\right)$$

from another communication device as the UE to the electronic device 180 as the TRP, the second channel $$\left(H_r^{UL}\right)$$

from another communication device as the UE to the intelligent reflecting surface IRS, and the third channel $$\left(H_t^{UL}\right)$$

from the intelligent reflecting surface IRS to the electronic device 180 as the TRP is a sparse channel. As an example, these sparse channels satisfy the conditions previously described with reference to Equation (48).

When the above sparse channel condition is satisfied, another communication device as the UE may transmit, via the first link DTL and the second link RTL, the first data signal precoded based on the first precoding matrix $P_{DTL}$ to the electronic device as the TRP according to the first timing advance value $L_{TA}$. In addition, another communication device serving as the UE may transmit, via the first link DTL and the second link RTL, the second data signal precoded based on the second precoding matrix $P_{RTL}$ to the electronic device serving as the TRP according to the second timing advance value.

Here, the first precoding matrix $P_{DTL}$ is in the null space of the second channel $$H_r^{UL},$$

and the second precoding matrix $P_{RTL}$ is in the null space of the first channel $$H_0^{UL},$$

that is, satisfying the previously described Equation (49-1), and (49-2).

It is assumed that data signals (symbols) to be transmitted by DTL and RTL are $S_{DTL}$ and $S_{RTL}$, respectively. Then, for example, the first and second data signals precoded by another communication device as the UE with the first and second precoding matrices are respectively $x_{DTL}=P_{DTL}S_{DTL}$ and $X_{RTL}=P_{RTL}S_{RTL}$. Since the difference between the timing advance values of the first and second data signals corresponds to the propagation delay difference, the two data signals arrive at the TRP side at the same time. In this case, the signal received on the TRP side, that is, the joint signal data may be expressed as the following Equation (50).

$$y = \left(H_0^{DL} + H_r^{UL}\Lambda H_t^{UL}\right)(x_{DTL} + x_{RTL}) + z = \qquad (50)$$
$$H_0^{DL}P_{DTL}s_{DTL} + H_r^{UL}\Lambda H_t^{UL}P_{TRL}s_{RTL} + z$$

For the above received signal, the electronic device 180 as the TRP may, for example, perform joint data signal detection by setting a detection matrix appropriately, so as to obtain the first and second data signals sent by the UE side.

In one example, for the received signal, that is, the joint signal data, for example, having the form of the above Equation (50), the control unit 180-1 of the electronic device 180 as the TRP may be configured to: detect the first data signal from the received joint data signal y based on the first signal detection matrix $W_{DTL}$; and detect the second data signal from the received joint data signal y based on the second signal detection matrix $W_{PTL}$.

Here, the first signal detection matrix $W_{DTL}$ is designed such that the third channel $$H_t^{UL}$$

is in the null space of the first signal detection matrix $W_{DTL}$, and the second signal detection matrix $W_{PTL}$ is designed such that the first channel $$H_0^{UL}$$

is within the null space of the second signal detection matrix $W_{PTL}$. That is, the following equations are satisfied.

$$W_{DTL}H_t^{UL} = 0 \qquad (62\text{-}1)$$

$$W_{PTL}H_0^{UL} = 0 \qquad (62\text{-}2)$$

Based on Equations (62-1) and (50), it can be found that based on the first signal detection matrix $W_{DTL}$, the part $y_{DTL}$ corresponding to the symbol $s_{DTL}$ of the first data signal is detected from the received joint data signal y as follows.

$$y_{DTL} = W_{DTL}y = W_{DTL}H_0^{UL}P_{DTL}s_{DTL} + W_{DTL}z = T_{DTL}s_{DTL} + \hat{z}_{DTL} \qquad (63\text{-}1)$$

In (63-1), there are relationships of $$T_{DTL} = W_{DTL}H_0^{UL}P_{DTL} \text{ and } \hat{z}_{DTL} = W_{DTL}z.$$

For example, the detection result of the symbol $s_{DTL}$ of the first data signal may be obtained by multiplying the above-mentioned part of $y_{DTL}$ by $$T_{DTL}^{-1}$$

to the left through zero forcing (ZF) detection.

$$\widehat{s_{DTL}} = T_{DTL}^{-1}y_{DTL} = s_{DTL} + T_{DTL}^{-1}\hat{z}_{DTL} \qquad (64\text{-}1)$$

Similarly, based on Equations (62-2) and (50), it can be found that the part $y_{RTL}$ corresponding to the symbol $s_{RTL}$ of the second data signal may be detected from the received joint data signal y based on the second signal detection matrix $W_{RTL}$ as follows.

$$y_{RTL} = \qquad (63\text{-}2)$$
$$W_{RTL}y = W_{RTL}H_r^{UL}EH_t^{UL}P_{RTL}s_{RTL} + W_{RTL}z = T_{RTL}s_{RTL} + \hat{z}_{RTL}$$

In (63-2), there are relationships of $$T_{RTL} = W_{RTL}H_r^{UL}\Lambda H_t^{UL} \text{ and } \hat{z}_{RTL} = W_{RTL}z.$$

For example, the detection result of the symbol $s_{RTL}$ of the first data signal may be obtained by multiplying the above-mentioned part of $y_{RTL}$ by $$T_{RTL}^{-1}$$

to the left through zero forcing (ZF) detection.

$$\widehat{s_{RTL}} = T_{RTL}^{-1}y_{RTL} = s_{RTL} + T_{RTL}^{-1}\hat{z}_{RTL} \qquad (64\text{-}2)$$

Thus, the control unit 180-1 of the electronic device 180 serving as the TRP may respectively detect the first data signal and the second data signal sent by another communication device serving as the UE.

(Variations about Link Usage)

In the above description, by default, in a system such as that shown in FIG. 3, the first link or direct link DTL and the second link or reflection link RTL are always utilized simultaneously. In practical applications, whether in an uplink scenario or a downlink scenario, the communication device at the receiving end or the transmitting end (e.g., the electronic device in the first example of 6.2 or the second example of 6.3) may determine to utilize one or both of the two links based on channel conditions (such as channel capacity, channel quality, etc.).

Therefore, in this variation, the control unit of the electronic device may, for example, acquire channel information indicating the channel capacity of the first link or the signal quality of the received signal received via the first link, and determine to utilize one or both of the first link and the second link based on the obtained channel information and predetermined rules related to channel capacity or signal quality.

For example, the predetermined rules may include that: in a case that the channel capacity or signal quality is greater than a first threshold, only the first link is utilized; in a case that the channel capacity or signal quality is between the first threshold and the second threshold less than the first threshold, the first link and the second link are both utilized; and in a case that the channel capacity or signal quality is less than the second threshold, only the second link is utilized.

The above channel information indicating the channel capacity or signal quality may be obtained in various existing manners, which are not described in detail herein.

Furthermore, simulation is performed for the detection of received signal in the case of the sparse channel described above. In the simulation, a 4×4 uniform planar antenna array serves as the electronic device on the receiving side of the TRP. Another communication device serving as the transmitting side of the UE adopts a 2×2 uniform planar antenna array. The intelligent reflecting surface IRS is an 8×8 uniform planar array. All arrays have an element spacing of half a wavelength. The simulation adopts the Rician channel model. The Rice factor is 10 dB. Channels $$H_0^{UL}, H_r^{UL} \text{ and } H_t^{UL}$$

such as shown in (B) in FIG. 19 and the reflection matrix $\Lambda$ of the intelligent reflection surface IRS are set in advance. The reflection matrix $\Lambda$ is set such that the link gain $$\left\| H_r^{UL} \Lambda H_t^{UL} \right\|_F^2$$

of the RTL is maximized. Further, the distance between the UE and the IRS is $d_{IU}$=1.5 km. The distance between the IRS and the TRP is $d_{TI}$=5 km. The distance between UE and TRP is $d_{TU}$=5 km. The distance difference between the reflection link and the direct link is $\Delta d = d_{TI} + d_{IU} - d_{TU}$=1.5 km. That is, $\Delta d$ is larger than the delay difference threshold $\Delta\delta_{th}$ between different links that the cyclic prefix can tolerate described earlier with reference to Equation (40).

Figure 23:
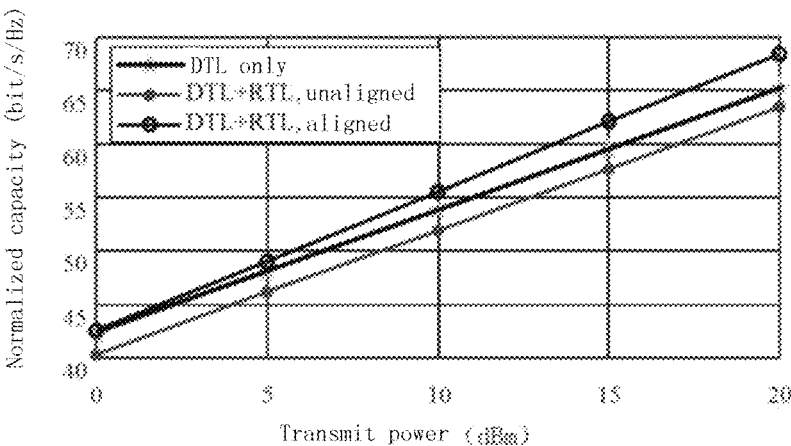
FIG. 23 is a schematic diagram illustrating a simulation of normalized capacity of a channel in various uses of the direct link and the reflection link.

The simulation result is shown in FIG. 23, which is a schematic simulation diagram explaining the normalized capacity of the channel when the direct link DTL and the reflection link RTL are utilized in different ways. In FIG. 23, the horizontal axis shows transmit power, and the vertical axis shows normalized capacity. The case of utilizing only DTL, the case of utilizing both DTL and RTL when no processing is done for the delay difference (i.e., DTL and RTL are not "aligned"), and the case of utilizing the DTL and the RTL when the second timing advance value set for the delay difference is adopted and corresponding processing is performed (that is, DTL and RTL are "aligned") are shown.

It can be seen from FIG. 23 that in this example, if no processing is performed on the delay difference, that is, the DTL and the RTL are not "aligned", introducing the IRS and utilizing both the DTL and the RTL may result in degradation of the system performance. Instead, after adopting the second timing advance value set for the delay difference and performing corresponding processing, the system performance can be improved due to the elimination of cross link interference (CLI).

7. Configuration Example of Fifth Embodiment

7.1 Configuration Example

The configuration of the electronic device according to the fifth embodiment of the present disclosure may be similar to that of the fourth embodiment. That is, the electronic device 180 according to the fifth embodiment may also include the control unit 180-1 and the transceiver unit 180-2, and may also be applied to the system previously described with reference to FIGS. 3 and 19.

The difference between the electronic device of the fifth embodiment and the electronic device of the fourth embodiment that receives the predetermined reference signal is that, the electronic device in the fifth embodiment is a communication device that transmits a predetermined reference signal, for example, transmit the predetermined reference signal as the TRP in (A) of FIG. 19 or the UE in (B) of FIG. 19. Another communication device communicating with the electronic device in the fifth embodiment may be the electronic device in the fourth embodiment that receives the predetermined reference signal, that is, the UE in (A) of FIG. 19 or the TRP in (B) of FIG. 19. Since the processing performed by the communication device transmitting the predetermined reference signal has actually been described in the description of the fourth embodiment, the details are not repeated in the fifth embodiment, and only an overview and necessary supplementary descriptions are given.

According to the fifth embodiment, under the control of the control unit 180-1 of the electronic device 180 in this embodiment, the transceiver unit 180-2 may transmit, via the first link from the electronic device to another communication device (directly link) and a second link (reflection link) from the electronic device to another communication device via the intelligent reflecting surface, a predetermined reference signal to another communication device, for said another communication device to calculate a difference between a first reception time expected to receive the predetermined reference signal via the first link and a second reception time at which the predetermined reference signal is actually received via the second link, so as to estimate the delay difference between the propagation delay of the first link and the propagation delay of the second link. As mentioned above, another communication device here may be the electronic device described above according to the fourth embodiment.

In one example, preferably, the predetermined reference signal sent by the electronic device 180 of this embodiment such as the TRP in (A) of FIG. 19 or the UE in (B) of FIG. 19 may be in the null space of the channel of the first link or the direct link DTL.

For example, depending on whether the predetermined reference signal $S_{DRS}$ is sent in the downlink or uplink scenario, the predetermined reference signal $S_{DRS}$ may satisfy one of the following equations.

$$H_0^{DL} s_{DRS} = 0 \qquad (41\text{--}1)$$

$$H_0^{UL} s_{DRS} = 0 \qquad (41\text{--}2)$$

In this way, when the electronic device of this embodiment transmits the predetermined reference signal $S_{DRS}$ via the direct link DTL and the reflection link RTL at the same time, the DTL may spatially block the $S_{DRS}$. The other communication device at the receiving side actually receives the predetermined reference signal $S_{DRS}$ transmitted via the RTL only.

The control unit of the electronic device in this embodiment may be configured, for example, to determine the predetermined reference signal in the null space of the channel by performing singular value decomposition on the channel of the first link.

Taking the scenario of transmitting a downlink reference signal in (A) of FIG. 19 as an example, the control unit of the electronic device in this embodiment may perform, in the manner previously described in 6.3 of second example of fourth embodiment, SVD decomposition on the $$H_0^{UL}$$

of the first link, to obtain the following decomposition result of Equation (56).

$$H_0^{UL} = \begin{bmatrix} U & \tilde{U} \end{bmatrix} \begin{bmatrix} \sum' & 0 \\ 0 & 0 \end{bmatrix} \begin{bmatrix} V^H \\ \tilde{V}^H \end{bmatrix} = \begin{bmatrix} U\sum' & 0 \\ 0 & 0 \end{bmatrix} \begin{bmatrix} V^H \\ \tilde{V}^H \end{bmatrix} = U\sum' V^H \quad (56)$$

Based on the vector $\tilde{V}$ obtained from the above decomposition, the control unit may obtain the following reference signal $S_{DRS}$, for example.

$$s_{DRS} = \gamma \tilde{V} x \quad (65)$$

In (65), x is an arbitrary vector. y is a normalization factor, for ensuring that the power constraint $$\|s_{DRS}\|_2^2 \le \rho_T$$

(transmit power) is established. The reference signal $S_{DRS}$ determined in this way is within the null space of the channel $$H_0^{UL}$$

of the first link.

Next, with reference to the examples of (A) and (B) in FIG. 19, an overview of example processing performed by each unit of the electronic device 180 in different scenarios (i.e., when the electronic device 180 transmits a reference signal as the TRP in (A) of FIG. 19 or as the UE in (B) of FIG. 19) is outlined.

7.2 First Example

In the first example, the electronic device 180 is first implemented as the TRP in (A) of FIG. 19, i.e., transmits a downlink predetermined reference signal $S_{DRS}$ satisfying the above Equation (41-1) to the UE which is another communication device. The UE as another communication device may be, for example, the electronic device described earlier in the first example of the fourth embodiment.

In this example, the transceiver unit 180-2 of the electronic device 180 serving as the TRP may be configured to: under the control of the control unit 180-1, provide a configuration and/or scheduling information of a predetermined reference signal to another communication device serving as the UE, so as to indicate the transmission time of the predetermined reference signal.

Here, the predetermined reference signal may be a periodic, semi-periodic or aperiodic reference signal, and its specific form is not limited, as long as it meets the requirements of Equation (41-1). For a periodic predetermined reference signal, the transceiver unit 180-2 of the electronic device 180 as the TRP may provide the configuration information (where the configuration information of the reference signal indicates, for example, the time-frequency resource for transmitting the reference signal, etc.) of the reference signal to the UE as another communication device, and determine the transmission time of the reference signal accordingly. For a semi-periodic or aperiodic predetermined reference signal, in addition to the configuration information, scheduling information of the reference signal may also be provided, and the UE may determine the transmission time of the reference signal accordingly.

In addition, the electronic device 180 serving as the network side device TRP may, for example, provide timing advance information to another communication device serving as the UE during a random access process. For example, a timing advance command (TAC) may be sent to the UE as the timing advance information. The timing advance information indicates the timing advance value configured by the network side for the UE.

The UE may estimate, based on the transmission time of the predetermined reference signal determined according to the configuration and/or scheduling information of the predetermined reference signal and the obtained timing advance information, a first reception time expected to receive the predetermined reference signal SDRS via the first link or the direct link DTL. In addition, the UE may directly measure the second reception time of receiving the predetermined reference signal via the RTL in various existing manners, and calculate the difference between the second reception time and the estimated first reception time, as the delay difference between the estimated propagation delays of the two links. The UE may transmit delay difference information indicating the estimated delay difference to, for example, the electronic device in this embodiment serving as the TRP.

Correspondingly, the transceiver unit of the electronic device in this embodiment may receive delay difference information indicating the estimated delay difference from another communication device serving as the UE.

In an example, in subsequent communication, the control unit 180-1 of the electronic device in this embodiment as the TRP may, for example, perform, based on the received delay difference information, joint signal detection on data signals received via the first link and the second link, to obtain a data signal sent by another communication device serving as the UE. For details of the joint signal detection, for example, reference is made to the part described above in the second example of the fourth embodiment ("example processing of joint channel detection based on time delay difference"), and thus are not repeated here.

In addition, in the subsequent communication, in another example, the control unit 180-1 of the electronic device of this embodiment as the TRP may be configured to: determine a second timing advance value $$L'_{TA}$$

applicable to the second link or reflection link RTL based on the first timing advance value $L_{TA}$ applicable to the first link or the direct link DTL and the received delay difference information. In addition, the transceiver unit 180-2 of the electronic device 180 may be configured to: transmit timing advance information indicating the first timing advance value and the second timing advance value to another communication device serving as the UE. The details of determining the timing advance value are similar to those of the fourth embodiment, and thus are not repeated here.

In practical applications, when each uplink channel such as shown in (B) of FIG. 19 satisfies the previously described sparse channel condition, another communication device as the UE may perform appropriate transmission processing through appropriate precoding processing and based on two timing advance values, so that the data signals of the two links arrive at the electronic device 180 as the TRP at the same time, and may be detected by the electronic device 180 as the TRP through appropriate processing.

Here, each uplink channel satisfying the sparse channel condition refers to: each of the first channel $$\left(H_0^{UL}\right)$$

from another communication device as the UE to the electronic device 180 as the TRP, the second channel $$\left(H_r^{UL}\right)$$

from another communication device as the UE to the intelligent reflecting surface IRS, and the third channel $$\left(H_t^{UL}\right)$$

from the intelligent reflecting surface IRS to the electronic device 180 as the TRP is a sparse channel. As an example, these sparse channels satisfy the conditions previously described with reference to Equation (48).

When the above sparse channel condition is satisfied, another communication device as the UE may transmit, via the first link DTL and the second link RTL, the first data signal precoded based on the first precoding matrix $P_{DTL}$ to the electronic device as the TRP according to the first timing advance value $L_{TA}$. In addition, another communication device serving as the UE may transmit, via the first link DTL and the second link RTL, the second data signal precoded based on the second precoding matrix $P_{RTL}$ to the electronic device serving as the TRP according to the second timing advance value. Here, the first precoding matrix $P_{DTL}$ is in the null space of the second channel $$H_r^{UL},$$

and the second precoding matrix $P_{RTL}$ is in the null space of the first channel $$H_0^{UL},$$

that is, satisfying the previously described Equation (49-1), and (49-2).

In this case, the transceiver unit 180-2 of the electronic device 180 serving as the TRP may be configured to receive, under the control of the control unit 180-1 and via the first link and the second link, a joint data signal from another communication device serving as the UE. The joint data signal includes a first data signal precoded by the first precoding matrix and sent according to the first timing advance value $P_{DTL}$ and a second data signal precoded by the second precoding matrix and sent according to the second timing advance value $P_{RTL}$.

In addition, the control unit 180-1 of the electronic device 180 as the TRP may be configured to: detect the first data signal from the received joint data signal based on the first signal detection matrix $W_{DTL}$, and detect the second data signal from the received joint data signal based on the second signal detection matrix $W_{PTL}$. Here, the first signal detection matrix $W_{DTL}$ is designed such that the third channel $$H_t^{UL}$$

is within the null space of the first signal detection matrix $W_{DTL}$. The second signal detection matrix $W_{PTL}$ is designed such that the first channel $$H_0^{UL}$$

is within the null space of the second signal detection matrix $W_{PTL}$. That is, Equations (62-1), (62-2) described previously are satisfied. The details of the detection are similar to those of the fourth embodiment and thus are not repeated here.

7.3 Second Example

In the second example, the electronic device 180 is first implemented as the UE in (B) of FIG. 19, i.e., transmits an uplink predetermined reference signal $S_{DRS}$ satisfying the above Equation (41-2) to the TRP as another communication device. The TRP as another communication device may be, for example, the electronic device previously described in the second example of the fourth embodiment.

In this example, the transceiver unit 180-2 of the electronic device 180 serving as the UE may be configured to: under the control of the control unit 180-1, acquire configuration and/or scheduling information of a predetermined reference signal predetermined based on an expected first reception time from a TRP serving as another communication device. Furthermore, the control unit 180-2 may be configured to determine the transmission time of the predetermined reference signal based on the obtained configuration and/or scheduling information and timing advance information obtained from the TRP as another communication device.

Here, the predetermined reference signal may be a periodic, semi-periodic or aperiodic reference signal, and its specific form is not limited, as long as the requirements of Equation (41-2) are meet. For a periodic predetermined reference signal, the transceiver unit 180-2 of the electronic device 180 as the UE may acquire the configuration information (where the configuration information of the reference signal indicates, for example, the time-frequency resource for transmitting the reference signal, etc.) of the reference signal from another communication device as the TRP, and the control unit may determine the transmission time of the reference signal accordingly. For a semi-periodic or aperiodic predetermined reference signal, in addition to the configuration information, scheduling information of the reference signal may also be acquired, and the control unit may determine the transmission time of the reference signal accordingly.

In addition, the electronic device 180 serving as the UE may, for example, acquire timing advance information from another communication device serving as the TRP during a random access process. For example, a timing advance command (TAC) may be received from the TRP as the timing advance information. The timing advance information indicates the timing advance value configured by the network side for the UE.

The control unit of the electronic device 180 as the UE may, for example, determine, based on the configuration and/or scheduling information of the predetermined reference signal and the timing advance information, the time when the predetermined reference signal is actually to be transmitted, so that the network side can expect to receive the predetermined reference signal via the first link at the predetermined first reception time. In an example, the control unit may subtract the first reception time from the propagation delay of the direct link determined based on the timing advance information, as the time for transmitting the predetermined reference signal. The details of determining the transmission time are similar to those in the fourth embodiment, and thus are not repeated here.

Another communication device as the receiving side of the TRP calculates the difference between the predetermined first reception time and the directly measured second reception time of receiving the predetermined reference signal via the reflection link, as the estimated delay difference. Optionally, another communication device serving as the receiving side of the TRP may also determine a second timing advance value applicable to the second link based on the first timing advance value applicable to the first link and the estimated delay difference, and transmit timing advance information indicating the first timing advance value and the second timing advance value to the electronic device in this embodiment serving as the UE.

Correspondingly, the transceiver unit of the electronic device in this embodiment serving as the UE may receive timing advance information indicating two timing advance values from another communication device serving as the TRP.

In practical applications, when each uplink channel such as shown in (B) of FIG. 19 satisfies the previously described sparse channel condition, the electronic device in this embodiment as the UE may perform appropriate transmission processing through appropriate precoding processing and based on two timing advance values, so that the data signals of the two links arrive at the other communication device as the TRP at the same time and may be detected by the other communication device as the TRP through appropriate processing.

Here, each uplink channel satisfying the sparse channel condition refers to: each of the first channel $$(H_0^{UL})$$

of the first link or direct link DTL from the electronic device 180 as the UE to another communication device as the TRP, the second channel $$(H_r^{UL})$$

from the electronic device 180 as the UE to the intelligent reflecting surface IRS, and the third channel $$(H_t^{UL})$$

from the intelligent reflecting surface IRS to another communication device as the TRP is a sparse channel. As an example, these sparse channels satisfy the conditions previously described with reference to Equation (48).

When the above sparse channel condition is satisfied, the transceiver unit of the electronic device 180 serving as the UE may be configured to: under the control of the control unit, transmit the first data signal precoded by the first precoding matrix $P_{DTL}$ to another communication device serving as the TRP according to the first timing advance value and via the first link and the second link; and transmit the second data signal precoded by the second precoding matrix $P_{RTL}$ to another communication device serving as the TRP according to the second timing advance value and via the first link and the second link. Here, the first precoding matrix $P_{DTL}$ is in the null space of the second channel $$H_r^{UL},$$

and the second precoding matrix $P_{RTL}$ is in the null space of the first channel $$H_0^{UL},$$

that is, satisfying the previously described Equation (49-1), and (49-2).

8. Method Embodiments of Fourth to Fifth Embodiments

8.1 Method Embodiment of Fourth Embodiment

Next, a method for wireless communications according to a fourth embodiment of the present disclosure is described.

FIG. 24 is a flowchart illustrating a procedure example of a method for wireless communications according to the fourth embodiment of the present disclosure.

The method shown in FIG. 24 may be applied, for example, to a wireless communication system assisted by an intelligent reflecting surface described above with reference to FIGS. 3 and 19, and may be implemented by the electronic device in the fourth embodiment described above. Since the method for wireless communications implemented by the electronic device has actually been described in the description of the fourth embodiment, the details are not repeated here, and only an overview is given. However, various aspects of the electronic device of the fourth embodiment above are applicable here.

As shown in FIG. 24, in step S2401, a predetermined reference signal sent by another communication device is received via a first link from another communication device to the electronic device and a second link from the other communication device to the electronic device via an intelligent reflecting surface.

Next, in step S2402, a delay difference between the propagation delay of a first link and the propagation delay of a second link is estimated based on a difference between the first reception time expected to receive the predetermined reference signal via the first link and the second reception time of actually receiving the predetermined reference signal via the second link.

8.2 Method Embodiment of Fifth Embodiment

Next, a method for wireless communications according to a fifth embodiment of the present disclosure is described.

FIG. 25 is a flowchart illustrating a procedure example of a method for wireless communications according to the fifth embodiment of the present disclosure.

The method shown in FIG. 25 may be applied, for example, to a wireless communication system assisted by an intelligent reflecting surface described above with reference to FIGS. 3 and 19, and may be implemented by the electronic device in the fifth embodiment described above. Since the method for wireless communications implemented by the electronic device has actually been described in the description of the fifth embodiment, the details are not repeated here, and only an overview is given. However, various aspects of the electronic device of the fifth embodiment above are applicable here.

As shown in FIG. 25, in step S2501, a predetermined reference signal is sent to another communication device via the first link from the electronic device to said another communication device and the second link from the electronic device to said another communication device via the intelligent reflecting surface, for said another communication device to estimate a delay difference between the propagation delay of the first link and the propagation delay of the second link based on the difference between a first reception time at which the predetermined reference signal is expected to be received via the first link and a second reception time at which the predetermined reference signal is actually received via the second link.

9. Application Examples

The technology of the present disclosure may be applied to various products.

For example, each of the electronic devices 400, 600, 700, 1000, 1100, 1300, 1400, and 180 may be implemented as any type of base station equipment, such as a macro eNB and a small eNB, and may also be implemented as any type of gNB (base station in 5G system). The small eNB may be an eNB that covers a cell smaller than a macro cell, such as a pico eNB, a micro eNB, and a home (femto) eNB. Alternatively, the base station may be implemented as any other type of base station, such as NodeB and a base transceiver station (BTS). A base station may include: a main body (also referred to as a base station equipment) configured to control wireless communications; and one or more remote radio heads (RRHs) disposed at places different from the main body.

In addition, each of the electronic devices 400, 600, 700, 1000, 1100, 1300, 1400, and 180 may also be implemented as any type of TRP. The TRP may have transmitting and receiving functions, for example, may receive information from user equipment and a base station equipment, and may also transmit information to the user equipment and the base station equipment. In a typical example, the TRP may provide services for user equipment and be controlled by the base station equipment. Further, the TRP may have a structure similar to that of the base station equipment, or may only have a structure related to transmitting and receiving information in the base station equipment.

In addition, each of the electronic devices 400, 600, 700, 1000, 1100, 1300, 1400, and 180 may also be various user equipment, which may be implemented as mobile terminals (such as a smart phone, a tablet personal computer (PC), a notebook PC, a portable game terminal, a portable/dongle type mobile router and a digital camera) or a vehicle-mounted terminal (such as automobile navigation equipment). The user equipment may also be implemented as a terminal performing machine-to-machine (M2M) communication (also referred to as a machine type communication (MTC) terminal). In addition, the user equipment may be a wireless communication module (such as an integrated circuit module including a single chip) mounted on each of the above-mentioned user equipment.

Application Examples about Base Station

First Application Example

Figure 26:
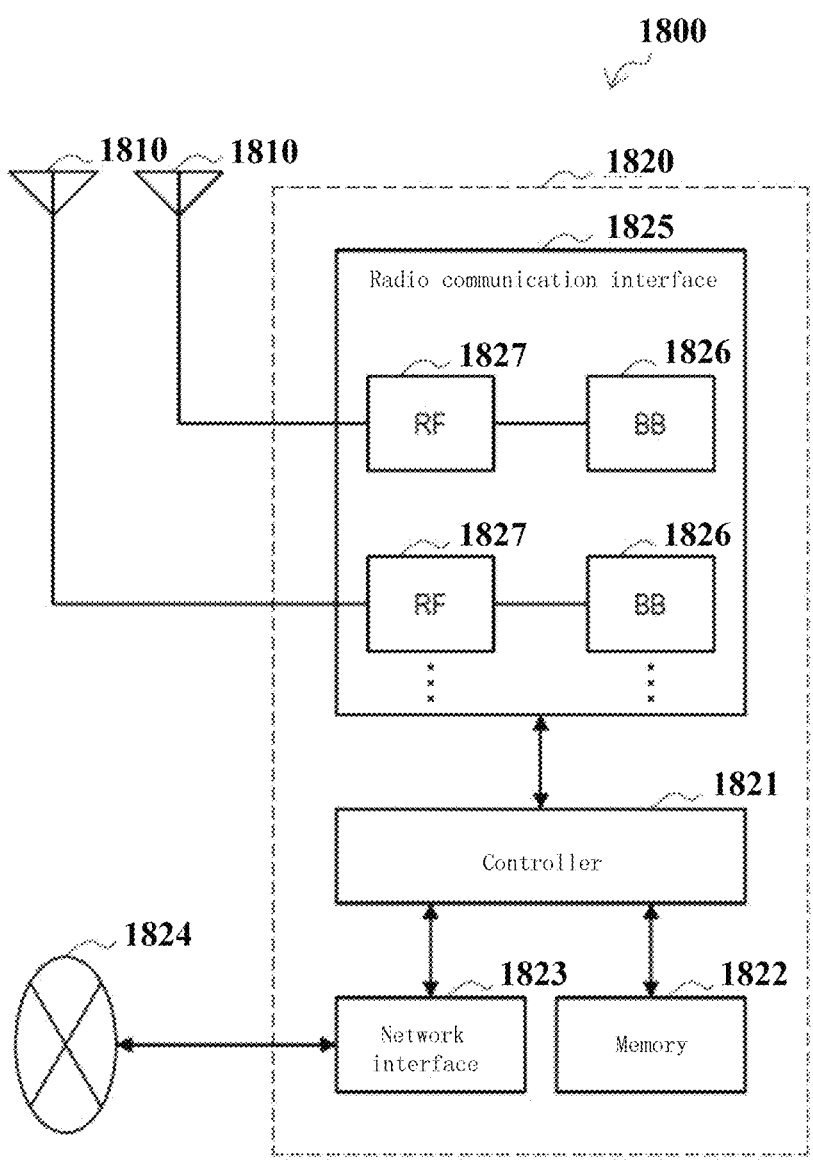
FIG. 26 is a block diagram illustrating a first example of a schematic configuration of an eNB to which the technology of the present disclosure may be applied.

FIG. 26 is a block diagram showing a first example of a schematic configuration of an eNB or gNB to which the technology of the present disclosure can be applied. Note that, the following description takes an eNB as an example, but it may also be applied to a gNB. An eNB 1800 includes one or more antennas 1810 and base station equipment 1820. The base station equipment 1820 and each antenna 1810 may be connected to each other via an RF cable.

Each of the antennas 1810 includes a single element or multiple antenna elements (such as multiple antenna elements included in a Multi-Input Multi-Output (MIMO) antenna), and is used for the base station equipment 1820 to transmit and receive wireless signals. As shown in FIG. 26, the eNB 1800 may include multiple antennas 1810. For example, the multiple antennas 1810 may be compatible with multiple frequency bands used by the eNB 1800. Although FIG. 26 shows an example in which the eNB 1800 includes multiple antennas 1810, the eNB 1800 may also include a single antenna 1810.

The base station equipment 1820 includes a controller 1821, a memory 1822, a network interface 1823, and a radio communication interface 1825.

The controller 1821 may be, for example, a CPU or a DSP, and manipulate various functions of a higher layer of the base station equipment 1820. For example, the controller 1821 generates a data packet based on data in a signal processed by the radio communication interface 1825, and transfers the generated packet via the network interface 1823. The controller 1821 may bundle data from multiple baseband processors to generate a bundled packet, and transfer the generated bundled packet. The controller 1821 may have a logical function for performing control such as radio resource control, radio bearer control, mobility management, admission control, and scheduling. The control may be executed in conjunction with nearby eNBs or core network nodes. The memory 1822 includes a RAM and an ROM, and stores programs executed by the controller 1821 and various types of control data (such as a terminal list, transmission power data, and scheduling data).

The network interface 1823 is a communication interface for connecting the base station equipment 1820 to a core network 1824. The controller 1821 may communicate with the core network node or another eNB via the network interface 1823. In this case, the eNB 1800 and the core network node or other eNBs may be connected to each other through a logical interface (such as an S1 interface and an X2 interface). The network interface 1823 may also be a wired communication interface, or a radio communication interface for a wireless backhaul line. If the network interface 1823 is a radio communication interface, the network interface 1823 may use a higher frequency band for wireless communications than the frequency band used by the radio communication interface 1825.

The radio communication interface 1825 supports any cellular communication scheme (such as Long Term Evolution (LTE) and LTE-Advanced), and provides wireless connection to a terminal located in a cell of the eNB 1800 via an antenna 1810. The radio communication interface 1825 may generally include, for example, a baseband (BB) processor 1826 and an RF circuit 1827. The BB processor 1826 may execute, for example, encoding/decoding, modulation/demodulation, and multiplexing/demultiplexing, and execute various types of signal processing of layers (e.g., L1, Medium Access Control (MAC), Radio Link Control (RLC), and Packet Data Convergence Protocol (PDCP)). Instead of the controller 1821, the BB processor 1826 may have a part or all of the above-mentioned logical functions. The BB processor 1826 may be a memory storing a communication control program, or a module including a processor and related circuits configured to execute the program. An update program may cause the function of the BB processor 1826 to be changed. The module may be a card or blade inserted into a slot of the base station equipment 1820. Alternatively, the module may also be a chip mounted on a card or blade. Meanwhile, the RF circuit 1827 may include, for example, a mixer, a filter, and an amplifier, and transmit and receive a wireless signal via the antenna 1810.

As shown in FIG. 26, the radio communication interface 1825 may include multiple BB processors 1826. For example, the multiple BB processors 1826 may be compatible with multiple frequency bands used by the eNB 1800. As shown in FIG. 26, the radio communication interface 1825 may include multiple RF circuits 1827. For example, the multiple RF circuits 1827 may be compatible with multiple antenna elements. Although FIG. 26 shows an example in which the radio communication interface 1825 includes multiple BB processors 1826 and multiple RF circuits 1827, the radio communication interface 1825 may also include a single BB processor 1826 or a single RF circuit 1827.

In the eNB 1800 shown in FIG. 26, the acquisition unit 610 in the electronic device 600 described above with reference to FIG. 6 may be implemented through the radio communication interface 1825 (optionally together with the antenna 1810) and the like. The acquisition unit 710 in the electronic device 700 described above with reference to FIG. 7 may be realized by the controller 1821 (optionally together with the radio communication interface 1825 and the antenna 1810) and the like. The acquisition unit 410 in the electronic device 400 described above with reference to FIG. 4 may be implemented similarly to the acquisition unit 610 in the electronic device 600 or the acquisition unit 710 in the electronic device 700. In addition, the determination units 420, 620, and 720 in the electronic devices 400, 600, and 700 may be implemented by the controller 1821. The transmission unit 630 in the electronic device 600 and the receiving unit 730 in the electronic device 700 may be implemented through the radio communication interface 1825 (optionally together with the antenna 1810) and the like.

In addition, in the eNB 1800 shown in FIG. 26, the first calculation units 1010 and 1110 and the second calculation units 1020 and 1120 in the electronic devices 1000 and 1100 described above with reference to FIG. 10 and FIG. 11 may be implemented by the controller 1821. In addition, the precoding unit 1130 in the electronic device 1100 may be implemented, for example, through the controller 1821 or through the radio communication interface 1825 (e.g., under the control of the controller 1821).

In addition, in the eNB 1800 shown in FIG. 26, the reflection calculation units 1310 and 1410 and the precoding calculation units 1320 and 1420 in the electronic devices 1300 and 1400 described above with reference to FIG. 13 and FIG. 14 may be implemented by the controller 1821. In addition, the precoding unit 1430 in the electronic device 1400 may be implemented, for example, by the controller 1821 or through the radio communication interface 1825 (for example, under the control of the controller 1821).

In addition, in the eNB 1800 shown in FIG. 26, the control unit 180-1 in the electronic device 18 described earlier with reference to FIG. 18 may be implemented by the controller 1821. In addition, the transceiver unit 180-2 in the electronic device 180 may be implemented, for example, through the radio communication interface 1825 (optionally together with the antenna 1810) (e.g., under the control of the controller 1821).

Second Application Example

Figure 27:
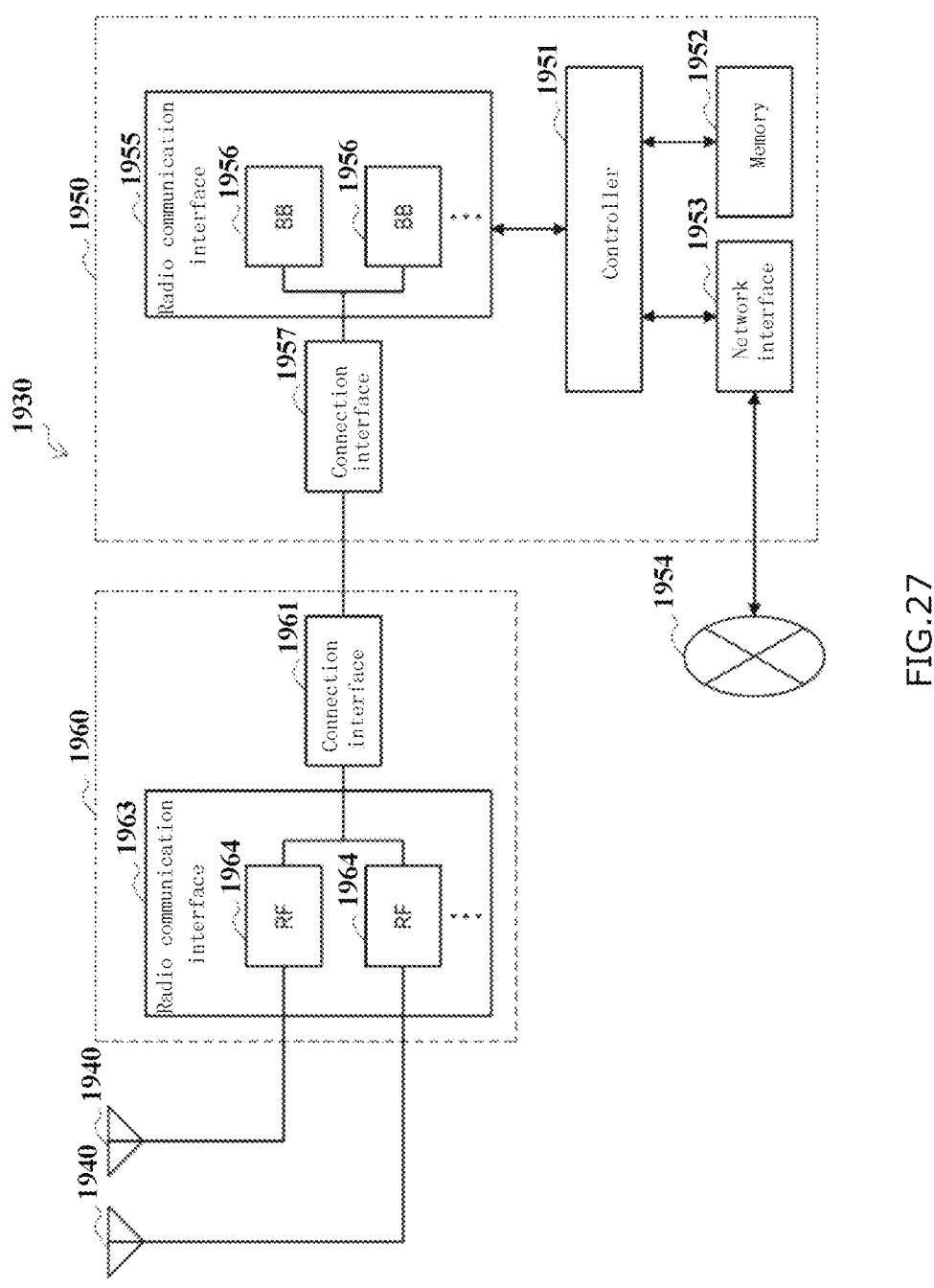
FIG. 27 is a block diagram illustrating a second example of the schematic configuration of the eNB to which the technology of the present disclosure may be applied.

FIG. 27 is a block diagram showing a second example of a schematic configuration of an eNB or gNB to which the technology of the present disclosure can be applied. Note that similarly, the following description takes an eNB as an example, but it may also be applied to a gNB. An eNB 1930 includes one or more antennas 1940, base station equipment 1950, and an RRH 1960. The RRH 1960 and each antenna 1940 may be connected to each other via an RF cable. The base station equipment 1950 and the RRH 1960 may be connected to each other via a high-speed line such as an optical fiber cable.

Each of the antennas 1940 includes a single element or multiple antenna elements (such as multiple antenna elements included in a MIMO antenna) and is used for the RRH 1960 to transmit and receive a wireless signal. As shown in FIG. 27, the eNB 1930 may include multiple antennas 1940. For example, the multiple antennas 1940 may be compatible with multiple frequency bands used by the eNB 1930. Although FIG. 27 shows an example in which the eNB 1930 includes multiple antennas 1940, the eNB 1930 may also include a single antenna 1940.

The base station equipment 1950 includes a controller 1951, a memory 1952, a network interface 1953, a radio communication interface 1955, and a connection interface 1957. The controller 1951, the memory 1952, and the network interface 1953 are the same as the controller 1921, the memory 1922, and the network interface 1923 as described with reference to FIG. 26.

The radio communication interface 1955 supports any cellular communication scheme (such as LTE and LTE-Advanced), and provides wireless communications to a terminal located in a sector corresponding to the RRH 1960 via the RRH 1960 and the antenna 1940. The radio communication interface 1955 may generally include, for example, a BB processor 1956. The BB processor 1956 is the same as the BB processor 1918 as described with reference to FIG. 26 except that the BB processor 1956 is connected to the RF circuit 1964 of the RRH 1960 via the connection interface 1957. As shown in FIG. 27, the radio communication interface 1955 may include multiple BB processors 1956. For example, the multiple BB processors 1956 may be compatible with multiple frequency bands used by the eNB 1930. Although FIG. 27 shows an example in which the radio communication interface 1955 includes multiple BB processors 1956, the radio communication interface 1955 may also include a single BB processor 1956.

The connection interface 1957 is an interface for connecting the base station equipment 1950 (radio communication interface 1955) to the RRH 1960. The connection interface 1957 may also be a communication module for communication in the above-mentioned high-speed line that connects the RRH 1960 to the base station equipment 1950 (radio communication interface 1955).

The RRH 1960 includes a connection interface 1961 and a radio communication interface 1963.

The connection interface 1961 is an interface for connecting the RRH 1960 (radio communication interface 1963) to the base station equipment 1950. The connection interface 1961 may also be a communication module for communication in the above-mentioned high-speed line.

The radio communication interface 1963 transfers and receives wireless signals via the antenna 1940. The radio communication interface 1963 may generally include, for example, an RF circuit 1964. The RF circuit 1964 may include, for example, a mixer, a filter, and an amplifier, and transfer and receive wireless signals via the antenna 1940. As shown in FIG. 27, the radio communication interface 1963 may include multiple RF circuits 1964. For example, the multiple RF circuits 1964 may support multiple antenna elements. Although FIG. 27 shows an example in which the radio communication interface 1963 includes multiple RF circuits 1964, the radio communication interface 1963 may also include a single RF circuit 1964.

In the eNB 1930 as shown in FIG. 27, the acquisition unit 610 in the electronic device 600 described above with reference to FIG. 6 may be realized through the radio communication interface 1963 (optionally together with the antenna 1940) and the like. The acquisition unit 710 in the electronic device 700 described above with reference to FIG. 7 may be realized by the controller 1951 (optionally together with the radio communication interface 1963 and the antenna 1940) and the like. The acquisition unit 410 in the electronic device 400 described above with reference to FIG. 4 may be implemented similarly to the acquisition unit 610 in the electronic device 600 or the acquisition unit 710 in the electronic device 700. In addition, the determination units 420, 620, and 720 in the electronic devices 400, 600, and 700 may be implemented by the controller 1951. The transmission unit 630 in the electronic device 600 and the receiving unit 730 in the electronic device 700 may be realized through the radio communication interface 1963 (optionally together with the antenna 1940) and the like.

Furthermore, in the eNB 1930 shown in FIG. 27, the first calculation units 1010 and 1110 and the second calculation units 1020 and 1120 in the electronic devices 1000 and 1100 described above with reference to FIGS. 10 and 11 may be implemented by the controller 1951. In addition, the precoding unit 1130 in the electronic device 1100 may be implemented, for example, through the controller 1951 or through the radio communication interface 1955 or 1963 (for example, under the control of the controller 1951).

Furthermore, in the eNB 1930 shown in FIG. 27, the reflection calculation units 1310 and 1410 and the precoding calculation units 1320 and 1420 in the electronic devices 1300 and 1400 described above with reference to FIG. 13 and FIG. 14 may be implemented by the controller 1951. In addition, the precoding unit 1430 in the electronic device 1400 may be implemented, for example, through the controller 1951 or through the radio communication interface 1955 or 1963 (for example, under the control of the controller 1951).

Furthermore, in the eNB 1930 shown in FIG. 27, the control unit 180-1 in the electronic device 18 described previously with reference to FIG. 18 may be implemented by the controller 1951. In addition, the transceiver unit 180-2 in the electronic device 180 may be implemented, for example, through the radio communication interface 1955 or

1963 (optionally together with the antenna 1940) (e.g., under the control of the controller 1951).

Application Example about User Equipment

First Application Example

Figure 28:
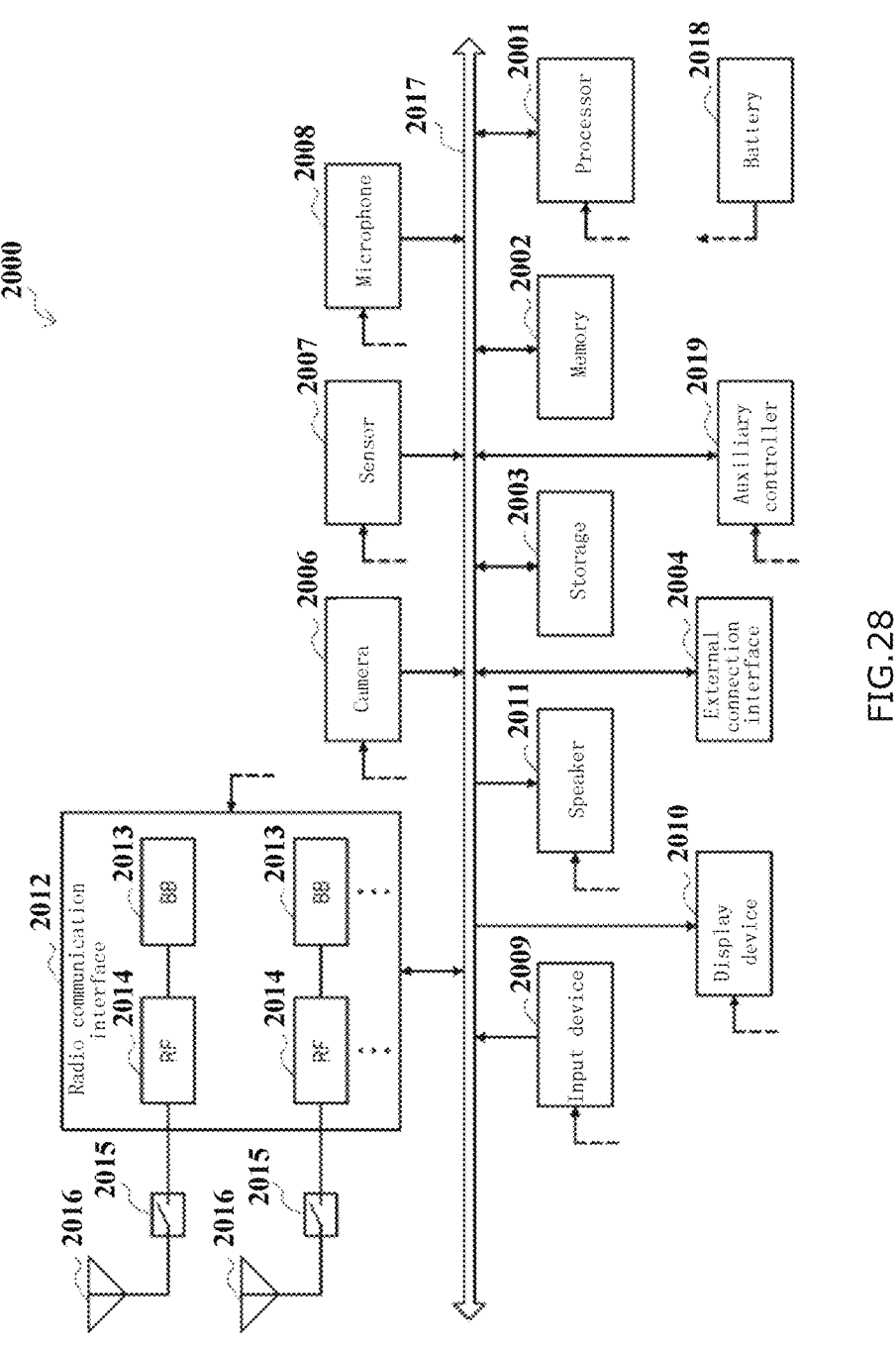
FIG. 28 is a block diagram illustrating an example of a schematic configuration of a smartphone to which the technology of the present disclosure may be applied.

FIG. 28 is a block diagram showing an example of a schematic configuration of a smart phone 2000 to which the technology of the present disclosure can be applied. The smart phone 2000 includes a processor 2001, a memory 2002, a storage 2003, an external connection interface 2004, a camera 2006, a sensor 2007, a microphone 2008, an input device 2009, a display device 2010, a speaker 2011, a radio communication interface 2012, one or more antenna switches 2015, one or more antennas 2016, a bus 2017, a battery 2018, and an auxiliary controller 2019.

The processor 2001 may be, for example, a CPU or a system on a chip (SoC), and controls the functions of the application layer and other layers of the smart phone 2000. The memory 2002 includes a RAM and a ROM, and stores data and programs executed by the processor 2001. The storage 2003 may include a storage medium such as a semiconductor memory and a hard disk. The external connection interface 2004 is an interface for connecting an external device (such as a memory card and a universal serial bus (USB) device) to the smart phone 2000.

The camera 2006 includes an image sensor (such as a charge coupled device (CCD) and a complementary metal oxide semiconductor (CMOS)), and generates a captured image. The sensor 2007 may include a group of sensors, such as a measurement sensor, a gyro sensor, a geomagnetic sensor, and an acceleration sensor. The microphone 2008 converts sound input to the smart phone 2000 into an audio signal. The input device 2009 includes, for example, a touch sensor, a keypad, a keyboard, a button, or a switch configured to detect a touch on a screen of the display device 2010, and receives an operation or information input from the user. The display device 2010 includes a screen (such as a liquid crystal display (LCD) and an organic light emitting diode (OLED) display), and displays an output image of the smart phone 2000. The speaker 2011 converts the audio signal output from the smart phone 2000 into sound.

The radio communication interface 2012 supports any cellular communication scheme (such as LTE and LTE-Advanced), and executes wireless communications. The radio communication interface 2012 may generally include, for example, a BB processor 2013 and an RF circuit 2014. The BB processor 2013 may execute, for example, encoding/decoding, modulation/demodulation, and multiplexing/demultiplexing, and execute various types of signal processing for wireless communications. Meanwhile, the RF circuit 2014 may include, for example, a mixer, a filter, and an amplifier, and transmit and receive wireless signals via the antenna 2016. Note that, although the figure shows a circumstance where one RF link is connected with one antenna, this is only schematic, and a circumstance where one RF link is connected with multiple antennas through multiple phase shifters is also included. The radio communication interface 2012 may be a chip module on which the BB processor 2013 and the RF circuit 2014 are integrated. As shown in FIG. 28, the radio communication interface 2012 may include multiple BB processors 2013 and multiple RF circuits 2014. Although FIG. 28 shows an example in which the radio communication interface 2012 includes multiple BB processors 2013 and multiple RF circuits 2014, the radio communication interface 2012 may also include a single BB processor 2013 or a single RF circuit 2014.

Furthermore, in addition to the cellular communication scheme, the radio communication interface 2012 may support other types of wireless communication schemes, such as a short-range wireless communication scheme, a near field communication scheme, and a wireless local area network (LAN) scheme. In this case, the radio communication interface 2012 may include a BB processor 2013 and an RF circuit 2014 for each wireless communication scheme.

Each of the antenna switches 2015 switches a connection destination of the antenna 2016 among multiple circuits included in the radio communication interface 2012 (e.g., circuits for different wireless communication schemes).

Each of the antennas 2016 includes a single element or multiple antenna elements (such as multiple antenna elements included in a MIMO antenna), and is used for the radio communication interface 2012 to transmit and receive wireless signals. As shown in FIG. 28, the smart phone 2000 may include multiple antennas 2016. Although FIG. 28 shows an example in which the smart phone 2000 includes multiple antennas 2016, the smart phone 2000 may also include a single antenna 2016.

Furthermore, the smart phone 2000 may include an antenna 2016 for each wireless communication scheme. In this case, the antenna switch 2015 may be omitted from the configuration of the smart phone 2000.

The bus 2017 connects the processor 2001, the memory 2002, the storage 2003, the external connection interface 2004, the camera 2006, the sensor 2007, the microphone 2008, the input device 2009, the display device 2010, the speaker 2011, the radio communication interface 2012, and the auxiliary controller 2019 to each other. The battery 2018 supplies power to each block of the smart phone 2000 as shown in FIG. 28 via a feeder line, which is partially shown as a dashed line in the figure. The auxiliary controller 2019 manipulates the least necessary function of the smart phone 2000 in a sleep mode, for example.

In the smart phone 2000 as shown in FIG. 28, the acquisition unit 610 in the electronic device 600 described above with reference to FIG. 6 may be implemented through the radio communication interface 2012 (optionally together with the antenna 2016) and the like. The acquisition unit 710 in the electronic device 700 described above with reference to FIG. 7 may be implemented by the processor 2001 (optionally together with the radio communication interface 2012 and the antenna 2016), etc. The acquisition unit 410 in the electronic device 400 described above with reference to FIG. 4 may be implemented similarly to the acquisition unit 610 in the electronic device 600 or the acquisition unit 710 in the electronic device 700. In addition, the determining units 420, 620, and 720 in the electronic devices 400, 600, and 700 may be implemented by the processor 2001. The transmitting unit 630 in the electronic device 600 and the receiving unit 730 in the electronic device 700 may be implemented through the radio communication interface 2012 (optionally together with the antenna 2016) and the like.

Furthermore, in the smart phone 2000 shown in FIG. 28, the first computing units 1010 and 1110 and the second computing units 1020 and 1120 in the electronic devices 1000 and 1100 described above with reference to FIG. 10 and FIG. 11 may be implemented by the processor 2001. In addition, the precoding 1130 unit in the electronic device 1100 may be implemented, for example, through the processor 2001 or through the radio communication interface 2012 (for example, under the control of the processor 2001).

Furthermore, in the smart phone 2000 shown in FIG. 28, the reflection calculation units 1310 and 1410 and the precoding calculation units 1320 and 1420 in the electronic devices 1300 and 1400 described above with reference to FIG. 13 and FIG. 14 may be implemented by the processor 2001. In addition, the precoding unit 1430 in the electronic device 1400 may be implemented, for example, through the processor 2001 or through the radio communication interface 2012 (for example, under the control of the processor 2001).

Furthermore, in the smart phone 2000 shown in FIG. 28, the control unit 180-1 in the electronic device 18 described previously with reference to FIG. 18 may be implemented by the processor 2001. In addition, the transceiver unit 180-2 in the electronic device 180 may be implemented, for example, through the radio communication interface 2012 (optionally together with the antenna 2016) (e.g., under the control of the processor 2001).

Second Application Example

Figure 29:
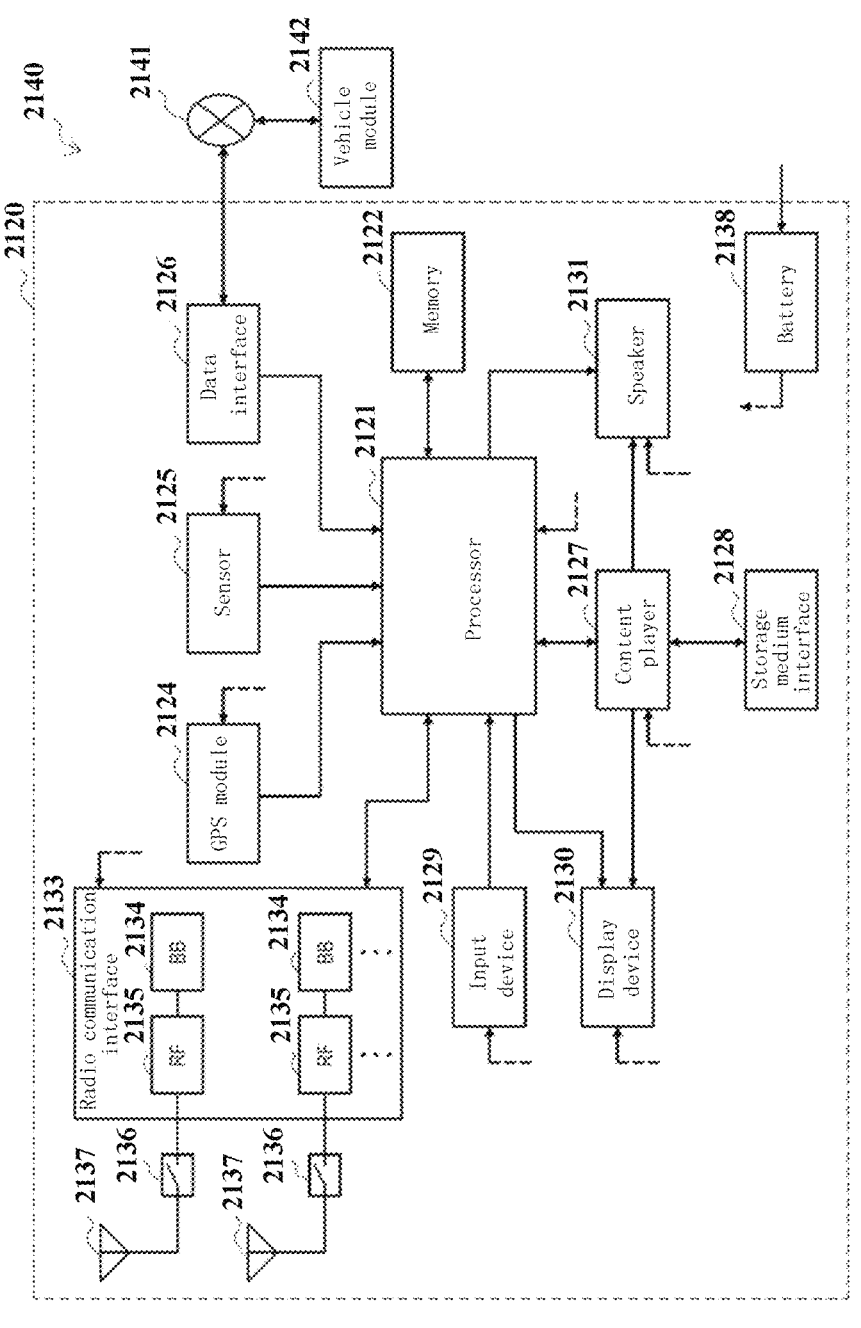
FIG. 29 is a block diagram illustrating an example of a schematic configuration of an automobile navigation equipment to which the technology of the present disclosure may be applied.

FIG. 29 is a block diagram showing an example of a schematic configuration of automobile navigation equipment to which the technology of the present disclosure can be applied. The automobile navigation equipment 2120 includes a processor 2121, a memory 2122, a global positioning system (GPS) module 2124, a sensor 2125, a data interface 2126, a content player 2127, a storage medium interface 2128, an input device 2129, a display device 2130, a speaker 2131, a radio communication interface 2133, one or more antenna switches 2136, one or more antennas 2137, and a battery 2138.

The processor 2121 may be, for example, a CPU or an SoC, and controls the navigation function of the automobile navigation equipment 2120 and additional functions. The memory 2122 includes a RAM and an ROM, and stores data and programs executed by the processor 2121.

The GPS module 2124 uses a GPS signal received from a GPS satellite to measure a position of the automobile navigation equipment 2120 (such as latitude, longitude, and altitude). The sensor 2125 may include a group of sensors, such as a gyro sensor, a geomagnetic sensor, and an air pressure sensor. The data interface 2126 is connected to, for example, an in-vehicle network 2141 via a terminal not shown, and acquires data (such as vehicle speed data) generated by a vehicle.

The content player 2127 reproduces content stored in a storage medium (such as a CD and a DVD), which is inserted into the storage medium interface 2128. The input device 2129 includes, for example, a touch sensor, a button, or a switch configured to detect a touch on a screen of the display device 2130, and receives an operation or information input from the user. The display device 2130 includes a screen such as an LCD or OLED display, and displays an image of a navigation function or reproduced content. The speaker 2131 outputs the sound of the navigation function or the reproduced content.

The radio communication interface 2133 supports any cellular communication scheme, such as LTE and LTE-Advanced, and executes wireless communication. The radio communication interface 2133 may generally include, for example, a BB processor 2134 and an RF circuit 2135. The BB processor 2134 may execute, for example, encoding/decoding, modulation/demodulation, and multiplexing/de-multiplexing, and execute various types of signal processing for wireless communications. Meanwhile, the RF circuit 2135 may include, for example, a mixer, a filter, and an amplifier, and transmit and receive wireless signals via the antenna 2137. The radio communication interface 2133 may also be a chip module on which the BB processor 2134 and the RF circuit 2135 are integrated. As shown in FIG. 29, the radio communication interface 2133 may include multiple BB processors 2134 and multiple RF circuits 2135. Although FIG. 29 shows an example in which the radio communication interface 2133 includes multiple BB processors 2134 and multiple circuits 2135, the radio communication interface 2133 may also include a single BB processor 2134 or a single RF circuit 2135.

Furthermore, in addition to the cellular communication scheme, the radio communication interface 2133 may support types of wireless communication schemes, such as a short-range wireless communication scheme, a near field communication scheme, and a wireless LAN scheme. In this case, the radio communication interface 2133 may include a BB processor 2134 and an RF circuit 2135 for each wireless communication scheme.

Each of the antenna switches 2136 switches a connection destination of the antenna 2137 among multiple circuits included in the radio communication interface 2133 (e.g., circuits for different wireless communication schemes).

Each of the antennas 2137 includes a single element or multiple antenna elements (such as multiple antenna elements included in a MIMO antenna), and is used for the radio communication interface 2133 to transmit and receive wireless signals. As shown in FIG. 29, the automobile navigation equipment 2120 may include multiple antennas 2137. Although FIG. 29 shows an example in which the automobile navigation equipment 2120 includes multiple antennas 2137, the automobile navigation equipment 2120 may also include a single antenna 2137.

Furthermore, the automobile navigation equipment 2120 may include an antenna 2137 for each wireless communication scheme. In this case, the antenna switch 2136 may be omitted from the configuration of the automobile navigation equipment 2120.

The battery 2138 supplies power to each block of the automobile navigation equipment 2120 as shown in FIG. 29 via a feeder line, which is partially shown as a dashed line in the figure. The battery 2138 accumulates electric power supplied from the vehicle.

In the automobile navigation equipment 2120 as shown in FIG. 29, the acquisition unit 610 in the electronic device 600 described above with reference to FIG. 6 may be realized through the radio communication interface 2133 (optionally together with the antenna 2137) and the like. The acquiring unit 710 in the electronic device 700 described above with reference to FIG. 7 may be realized by the processor 2121 (optionally together with the radio communication interface 2133 and the antenna 2137) and the like. The acquisition unit 410 in the electronic device 400 described above with reference to FIG. 4 may be implemented similarly to the acquisition unit 610 in the electronic device 600 or the acquisition unit 710 in the electronic device 700. In addition, the determining units 420, 620, and 720 in the electronic devices 400, 600, and 700 may be implemented by the processor 2121. The transmitting unit 630 in the electronic device 600 and the receiving unit 730 in the electronic device 700 may be realized through the radio communication interface 2133 (optionally together with the antenna 2137) and the like.

Furthermore, in the automobile navigation equipment 2120 shown in FIG. 29, the first computing units 1010 and 1110 and the second computing units 1020 and 1120 in the electronic devices 1000 and 1100 described above with reference to FIG. 10 and FIG. 11 may be implemented by the processor 2121. In addition, the precoding unit 1130 in the electronic device 1100 may be implemented, for example, through the processor 2121 or through the radio communication interface 2133 (for example, under the control of the processor 2121).

Furthermore, in the automobile navigation equipment 2120 shown in FIG. 29, the reflection calculation units 1310 and 1410 and the precoding calculation units 1320 and 1420 in the electronic devices 1300 and 1400 described above with reference to FIG. 13 and FIG. 14 may be implemented by the processor 2121. In addition, the precoding unit 1430 in the electronic device 1400 may be implemented, for example, through the processor 2121 or through the radio communication interface 2133 (for example, under the control of the processor 2121).

Furthermore, in the automobile navigation equipment 2120 shown in FIG. 29, the control unit 180-1 in the electronic device 18 described previously with reference to FIG. 18 may be implemented by the processor 2121. In addition, the transceiver unit 180-2 in the electronic device 180 may be implemented, for example, through the radio communication interface 2133 (optionally together with the antenna 2137) (e.g., under the control of the processor 2121).

The technology of the present disclosure may also be implemented as an in-vehicle system (or vehicle) 2140 including one or more blocks in the automobile navigation equipment 2120, the in-vehicle network 2141, and the vehicle module 2142. The vehicle module 2142 generates vehicle data (such as vehicle speed, engine speed, and failure information), and outputs the generated data to the in-vehicle network 2141.

The preferred embodiments of the present disclosure have been described above with reference to the drawings. However, the present disclosure is not limited to the above examples. Those skilled in the art may find various alterations and modifications within the scope of the appended claims, and it should be understood that the various alterations and modifications naturally come under the technical scope of the present disclosure.

For example, the units shown in dotted lines in the diagrams of functional blocks shown in the accompanying drawings all indicate that the functional units are optional in the device, and optional functional units may be combined in an appropriate manner to realize required functionality.

For example, multiple functions included in one unit in the above embodiments may be realized by separate devices. Alternatively, multiple functions implemented by multiple units in the above embodiments may be respectively implemented by separate devices. In addition, one of the above functions may be realized by multiple units. Needless to say, such a configuration is included in the technical scope of the present disclosure.

In this specification, the steps described in the flowcharts include not only processing performed in time series in the stated order but also processing performed in parallel or individually and not necessarily in time series. Furthermore, even in the steps of time-series processing, needless to say, the order may be appropriately changed.

Although the embodiments of the present disclosure have been described in detail in conjunction with the accompanying drawings, it should be understood that the embodiments are only for illustrating the present disclosure rather than limiting the present disclosure. Various modifications and changes may be made to the above embodiments by those skilled in the art without departing from the spirit and scope of the present disclosure. Therefore, the scope of the present disclosure is limited only by the appended claims and their equivalents.

The invention claimed is:

1. An electronic device, comprising:

processing circuitry configured to:

acquire a plurality pieces of channel information about an equivalent channel between a user equipment and a base station obtained through a plurality of channel measurements, wherein the electronic device is separate from the user equipment and the base station, and in each of the plurality of channel measurements, the base station is for acquiring one piece of channel information based on a received reference signal transmitted from the user equipment and a reflection signal sent by an intelligent reflecting surface between the user equipment and the base station reflecting the reference signal based on a set of reflection parameters; and determine, by jointly processing a plurality sets of reflection parameters utilized in the plurality of channel measurements and the acquired plurality pieces of channel information, channel estimation of a plurality of integrated sub-channels that indicate the equivalent channel together with reflection parameters of the intelligent reflecting surface.

2. The electronic device according to claim 1, wherein the equivalent channel comprises:

a direct link between the user equipment and the base station; and a reflective link between the user equipment and the base station via the intelligent reflecting surface, and/or the reflection signal is sent by reflection units of the intelligent reflecting surface after modulating an amplitude and/or a phase of the reference signal according to the reflection parameters thereof.

3. The electronic device according to claim 1, wherein the acquired plurality pieces of channel information comprise a plurality pieces of channel state information of the equivalent channel, and the processing circuitry is further configured to: determine a plurality of channel estimations of the equivalent channel based on the acquired plurality pieces of channel state information, respectively; or the acquired plurality pieces of channel information comprise a plurality of channel estimations for the equivalent channel.

4. The electronic device according to claim 3, wherein the joint processing comprises:

multiplying an inverse matrix of a training matrix, constructed based on a plurality of extended reflection vectors obtained based on the plurality sets of reflection parameters, by an observation matrix constructed by the plurality of channel estimations, to determine a channel matrix for each of the integrated sub-channels, and the plurality of extended reflection vectors are obtained by adding a predetermined constant to each set of reflection parameters in the plurality sets of reflection parameters.

5. The electronic device according to claim 4, wherein the intelligent reflecting surface comprises M reflection units and utilizes a set of M reflection parameters corresponding to the M reflection units in each reflection, M is a natural number greater than 1, and the processing circuitry is further configured to determine channel matrixes of a total of M+1 integrated sub-channels through the multiplication.

6. The electronic device according to claim 5, wherein the number of channel measurements or the number L of sets of reflection parameter is greater than or equal to M+1.

7. The electronic device according to claim 6, wherein, in the determined channel matrixes of the M+1 integrated sub-channels, one integrated sub-channel is for indicating a direct link between the user equipment and the base station, and other M integrated sub-channels together with the reflection parameters of the intelligent reflecting surface are for indicating a reflective link between the user equipment and the base station via the intelligent reflecting surface.

8. A user equipment, comprising:

processing circuitry configured to:

receive a predetermined reference signal sent by a base station via a direct link from the base station to the user equipment and a reflective link from the base station to the user equipment via an intelligent reflecting surface; and estimate a delay difference between a propagation delay of the direct link and a propagation delay of the reflective link based on a difference between a first reception time at which the predetermined reference signal is expected to be received via the direct link and a second reception time at which the predetermined reference signal is actually received via the reflective link.

9. The user equipment according to claim 8, wherein the predetermined reference signal is within a null space of a channel of the direct link.

10. The user equipment according to claim 8, wherein the processing circuitry is further configured to:

determine a transmission time of the predetermined reference signal according to configuration and/or scheduling information of the predetermined reference signal obtained from the base station; and estimate the first reception time based on the determined transmission time of the predetermined reference signal and timing advance information obtained from the base station.

11. The user equipment according to claim 10, wherein the processing circuitry is further configured to transmit delay difference information indicating the estimated delay difference to the base station.

12. The user equipment according to claim 11, wherein the processing circuitry is further configured to:

receive timing advance information from the base station indicating two timing advance values, and the two timing advance values comprise:

a first timing advance value applicable to the direct link, and a second timing advance value applicable to the reflective link determined based on the first timing advance value and the delay difference information.

13. The user equipment according to claim 12, wherein each of a first channel from the user equipment to the base station, a second channel from the user equipment to the intelligent reflecting surface and a third channel from the intelligent reflecting surface to the base station is a sparse channel, the processing circuitry is further configured to:

transmit a first data signal precoded with a first precoding matrix to the base station via the direct link and the reflective link according to the first timing advance value; and transmit a second data signal precoded with a second precoding matrix to the base station via the direct link and the reflective link according to the second timing advance value, the first precoding matrix is in a null space of the second channel, and the second precoding matrix is in a null space of the first channel.

14. The user equipment according to claim 8, wherein the processing circuitry is further configured to:

receive configuration and/or scheduling information of the predetermined reference signal provided from the base station based on the predetermined first reception time.

15. The user equipment according to claim 14, wherein the processing circuitry is further configured to:

perform joint signal detection on data signals received via the direct link and the reflective link based on the estimated delay difference, to obtain a data signal sent by the base station.

16. The user equipment according to claim 14, wherein the processing circuitry is further configured to:

determine a second timing advance value applicable to the reflective link based on a first timing advance value applicable to the direct link and the estimated delay difference; and transmit timing advance information indicating the first timing advance value and the second timing advance value to the base station.

17. The user equipment according to claim 16, wherein each of a first channel of the direct link, and a second channel from the base station to the intelligent reflecting surface and a third channel from the intelligent reflecting surface to the user equipment of the reflective link is a sparse channel, the processing circuitry is further configured to:

receive a joint data signal from the base station device via the direct link and the reflective link, wherein the joint data signal comprises a first data signal precoded by the first precoding matrix and sent according to the first timing advance value and a second data signal precoded by the second precoding matrix and sent according to the second timing advance value;

detect the first data signal from the received joint data signal based on a first signal detection matrix; and detect a second data signal from the received joint data signal based on a second signal detection matrix, wherein the first precoding matrix is in a null space of the second channel, the second precoding matrix is in a null space of the first channel, the first signal detection matrix is designed such that the third channel is in a null space of the first signal detection matrix, and the second signal detection matrix is designed such that the first channel is within a null space of the second signal detection matrix.

* * * * *